US010719099B2

(12) United States Patent
Puggelli et al.

(10) Patent No.: US 10,719,099 B2
(45) Date of Patent: *Jul. 21, 2020

(54) RECONFIGURABLE DICKSON STAR SWITCHED CAPACITOR VOLTAGE REGULATOR

(71) Applicant: Lion Semiconductor Inc., San Francisco, CA (US)

(72) Inventors: Alberto Alessandro Angelo Puggelli, Burlingame, CA (US); Thomas Li, Mountain View, CA (US); Wonyoung Kim, Mountain View, CA (US); John Crossley, Oakland, CA (US); Hanh-Phuc Le, Superior, CO (US)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,917

(22) Filed: May 13, 2019

(65) Prior Publication Data
US 2019/0272001 A1 Sep. 5, 2019

Related U.S. Application Data

(63) Continuation of application No. 15/487,682, filed on Apr. 14, 2017, now Pat. No. 10,289,146.

(60) Provisional application No. 62/324,091, filed on Apr. 18, 2016.

(51) Int. Cl.
*G05F 5/00* (2006.01)
*H02M 3/07* (2006.01)
*H02M 3/158* (2006.01)
*H02J 7/00* (2006.01)
*H02M 1/00* (2006.01)

(52) U.S. Cl.
CPC .................. *G05F 5/00* (2013.01); *H02J 7/00* (2013.01); *H02M 3/07* (2013.01); *H02M 3/1582* (2013.01); *H02M 2001/007* (2013.01)

(58) Field of Classification Search
CPC ......... G05F 5/00; H02J 7/0065; H02J 7/0052; H02J 2007/0062; H02M 3/1582; H02M 3/07; H02M 2001/007
USPC ....................................................... 320/137
See application file for complete search history.

(56) References Cited

U.S. PATENT DOCUMENTS 5,642,267 A * 6/1997 Brkovic .................. G05F 1/613
323/224
7,271,505 B1 * 9/2007 Miettinen ............. H02J 7/0018
307/110
(Continued)

OTHER PUBLICATIONS

International Preliminary Report on Patentability dated Oct. 23, 2018 in International Patent Application No. PCT/US2017/027555.
(Continued)

*Primary Examiner* — M Baye Diao
(74) *Attorney, Agent, or Firm* — Byrne Poh LLP

(57) ABSTRACT

The present disclosure shows a reconfigurable Dickson Star SC regulator that can support multiple conversion ratios by reconfiguring between various modes. The reconfigurable Dickson Star SC regulator is designed to reduce the number of redundant capacitors by reusing capacitors and switches across multiple modes of operation (across multiple conversion ratios). The present disclosure also shows a hybrid (e.g., two-stage) voltage regulator.

19 Claims, 35 Drawing Sheets

(56) References Cited

U.S. PATENT DOCUMENTS

| | | | | |
|---|---|---|---|---|
| 7,400,114 | B2* | 7/2008 | Anzawa | H02J 7/0016 320/119 |
| 7,531,987 | B2* | 5/2009 | Ohasi | H02J 7/0019 307/10.7 |
| 8,212,541 | B2* | 7/2012 | Perreault | H02M 3/07 323/282 |
| 8,259,476 | B2* | 9/2012 | Ben-Yaakov | H02M 3/07 363/60 |
| 8,693,224 | B1 | 4/2014 | Giuliano | |
| 8,817,501 | B1 | 8/2014 | Low et al. | |
| 9,143,032 | B2* | 9/2015 | Le | H02M 3/156 |
| 9,203,299 | B2* | 12/2015 | Low | H02M 3/073 |
| 9,966,852 | B1 | 5/2018 | Chen et al. | |
| 1,005,051 | A1 | 8/2018 | Chakraborty et al. | |
| 2001/0026460 | A1 | 10/2001 | Ito et al. | |
| 2004/0263121 | A1* | 12/2004 | Thrap | H02J 7/0016 320/119 |
| 2005/0140336 | A1* | 6/2005 | Anzawa | H02J 7/0016 320/118 |
| 2008/0007891 | A1 | 1/2008 | Doljack | |
| 2008/0203991 | A1* | 8/2008 | Williams | H02M 3/158 323/288 |
| 2011/0101938 | A1* | 5/2011 | Ma | H02M 3/07 323/282 |
| 2012/0069604 | A1 | 3/2012 | Yagyu et al. | |
| 2012/0187932 | A1 | 7/2012 | Singnurkar | |
| 2014/0043010 | A1* | 2/2014 | Salem | H02M 3/1584 323/311 |
| 2015/0022173 | A1* | 1/2015 | Le | H02M 3/158 323/282 |
| 2015/0061613 | A1* | 3/2015 | Kondou | H02M 3/158 323/271 |
| 2015/0097538 | A1* | 4/2015 | Le | H02M 3/158 323/271 |
| 2016/0285371 | A1 | 9/2016 | Fu | |
| 2017/0222538 | A1* | 8/2017 | Jung | H02M 3/07 |
| 2017/0300078 | A1 | 10/2017 | Puggelli et al. | |
| 2017/0300079 | A1* | 10/2017 | Puggelli | G05F 5/00 |
| 2018/0019667 | A1* | 1/2018 | Salem | H02M 3/07 |

OTHER PUBLICATIONS

International Search Report and Written Opinion dated Feb. 10, 2017 in International Patent Application No. PCT/US2017/027555.
International Search Report and Written Opinion dated Nov. 20, 2018 in International Patent Application No. PCT/US2018/049491.
Notice of Allowance dated Jan. 17, 2019 in U.S. Appl. No. 15/487,682.
Notice of Allowance dated Feb. 27, 2019 in U.S. Appl. No. 15/487,659.
Notice of Allowance dated Aug. 16, 2018 in U.S. Appl. No. 15/487,682.
Notice of Allowance dated Sep. 12, 2019 in U.S. Appl. No. 15/695,955.
Office Action dated Aug. 10, 2018 in U.S. Appl. No. 15/487,659.
Office Action dated Dec. 19, 2018 in EP Patent Application No. 17734522.0.
International Preliminary Report on Patentability dated Mar. 19, 2020 in International Patent Application No. PCT/US2018/049491, pp. 1-8.
Notice of Allowance dated Apr. 29, 2020 in Korean Patent Application No. 10-2020-7009539, pp. 1-11.
Office Action dated Jan. 16, 2020 in EP Patent Application No. 17734522.0.

* cited by examiner

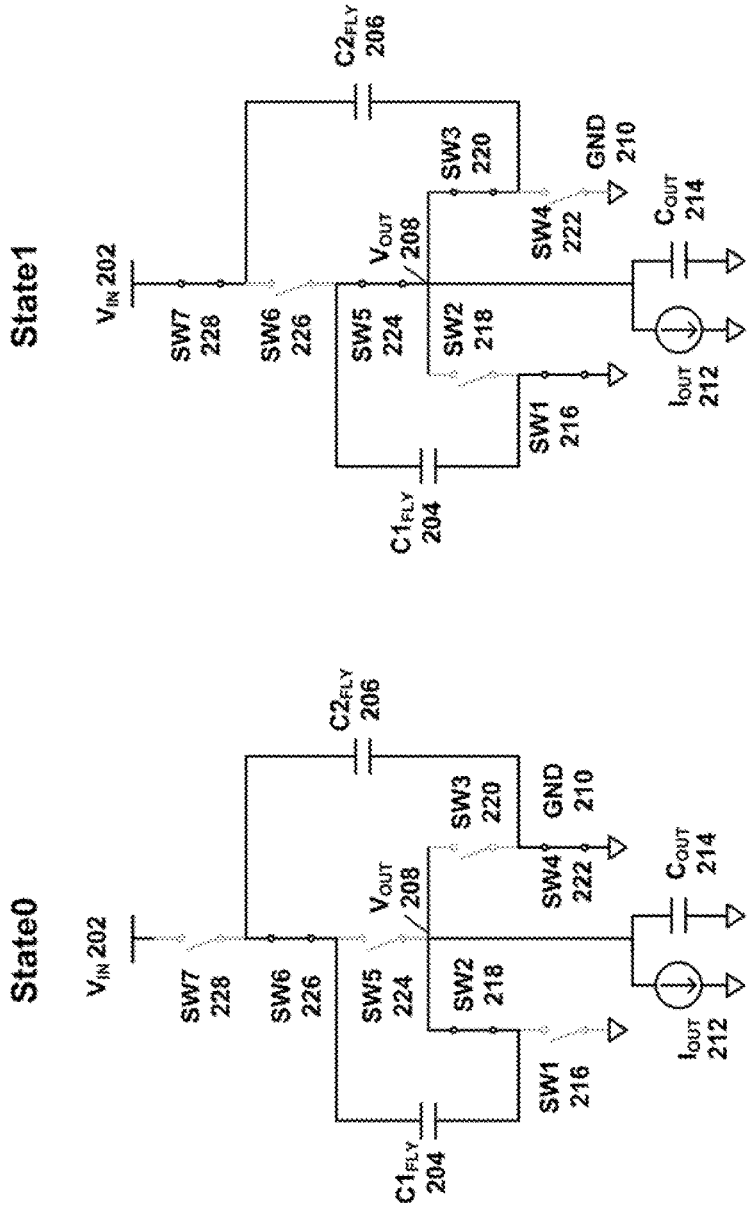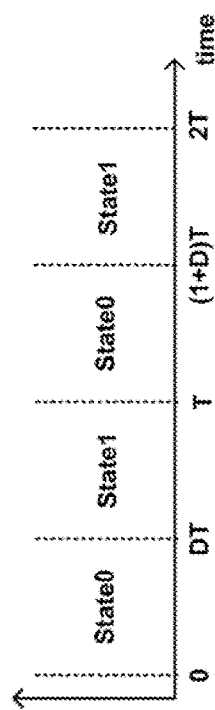

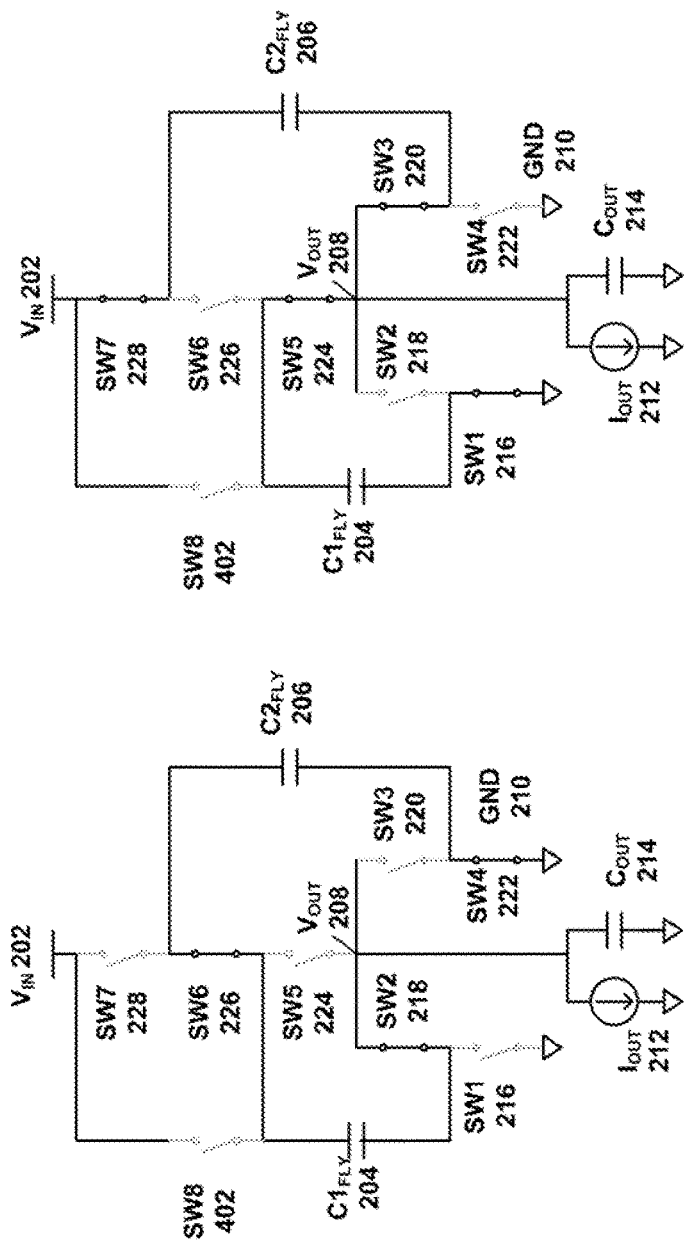

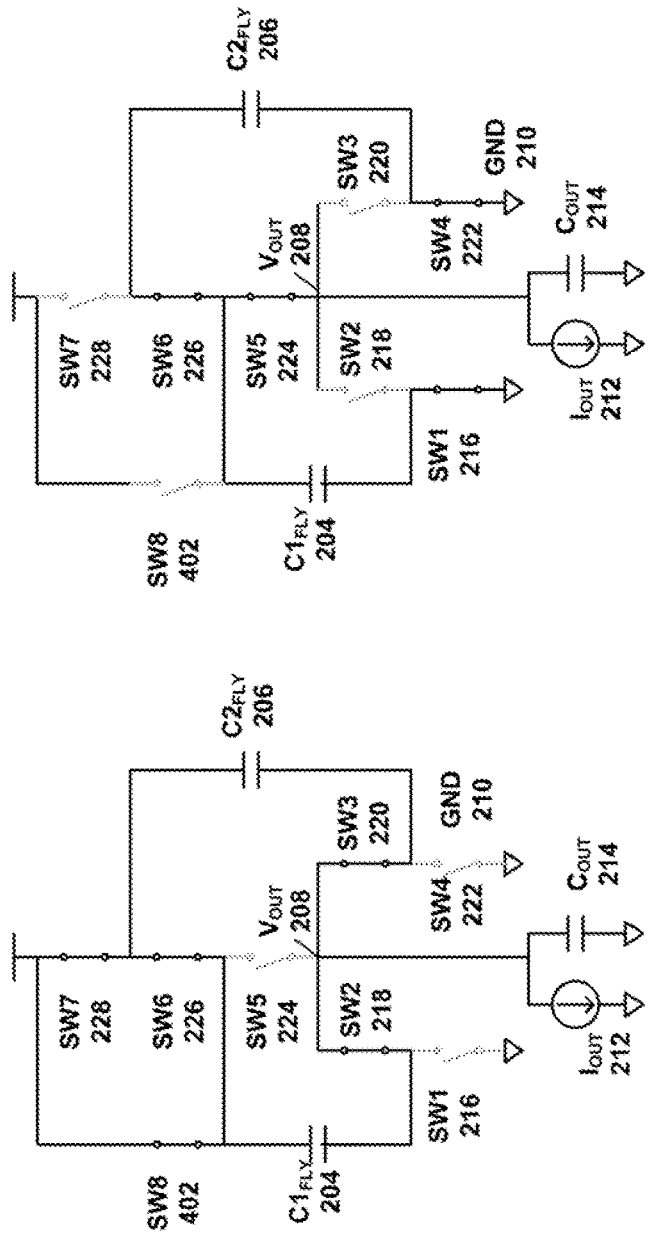
FIG. 6A State0
FIG. 6B State1
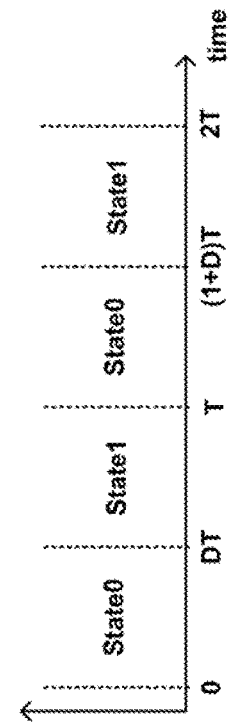
FIG. 6C

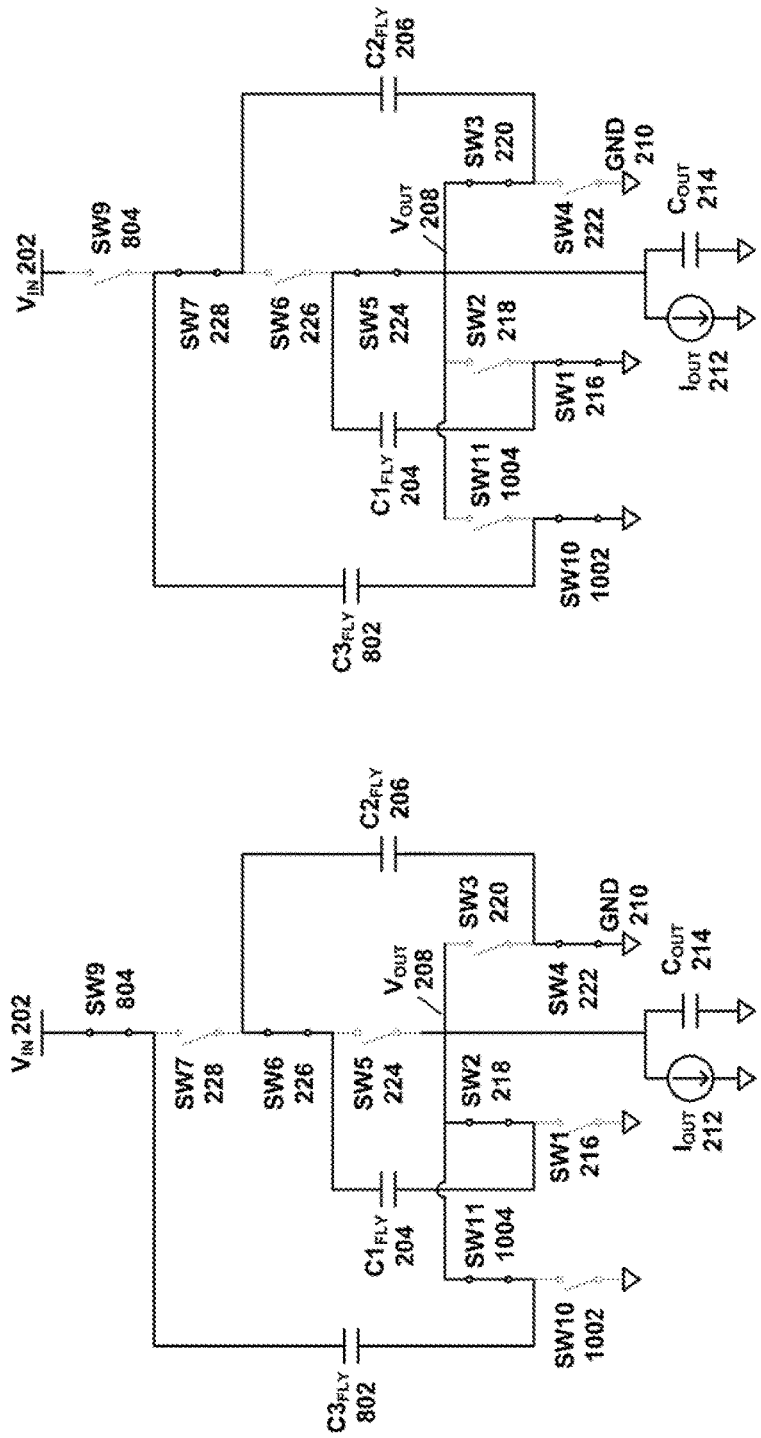
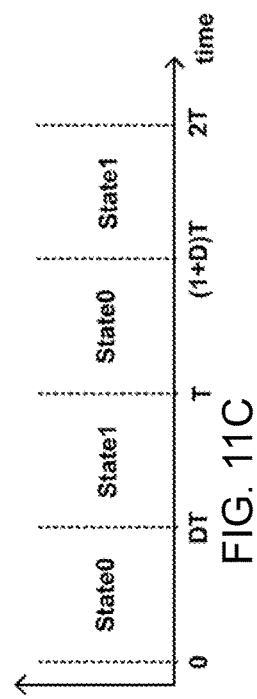
FIG. 11A
FIG. 11B
FIG. 11C

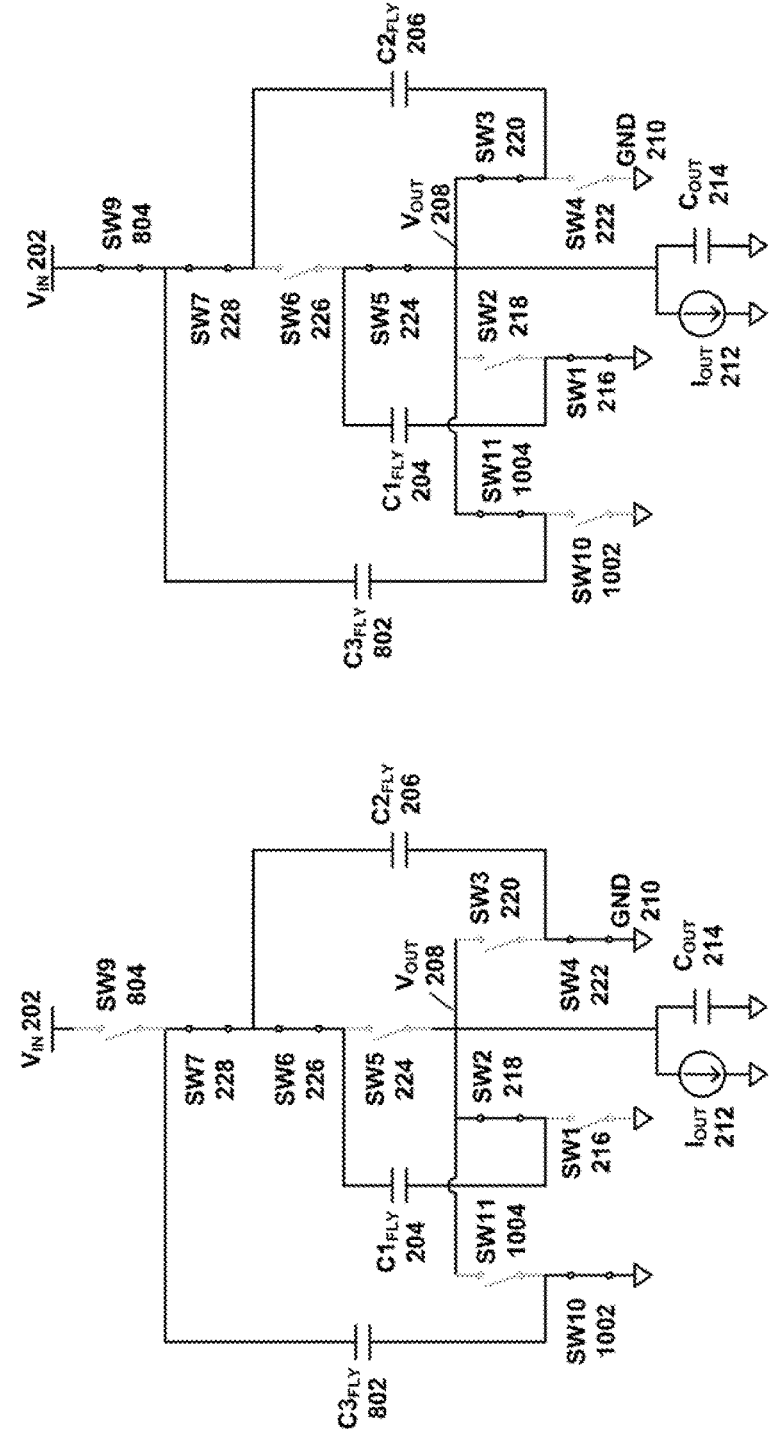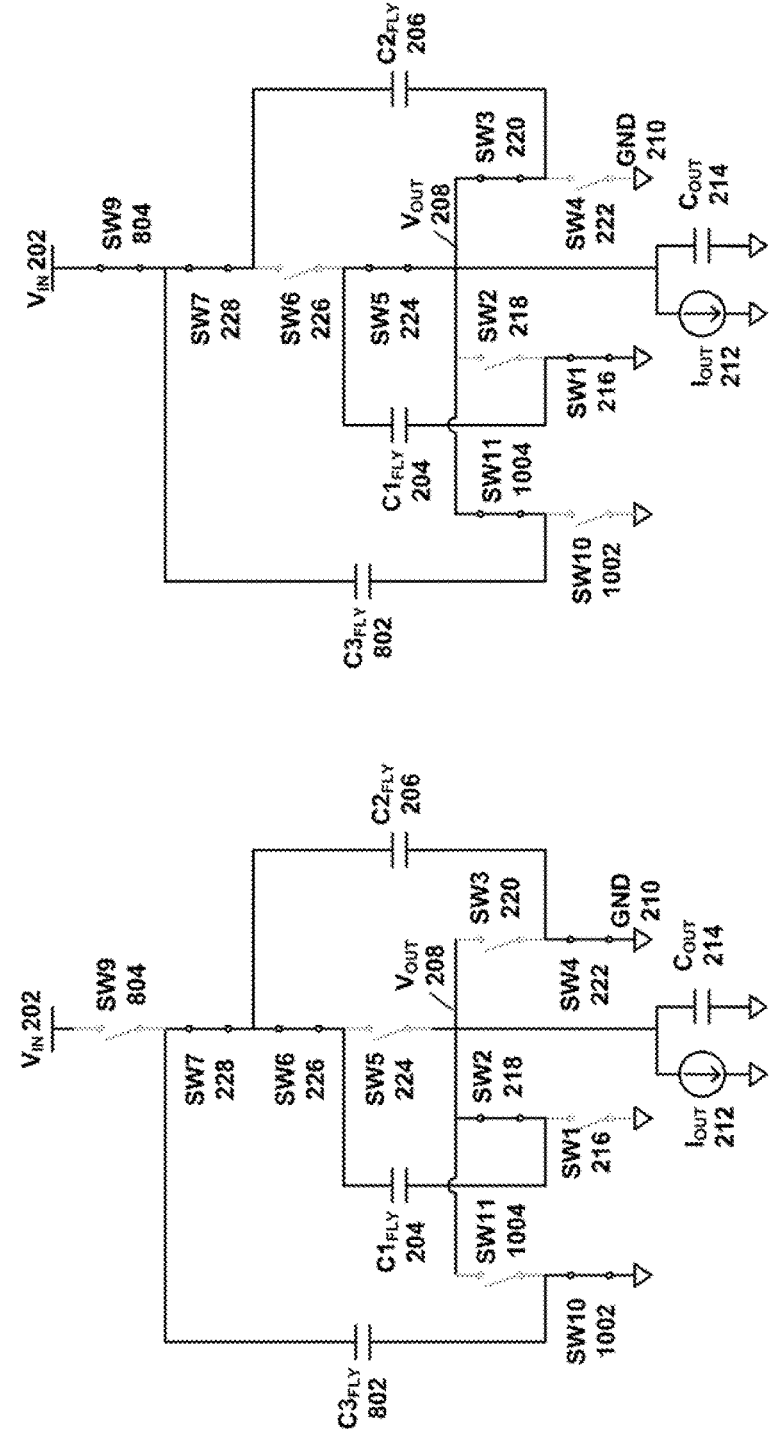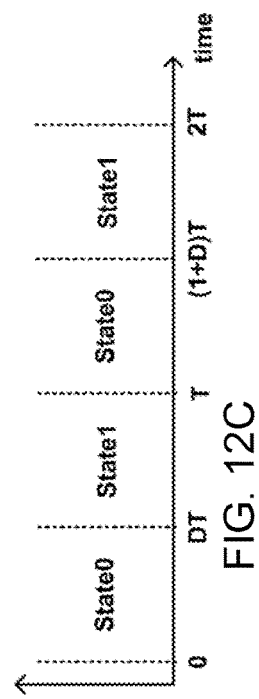

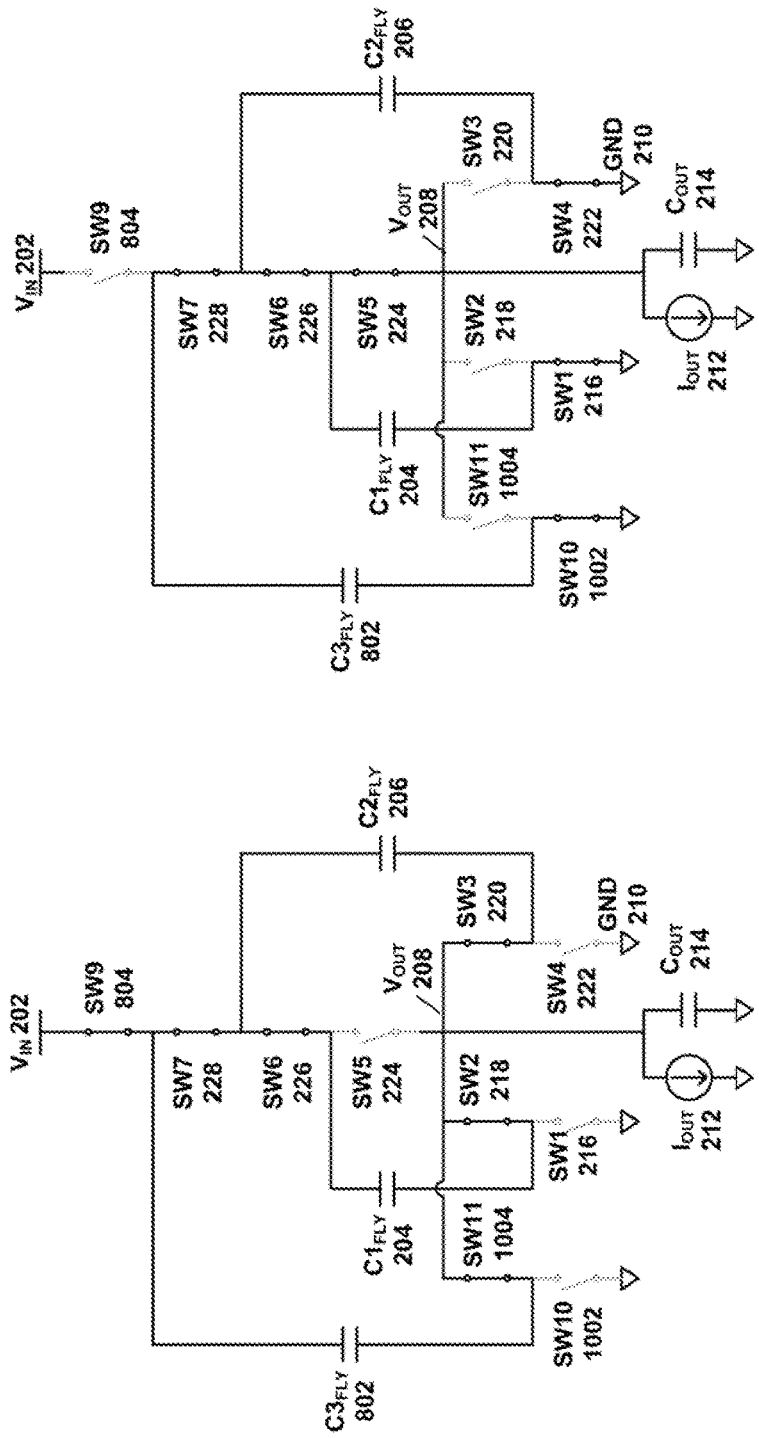
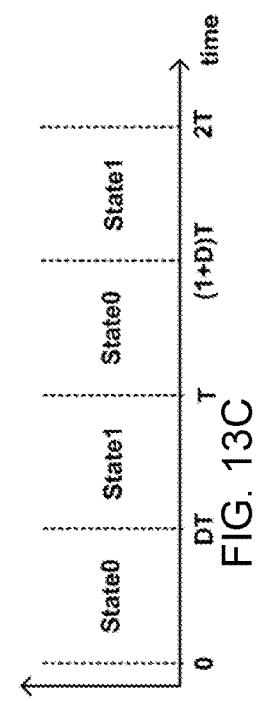
FIG. 13B State1
FIG. 13A State0
FIG. 13C

State0

State1

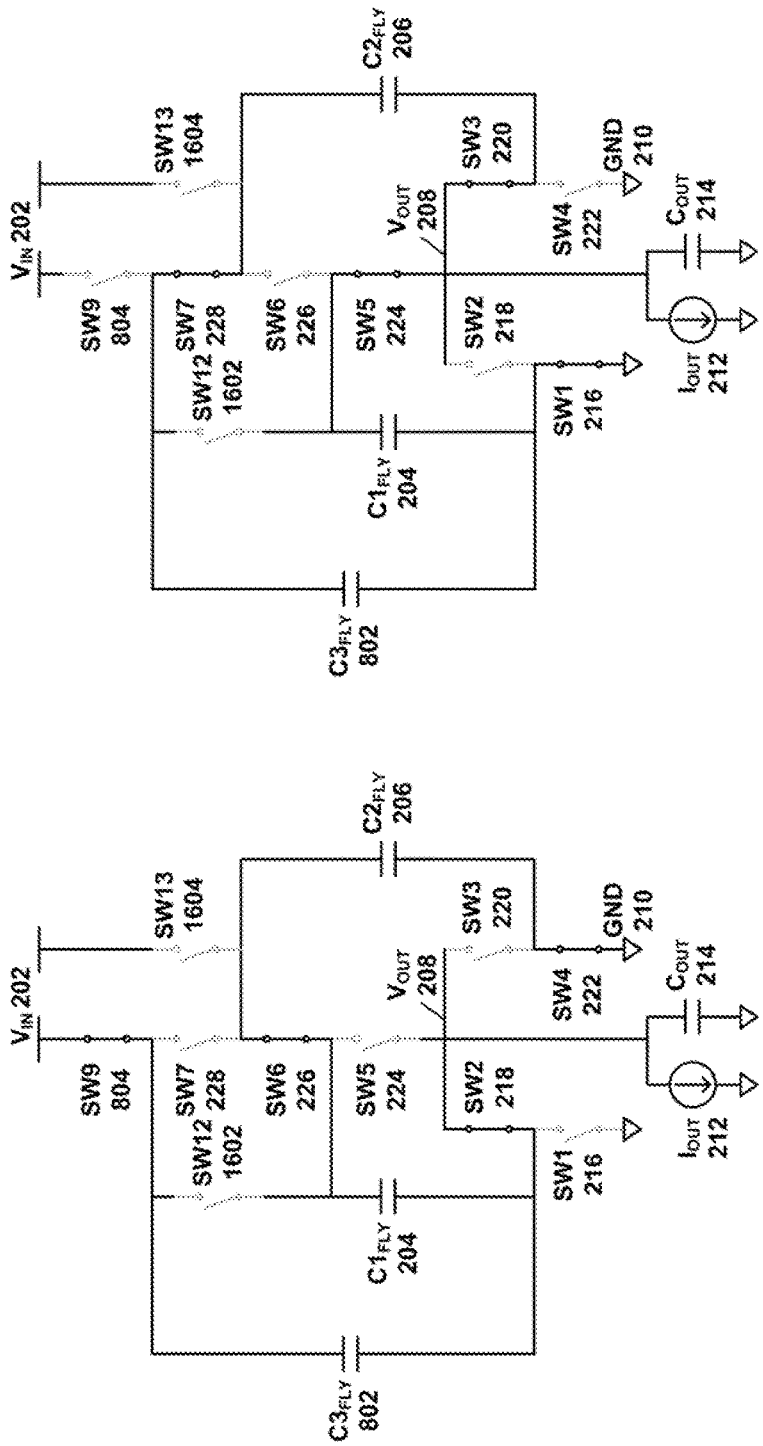
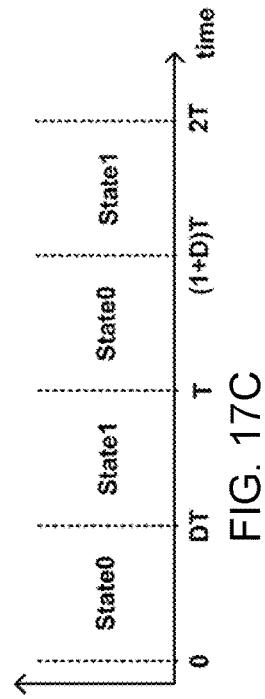
FIG. 17A  State0
FIG. 17B  State1
FIG. 17C

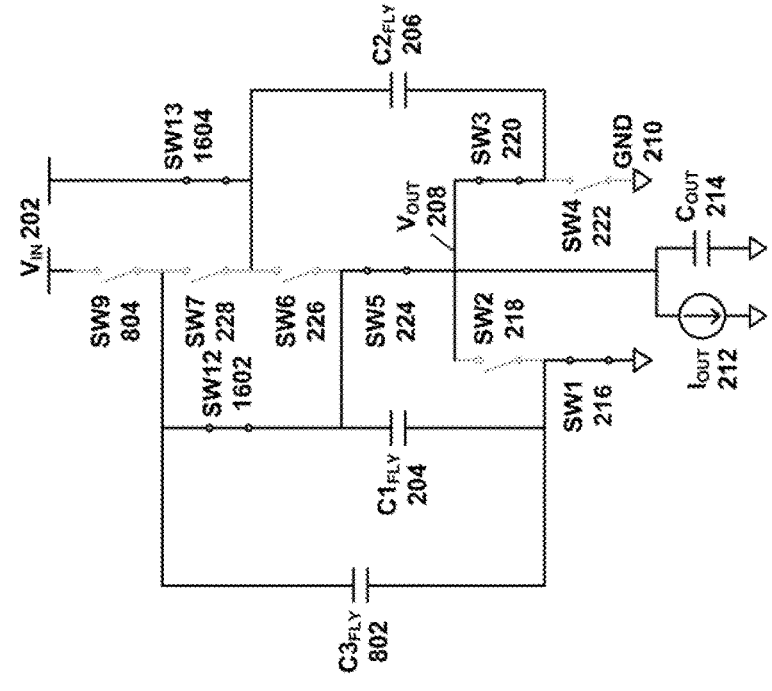
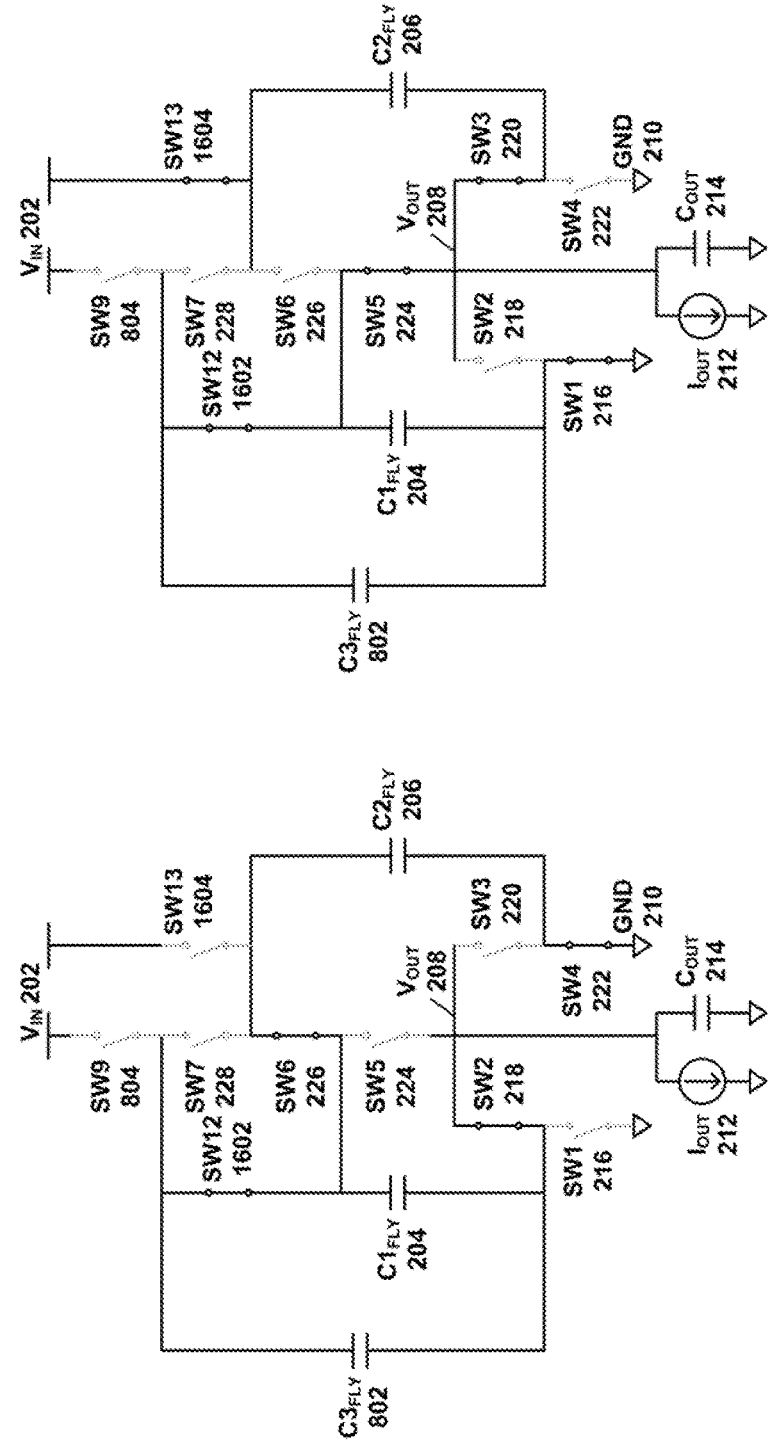
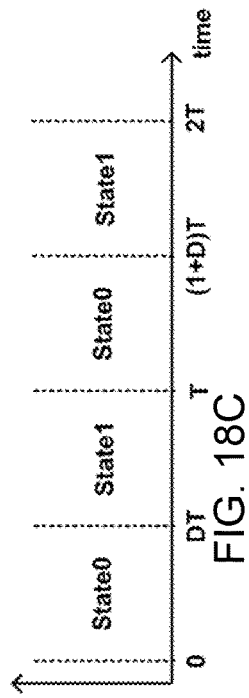

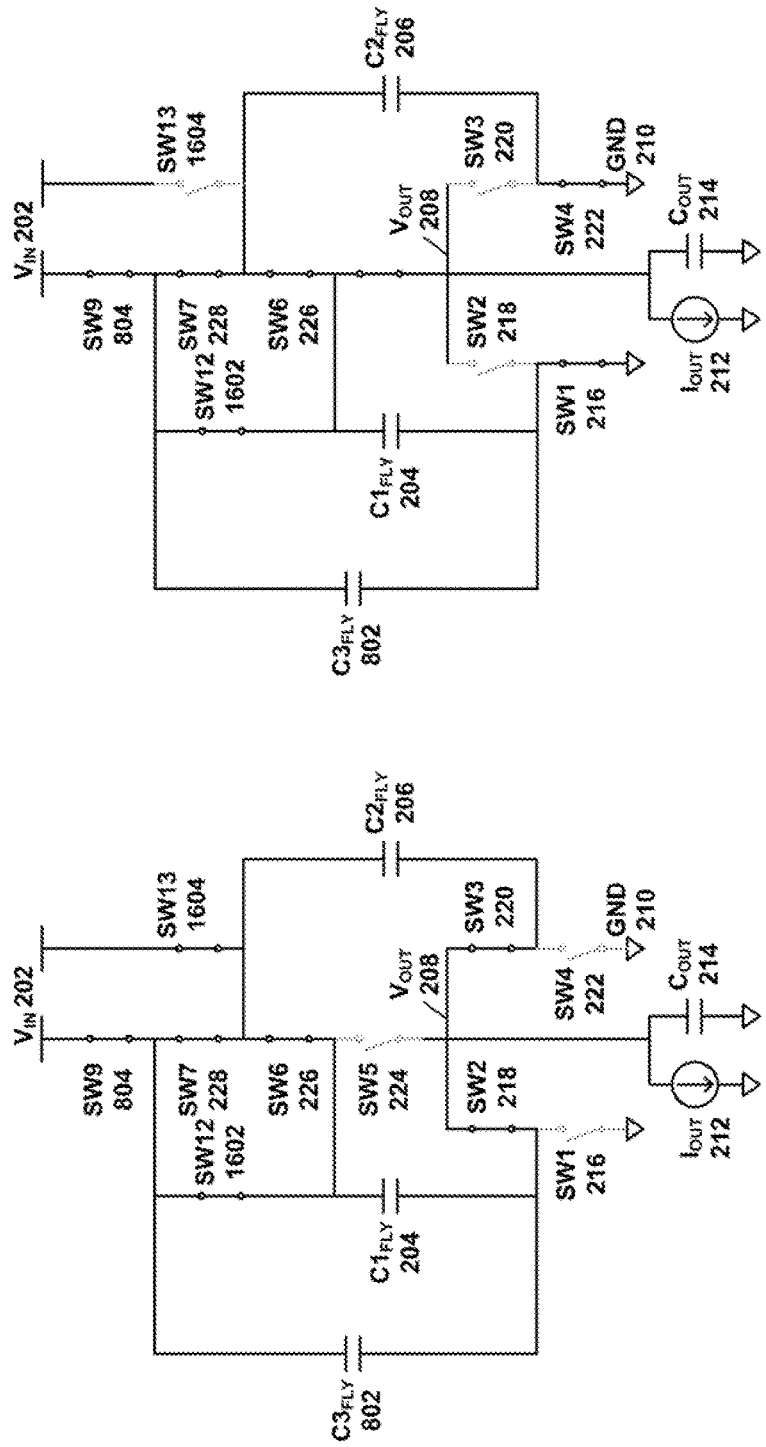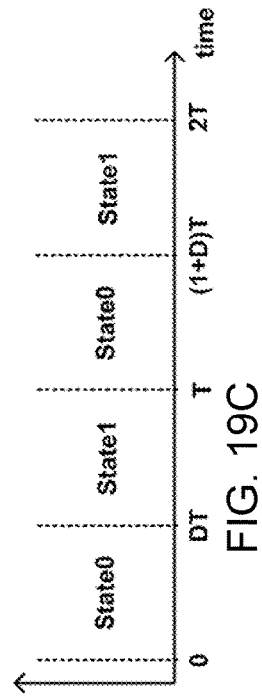

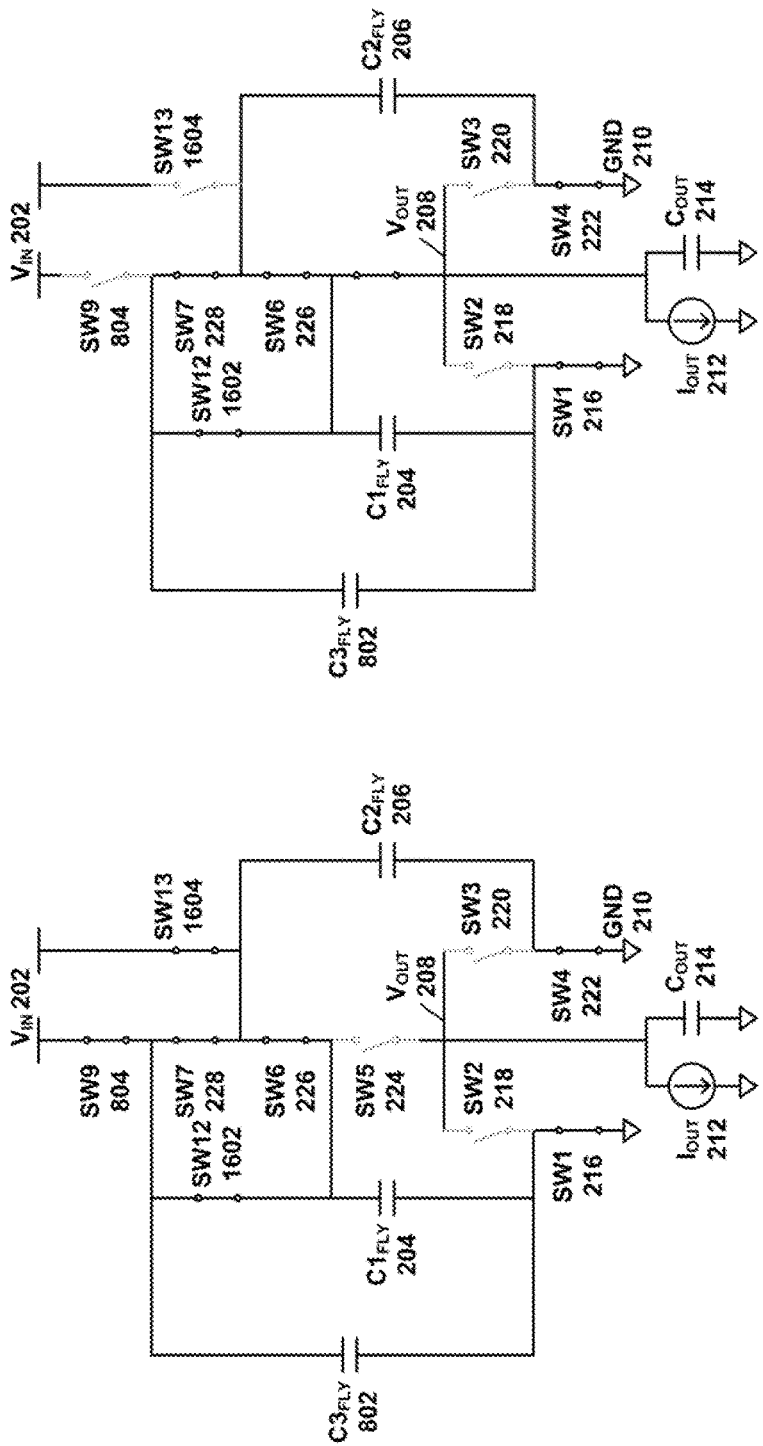
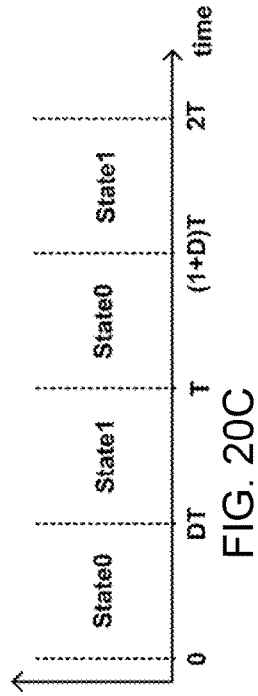
FIG. 20B State1
FIG. 20A State0
FIG. 20C

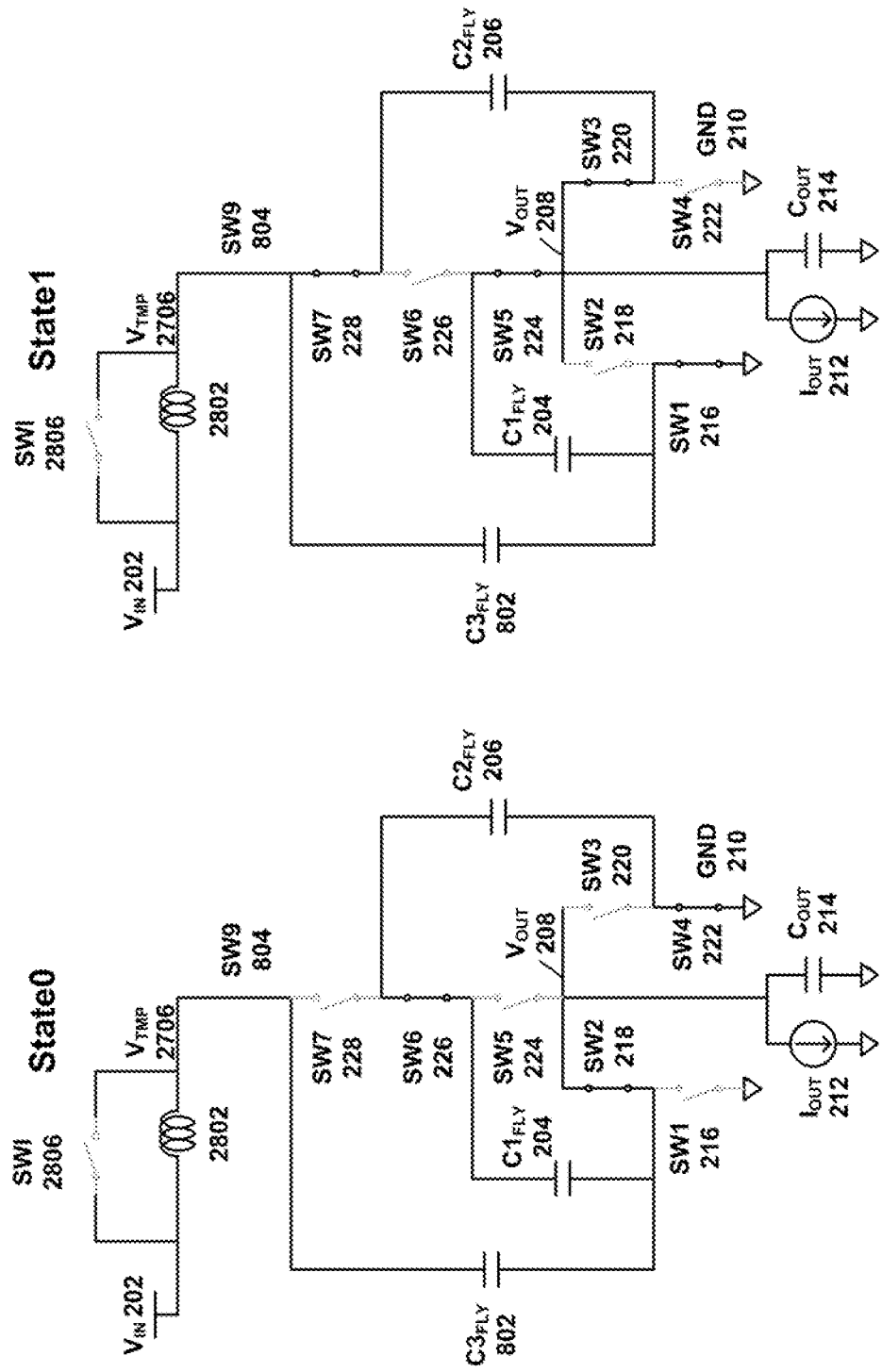

US 10,719,099 B2

RECONFIGURABLE DICKSON STAR SWITCHED CAPACITOR VOLTAGE REGULATOR

CROSS REFERENCE TO RELATED APPLICATIONS

This application is a continuation of U.S. patent application Ser. No. 15/487,682, filed Apr. 14, 2017, which claims benefit of U.S. Provisional Patent Application No. 62/324,091, filed Apr. 18, 2016, each of which is hereby incorporated by reference herein in its entirety.

STATEMENT REGARDING FEDERALLY SPONSORED RESEARCH OR DEVELOPMENT

This invention was made with government support under 1353640 and 1519788 awarded by the National Science Foundation (NSF). The government has certain rights in the invention.

TECHNICAL FIELD

The present disclosure relates to apparatuses, systems, and methods for providing a reconfigurable Dickson Star switched capacitor voltage regulator and/or providing a hybrid (e.g., two-stage) voltage regulator.

BACKGROUND

There is a strong demand to reduce the size of electronic systems. The size reduction is especially desirable in mobile electronics where space is a premium, but is also desirable in servers that are placed in big data centers since it is important to squeeze in as many servers as possible in a fixed real estate.

One of the largest components in electronic systems includes voltage regulators (also referred to as power regulators). Power regulators often include a large number of bulky off-chip components to deliver voltages to integrated chips, including processors, memory devices (e.g., a dynamic read access memory (DRAM)), radio-frequency (RF) chips, WiFi combo chips, and power amplifiers. Therefore, it is desirable to reduce the size of the voltage regulators in electronic systems.

Power regulators include semiconductor chips, such as a DC-DC regulator chip, that deliver power from a power source (e.g., a battery) to an output load. The output load can include a variety of integrated chips (e.g., an application processor, a DRAM, a NAND flash memory) in an electronic device. To efficiently deliver power, a voltage regulator can use a "buck" topology. Such a regulator is referred to as a buck regulator. A buck regulator transfers charges from the power source to the output load using an inductor. A buck regulator can use power switches to connect/disconnect the inductor to one of multiple voltages, thereby providing an output voltage that is a weighted average of the multiple voltages. A buck regulator can adjust the output voltage by controlling the amount of time the inductor is coupled to one of the multiple voltages.

Unfortunately, a buck regulator is not suitable for highly integrated electronic systems. The conversion efficiency of a buck regulator depends on the size of the inductor, in particular when the power conversion ratio is high and when the amount of current consumed by the output load is high. Because an inductor can occupy a large area and is bulky to integrate on-die or on-package, existing buck regulators often use a large number of off-chip inductor components. This strategy often requires a large area on the printed circuit board, which in turn increases the size of the electronic device. The challenge is exacerbated as mobile system-on-chips (SoCs) become more complex and need increasingly larger number of voltage domains to be delivered by the voltage regulator.

SUMMARY

Some embodiments of the disclosed subject matter include a voltage regulator for regulating an input voltage at an input terminal to an output voltage at an output terminal. The regulator includes a capacitor matrix having a first capacitor sub-matrix and a second capacitor sub-matrix. The regulator also includes a switch matrix having a first switch sub-matrix, a second switch sub-matrix, a third switch sub-matrix, a fourth switch sub-matrix, and a fifth switch sub-matrix. A capacitor in the first capacitor sub-matrix is coupled to the output terminal through an associated switch in the first switch sub-matrix and is further coupled to a ground terminal through an associated switch in the second switch sub-matrix. A capacitor in the second capacitor sub-matrix is coupled to the output terminal through an associated switch in the third switch sub-matrix and is further coupled to the ground terminal through an associated switch in the fourth switch sub-matrix. Also, the fifth switch sub-matrix has an N number of switches arranged in series between the input terminal and the output terminal, and each switch in the fifth switch sub-matrix is connected to an associated capacitor in the first capacitor sub-matrix and an associated capacitor in the second capacitor sub-matrix. A K number of switches in the fifth switch sub-matrix that are closest to the input terminal are turned on to reconfigure the voltage regulator to provide a conversion ratio of (N−K):1, wherein K is a non-negative value less than N.

In one or more embodiments disclosed herein, the switch matrix is configured to alternate between a first configuration and a second configuration at a predetermined duty-cycle while keeping the K number of switches turned on in order to regulate the input voltage to the output voltage at the conversion ratio of (N−K):1.

In one or more embodiments disclosed herein, one of the K number of switches is configured to parallelize one capacitor in the first capacitor sub-matrix and one capacitor in the second capacitor sub-matrix that are connected to the one of the K number of switches.

In one or more embodiments disclosed herein, a first switch in the second switch matrix coupled to the one capacitor in the first capacitor sub-matrix and a second switch in the fourth switch matrix coupled to the one capacitor in the second capacitor sub-matrix are controlled using a same switch signal.

In one or more embodiments disclosed herein, a first switch in the first switch matrix coupled to the one capacitor in the first capacitor sub-matrix and a second switch in the third switch matrix coupled to the one capacitor in the second capacitor sub-matrix are controlled using a same switch signal.

In one or more embodiments disclosed herein, K is zero.

In one or more embodiments disclosed herein, K is N−1.

In one or more embodiments disclosed herein, K is a value in a range of 0 and N−1.

In one or more embodiments disclosed herein, a number of switches in the fifth switch sub-matrix is N.

Some embodiments of the disclosed subject matter include a voltage regulator for regulating an input voltage at an input terminal to an output voltage at an output terminal. The regulator includes a capacitor matrix having a first capacitor sub-matrix and a second capacitor sub-matrix. The regulator also includes a switch matrix having a first switch sub-matrix, a second switch sub-matrix, and a third switch sub-matrix. One switch in the first switch sub-matrix is coupled to two associated capacitors in the first capacitor sub-matrix. One switch in the second switch sub-matrix is coupled to two associated capacitors in the second capacitor sub-matrix. The third switch sub-matrix has an N number of switches arranged in series between the input terminal and the output terminal, and each switch in the third switch sub-matrix is connected to an associated capacitor in the first capacitor sub-matrix and an associated capacitor in the second capacitor sub-matrix. A K number of switches in the first switch sub-matrix and the second switch sub-matrix, excluding a top switch in the first switch sub-matrix that is connected to the input terminal, that are closest to the input terminal are turned on to reconfigure the voltage regulator to provide a conversion ratio of (N−K):1, wherein K is a non-negative value less than N.

In one or more embodiments disclosed herein, a K number of switches in the third switch sub-matrix, excluding a top switch in the third switch sub-matrix that is connected to the input terminal, are turned off to reconfigure the voltage regulator to provide the conversion ratio of (N−K):1.

In one or more embodiments disclosed herein, the switch matrix is configured to alternate between a first configuration and a second configuration at a predetermined duty-cycle while keeping the K number of switches in the third switch sub-matrix turned on in order to regulate the input voltage to the output voltage at the conversion ratio of (N−K):1.

In one or more embodiments disclosed herein, when K is an odd number, the top switch in the third switch sub-matrix is turned off in both the first configuration and the second configuration, and wherein when K is an even number, the top switch in the first switch sub-matrix is turned off in both the first configuration and the second configuration.

In one or more embodiments disclosed herein, each capacitor in the first capacitor sub-matrix is coupled to the ground terminal through a first switch and is coupled to the output terminal through a second switch.

In one or more embodiments disclosed herein, each capacitor in the second capacitor sub-matrix is coupled to the output terminal through a third switch and is coupled to the ground terminal through a fourth switch.

Some embodiments of the disclosed subject matter include an apparatus. The apparatus includes a means for reconfiguring a voltage regulator to modify a conversion ratio from N:1 to (N−K):1, wherein K is a non-negative value less than N.

In one or more embodiments disclosed herein, the voltage regulator is a Dickson Star voltage regulator.

Some embodiments of the disclosed subject matter include a voltage regulator configured to receive a first voltage signal and provide a final voltage signal based, at least in part, on the first voltage signal. The voltage regulator includes a switched-inductor regulator consisting of an inductor, wherein a first terminal of the inductor comprises an input terminal of the switched-inductor regulator configured to receive the first voltage signal, and a second terminal of the inductor comprises an output terminal of the switched-inductor regulator configured to provide an intermediate voltage signal. The voltage regulator includes a step-down regulator comprising an input terminal configured to receive the intermediate voltage signal from the output terminal of the switched-inductor regulator, a switch matrix, a plurality of capacitors, and an output terminal, configured to provide the final voltage signal. The voltage regulator also includes a control module configured to cause the switch matrix in the step-down regulator to alternate between a first configuration and a second configuration to arrange the plurality of capacitors in a first arrangement and a second arrangement, respectively, with a predetermined duty cycle, thereby also duty-cycling the inductor in the switched-inductor regulator.

In one or more embodiments disclosed herein, the switched-inductor regulator is switchless.

In one or more embodiments disclosed herein, when the switch matrix is in a first configuration, the intermediate voltage signal is at a first voltage level, and when the switch matrix is in a second configuration, the intermediate voltage signal is at a second voltage level.

In one or more embodiments disclosed herein, the first voltage level is a first fractional multiple of the final voltage signal, and wherein the second voltage level is a second fractional multiple of the final voltage signal.

In one or more embodiments disclosed herein, the step-down regulator comprises a Dickson Star switched capacitor regulator.

In one or more embodiments disclosed herein, the Dickson Star switched capacitor regulator comprises a reconfigurable Dickson Star switched capacitor regulator.

Some embodiments of the disclosed subject matter include a voltage regulator configured to receive a first voltage signal and provide a final voltage signal based, at least in part, on the first voltage signal. The voltage regulator includes a switched-inductor regulator consisting of an inductor, wherein a first terminal of the inductor comprises an input terminal of the switched-inductor regulator configured to receive the first voltage signal, and a second terminal of the inductor comprises an output terminal of the switched-inductor regulator configured to provide an intermediate voltage signal. The voltage regulator includes a step-down regulator having an input terminal configured to receive the intermediate voltage signal from the output terminal of the switched-inductor regulator, and an output terminal configured to provide the final voltage signal. The voltage regulator also includes a first switched capacitor regulator module. The first switched capacitor regulator module has a switch matrix comprising a first switch configured to couple the first switched capacitor regulator module to the input terminal of the step-down regulator, and a plurality of capacitors. The voltage regulator also includes a second switched capacitor regulator module. The second switched capacitor regulator includes a switch matrix comprising a second switch configured to couple the second switched capacitor regulator module to the input terminal of the step-down regulator, and a plurality of capacitors. The voltage regulator also includes a control module configured to cause the switch matrix in the first switched capacitor regulator module to alternate between a first configuration and a second configuration to arrange the plurality of capacitors in the first switched capacitor regulator module in a first arrangement and a second arrangement, respectively, with a first duty cycle, cause the switch matrix in the second switched capacitor regulator module to alternate between a third configuration and a fourth configuration to arrange the plurality of capacitors in the second switched capacitor regulator module in a third arrangement and a fourth arrangement, respectively, with the first duty cycle, and cause the first switch and the second switch to alternately couple the first switched capacitor regulator module and the second switched capacitor regulator module at a second duty cycle.

In one or more embodiments disclosed herein, the first switched capacitor regulator module and the second switched capacitor regulator module operate out-of-phase.

In one or more embodiments disclosed herein, the first switched capacitor regulator module and the second switched capacitor regulator comprise an identical switched capacitor regulator topology.

In one or more embodiments disclosed herein, alternately coupling the first switched capacitor regulator module and the second switched capacitor regulator module at the second duty cycle causes duty-cycling of the inductor in the switched-inductor regulator at the second duty cycle.

In one or more embodiments disclosed herein, the second duty cycle is 0.5.

In one or more embodiments disclosed herein, the control module is configured to determine a time instance at which to begin alternate coupling of the first switched capacitor regulator module and the second switched capacitor regulator module to provide a desired duty cycle of the switched-inductor regulator.

In one or more embodiments disclosed herein, the inductor is provided as a discrete component on-package or on-board.

Some embodiments of the disclosed subject matter include an electronic system. The electronic system includes a voltage regulator according to one or more embodiments disclosed herein, and a target load system coupled to the voltage regulator, wherein the output terminal of the step-down regulator in the voltage regulator is coupled to the target load system.

In one or more embodiments disclosed herein, the target load system includes a battery and the voltage regulator is configured to receive the first voltage signal from a power line of a Universal Serial Bus and to provide the final voltage signal to the battery.

In one or more embodiments disclosed herein, the target load system comprises a System on Chip (SoC), and the SoC and the voltage regulator are packaged in a single SoC package.

In one or more embodiments disclosed herein, the target load system comprises a System on Chip (SoC), and the SoC and the voltage regulator are provided on a printed circuit board (PCB).

Some embodiments of the disclosed subject matter include an electronic system. The electronic system includes a voltage regulator according to one or more embodiments disclosed herein. The voltage regulator is configured to operate in a reverse direction in which the output terminal of the step-down regulator in the voltage regulator is coupled to an input voltage source and the first input terminal of the switched-inductor regulator is coupled to a target load of the voltage regulator.

In one or more embodiments disclosed herein, the electronic system operating the voltage regulator in a reverse direction is configured to operate the voltage regulator as a step-up regulator.

In one or more embodiments disclosed herein, the output terminal of the step-down regulator is coupled to a battery and the input terminal of the switched-inductor regulator is coupled to a power line of a Universal Serial Bus.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A-3C illustrate an operation of a 3:1 step-down Dickson Star SC regulator.

FIGS. 5A-5C illustrate an operation of the reconfigurable regulator in FIG. 4 for the conversion ratio of 3:1 in accordance with some embodiments.

FIGS. 6A-6C illustrate an operation of the reconfigurable regulator in FIG. 4 for the conversion ratio of 2:1 in accordance with some embodiments.

FIGS. 11A-11C illustrate the operation of a 4:1 reconfigurable Dickson Star SC regulator in a 4:1 conversion mode in accordance with some embodiments.

FIGS. 12A-12C illustrate the operation of a 4:1 reconfigurable Dickson Star SC regulator in a 3:1 conversion mode in accordance with some embodiments.

FIGS. 13A-13C illustrate the operation of a 4:1 reconfigurable Dickson Star SC regulator in a 2:1 conversion mode in accordance with some embodiments.

FIGS. 14A-14C illustrate the operation of a 4:1 reconfigurable Dickson Star SC regulator in a 1:1 conversion mode in accordance with some embodiments.

FIGS. 17A-17C illustrate the operation of a 4:1 reconfigurable Dickson Star SC regulator in a 4:1 conversion mode in accordance with some embodiments.

FIGS. 18A-18C illustrate the operation of a 4:1 reconfigurable Dickson Star SC regulator in a 3:1 conversion mode in accordance with some embodiments.

FIGS. 19A-19C illustrate the operation of a 4:1 reconfigurable Dickson Star SC regulator in a 2:1 conversion mode in accordance with some embodiments.

FIGS. 20A-20C illustrate the operation of a 4:1 reconfigurable Dickson Star SC regulator in a 1:1 conversion mode in accordance with some embodiments.

FIGS. 29A-29B illustrate an operation of a two-stage regulator in FIG. 28 in which the SC regulator is a 4:1 Dickson Star switched-capacitor (SC) regulator in accordance with some embodiments.

DETAILED DESCRIPTION

Figure 1A:
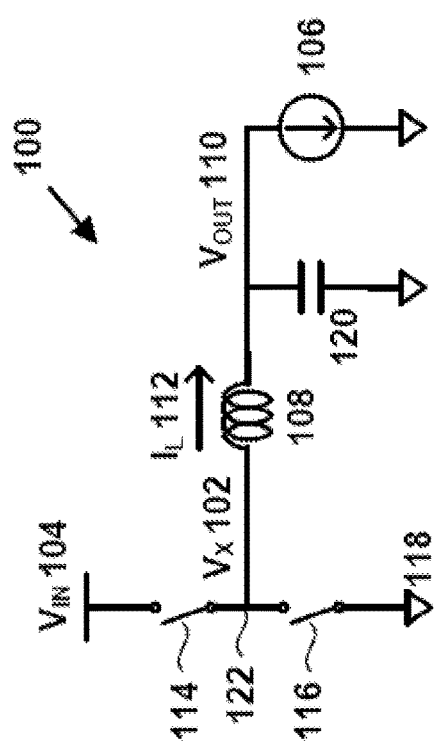
FIGS. 1A-1B illustrate a buck regulator and its operation.

In the following description, numerous specific details are set forth regarding the apparatuses, systems, and methods of the disclosed subject matter and the environment in which such apparatuses, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other apparatuses, systems, and methods that are within the scope of the disclosed subject matter.

Modern electronic systems have been tightly integrated as a system-on-chip (SoC) that incorporates multiple processing cores and heterogeneous components (e.g., memory controllers, hardware accelerators) within a single chip. The popularity of SoCs, coupled with tighter power budgets, motivates controlling the voltage and frequency at a block-specific granularity. The block-specific voltage control can allow the electronic system to raise only the voltage of the core(s) that desires higher performance. Such a block-specific voltage control can improve power and/or performance.

However, traditional approaches of dynamic voltage and frequency scaling (DVFS) have been performed at a coarse-grain level due to cost and size limitations of off-chip voltage regulators. Moreover, traditional DVFS schemes were limited to a slow voltage/frequency scaling at the micro-second timescale due to the slow speed of off-chip voltage regulators. Faster DVFS in nano-second timescale can save significantly more power consumed by the SoC by closely tracking the SoC voltage to the rapidly changing computation demand.

Given these drawbacks of off-chip voltage regulators, there has been a surge of interest in building integrated voltage regulators (IVR) to reduce board size and enable nanosecond timescale, per-core DVFS. An IVR can include a variety of voltage regulators, including a switching regulator and a low-dropout linear regulator. IVRs that can reduce the board size and can enable nanosecond timescale, per-core DVFS are disclosed in articles authored by inventors of the present application, including an article entitled "System Level Analysis of Fast, Per-Core DVFS using On-Chip Switching Regulators," published in IEEE International Symposium on High-Performance Computer Architecture (HPCA) in February 2008, by Wonyoung Kim et al.; an article entitled "Design Techniques for Fully Integrated Switched-Capacitor DC-DC Converters," published in IEEE Journal of Solid-State Circuits (JSSC) in September 2011, by Hanh-Phuc Le et al.; and an article entitled "A Fully-Integrated 3-Level DC/DC Converter for Nanosecond-Scale DVFS," published in IEEE Journal of Solid-State Circuits (JSSC) in January 2012, by Wonyoung Kim et al., each of which is hereby incorporated herein by reference in its entirety.

Figure 1B:
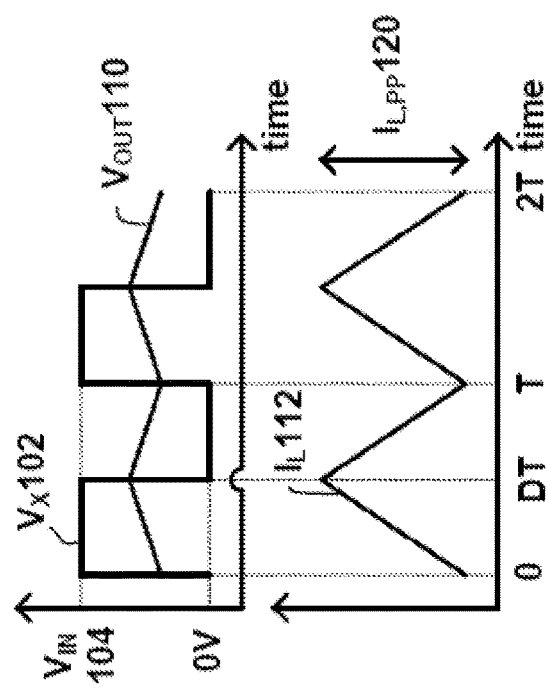

A switching regulator can include a buck regulator. FIGS. 1A-1B illustrate a buck regulator and its operation. As illustrated in FIG. 1A, the buck regulator 100 can include an inductor 108 and two switches 114, 116. The buck regulator 100 can connect the inductor 108 to a first voltage source $V_{IN}$ 104 and a second voltage source 118 through a set of power switches 114, 116. In some cases, the second voltage source 118 can include a ground voltage source. The power switches 114, 116 can be turned on and off using external inputs. In some cases, the power switches 114, 116, can be controlled so that the two switches are not turned on at the same time. The power switches 114, 116 can include transistors. The transistors can include a MOSFET transistor. For example, the switch 114 can include a P-channel MOSFET transistor; the switch 116 can include an N-channel MOSFET transistor.

As illustrated in FIG. 1B, as the power switches 114, 116 turn on and off with a period T, the input of the inductor $V_X$ 102 can swing between 0 and $V_{IN}$ with a period T. The inductor 108 and capacitor 120 operate as a low-pass filter that averages $V_X$ 102 over time, thereby creating a signal at the regulator output $V_{OUT}$ 110 with a small voltage ripple. The output voltage $V_{OUT}$ 110 can depend on the amount of time the inductor 108 is coupled to the first voltage source $V_{IN}$ 104 and the amount of time the inductor 108 is coupled to the second voltage source 118. For example, the buck regulator 100 can adjust the level of $V_{OUT}$ 510 to $V_{IN}$D+ (0V)(1−D), where D, a number between 0 and 1, is the portion of time $V_X$ is coupled to $V_{IN}$. D is also referred to as a duty cycle. The output load that consumes the current 106 can be any type of an electronic device, including processors, memory (DRAM, NAND flash), RF chips, WiFi combo chips, and power amplifiers.

The efficiency of the buck regulator 100 can be computed as:

$$\eta = \frac{P_L}{P_O}$$

where $P_L$ indicates the power delivered to the output load 106 and $P_O$ indicates the output power of the buck regulator 108. $P_L$ can be computed as follows: $P_L = P_O - P_{LOSS}$, where $P_{LOSS}$ includes the amount of power losses during the voltage regulation process.

One of the major power losses $P_{LOSS}$ associated with a buck regulator 100 includes a resistive loss $P_R$ incurred by the parasitic resistance of the inductor 108. When the buck regulator 100 delivers power to the output load 106 by providing current 112, ideally, the buck regulator 100 provides all of its output power to the output load 106. However, in a practical scenario, the buck regulator 100 dissipates some of its output power internally at the inductor 108. Ideally, an inductor 108 has zero resistance. Therefore, a current through the inductor 108 would not dissipate any power. However, in a practical scenario, an inductor 108 is associated with a finite resistance, primarily due to the resistance of the material forming the inductor 108. This undesirable, finite resistance of the inductor 108 is referred to as a parasitic resistance. The parasitic resistance can incur a resistive power loss since the parasitic resistance can cause the current through the inductor 108 to dissipate energy. Therefore, the resistive power loss can reduce the power conversion efficiency of the buck regulator 100.

When the current is alternating, then the resistive power loss can be computed as $P_R = I_{L,RMS}^2 R_L$, where $R_L$ is the value of the parasitic resistance of the inductor 108, and $I_{L,RMS}$ is the root-mean square of the current through the inductor 108. $I_{L,RMS}$ can be reduced by reducing the peak-to-peak ripple of the inductor current ($I_{L,PP}$ 120). Therefore, the buck regulator 100 can reduce the resistive loss $P_R$ by reducing the peak-to-peak ripple of the inductor current $I_{L,PP}$ 120.

There are two ways to reduce the peak-to-peak ripple of the inductor current $I_{L,PP}$ 120. First, the buck regulator 100 can switch at a high frequency and reduce the period of the switching regulator T. However, this solution can increase the power consumed to charge and discharge the parasitic capacitance at the junction 208 between switches 114, 116. This capacitive power loss can be significant because the size of the switches 114, 116 can be large, which increases the parasitic capacitance, and because the voltage swing on $V_X$ 202 is large. This capacitive power loss can be computed as follows: $P_C = fCV^2$, where C is the amount of the parasitic capacitance at the junction 208, f is the frequency at which the buck regulator 100 switches, and V is the voltage swing at the junction 208. This power loss can be significant because the size of the switches 114, 116 is large, which increases the parasitic capacitance, and because the voltage swing on $V_X$ 202 is large.

Second, the buck regulator 100 can use an inductor 108 with a high inductance value, thereby reducing the parasitic resistance $R_L$. However, this approach makes the inductor 108 large and makes integration difficult.

A switching regulator can also include a switched-capacitor (SC) regulator. An SC regulator can use one or more capacitors, instead of inductors, to transfer charges from a power source to an output load. An SC regulator can use power switches to connect/disconnect one or more capacitors to one of multiple voltages, thereby providing an output voltage that is a weighted average of the multiple voltages. The SC regulator can control the output voltage by changing the configuration and the sequence in which capacitors are coupled to one another. Because capacitors are easier to integrate on-die or on-package than inductors, it is easier to implement SC IVRs with a small size.

Figure 2:
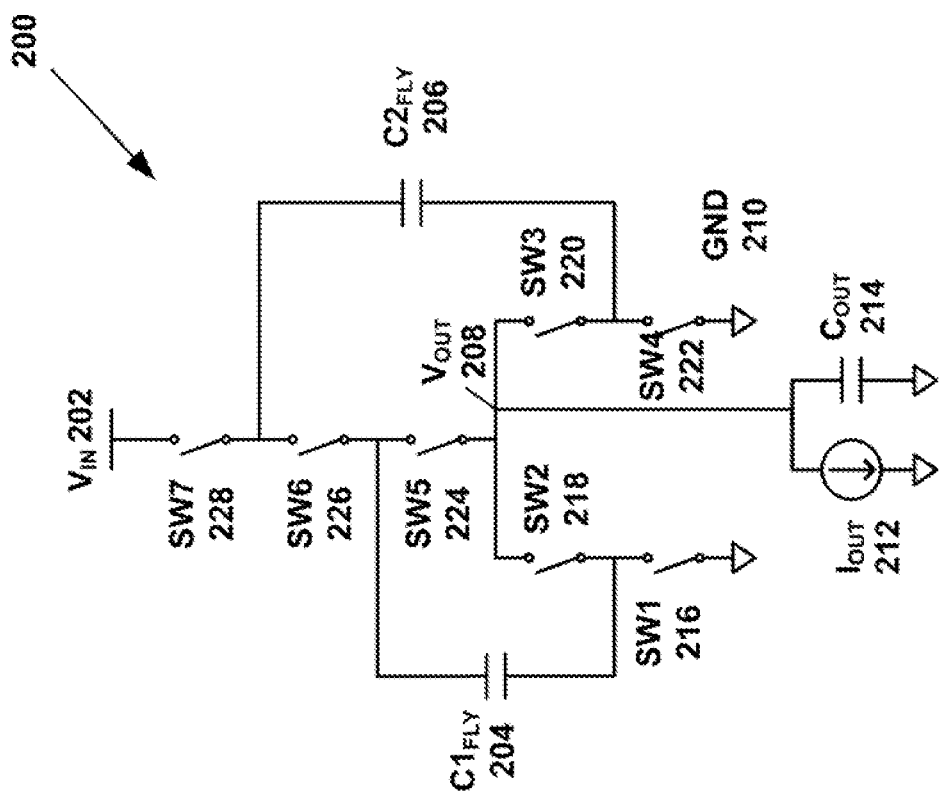
FIG. 2 shows a 3:1 step-down Dickson Star SC regulator.

One type of a SC regulator is a Dickson Star regulator. An example of a 3:1 step-down Dickson Star SC regulator (a step-down Dickson Star SC regulator that is configured to divide an input voltage level by ⅓) is illustrated in FIG. 2. The Dickson Star SC regulator has several advantages compared to other SC regulator topologies. First, it uses fewer capacitors compared to other SC regulator topologies, such as a ladder type SC regulator. Second, it can use, as switches, transistors with lower voltage ratings compared to other SC regulator topologies, such as a series to parallel SC regulator. Third, it can be more easily scaled to higher input voltages compared to other SC regulator topologies, such as a series to parallel SC regulator.

A Dickson Star SC regulator 200 can include switching capacitors $C1_{FLY}$ 204 and $C2_{FLY}$ 206, and a switch matrix including a plurality of switches 216-228 configured to electrically couple the switching capacitors $C1_{FLY}$ 204 and $C2_{FLY}$ 206 to an input voltage node $V_{IN}$ 202, an output voltage node $V_{OUT}$ 208, and a ground node GND 210. The output node $V_{OUT}$ 208 is coupled to an output load $I_{OUT}$ 212 and a decoupling capacitor $C_{OUT}$ 214.

FIGS. 3A-3C illustrate the basic operation of the Dickson Star SC regulator 200. As shown in FIG. 3C, the Dickson Star SC regulator 200 is duty-cycled between State0 (illustrated in FIG. 3A) and State 1 (illustrated in FIG. 3B) over time with a duty cycle D. The value of the duty cycle (D) can be any value between 0 and 1, and preferably between 0.25 and 0.75.

When the switching capacitors $C1_{FLY}$ 204 and $C2_{FLY}$ 206 are large enough, the voltages across these switching capacitors, $V_{C1FLY}$, $V_{C2FLY}$, respectively, stay roughly constant between State0 and State1. Additionally, the decoupling capacitor $C_{OUT}$ 214, which is often large, is always coupled to the output $V_{OUT}$ 208 to reduce noise on the output. Therefore, the output voltage $V_{OUT}$ 208 stays roughly constant in State0 and State1. Based on these characteristics, the following voltage relationships can be derived:

$$V_{OUT}208 + V_{C1FLY} = V_{C2FLY} \qquad \text{State0:}$$

$$V_{OUT}208 = V_{C1FLY} \qquad \text{State1:}$$

$$V_{OUT}208 + V_{C2FLY} = V_{IN}202 \qquad \text{State1:}$$

By eliminating $V_{C1FLY}$ and $V_{C2FLY}$ from these relationships, the following relationship can be derived:

$$V_{OUT} = (\tfrac{1}{3}) \times V_{IN}$$

This shows that alternating between State0 and State1 provides a 3:1 step-down voltage regulation. This 3:1 step-down Dickson Star SC regulator design can be extended to a N:1 step-down Dickson Star SC regulator, where N is a number greater than 3.

Figure 35A:
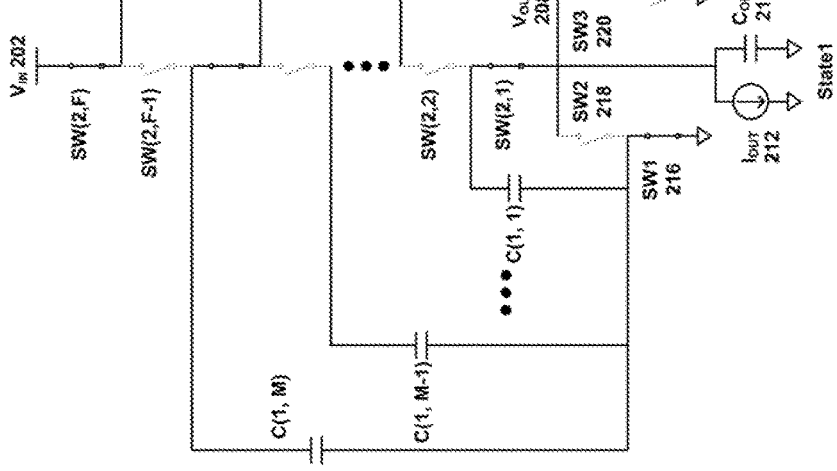
FIGS. 35A-35C show an operation of a N:1 step-down Dickson Star SC regulator in the N:1 conversion mode.
Figure 35B:
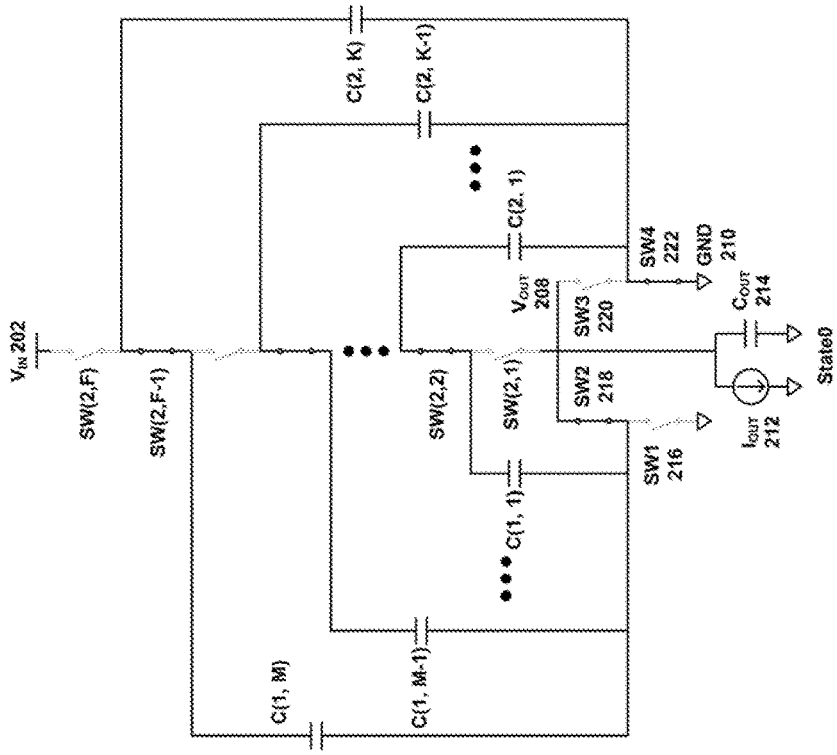

FIGS. 35A-35B show the topology and operation of a N:1 step-down Dickson Star SC regulator. The N:1 step-down Dickson Star SC regulator can include a capacitor matrix (also referred to as a capacitor bank). The capacitor matrix can include a first capacitor sub-matrix and a second capacitor sub-matrix. The capacitors in the first capacitor sub-matrix are referred to as C(1, j), where the first index "1" refers to the "first" capacitor matrix, and the second index "j" refers to the $j^{th}$ capacitor in the first capacitor sub-matrix. Likewise, the capacitors in the second capacitor sub-matrix are referred to as C(2, j). In FIGS. 4A-4B, the first capacitor sub-matrix include M number of capacitors; and the second capacitor sub-matrix include K number of capacitors. M can be equal to floor(N/2), and K can be equal to floor((N−1)/2).

The N:1 step-down Dickson-Star SC regulator includes a plurality of switch matrices. The switches in the first switch sub-matrix include the bottom four switches SW1 216, SW2 218, SW3 220, SW4 222. The switches in the second switch sub-matrix are referred to as SW(2, j), where the index "j" refers to the $j^{th}$ switch in the switch matrix.

In FIGS. 35A-35B, the number of switches and connections of the switches in the first switch sub-matrix SW1 216, SW2 218, SW3 220, SW4 222 do not change regardless of the value of "N". The second switch sub-matrix includes F number of switches, and the value F can be equal to M+K+1.

SW1 216 is connected to $V_{OUT}$ 208 and one terminal of SW2 218. SW2 218 is connected to $V_{OUT}$ 208 and one terminal of SW4 222. All switches in the second switch sub-matrix are connected in series. For example, SW(2, j) is connected to one terminal of C(1,p) and C(2, q). The value p can be equal to ceiling(j/2) and the value q can be equal to floor(j/2). SW1 216 and SW2 218 are connected to the other terminal of C(1,p), while SW3 220 and SW4 222 are connected to the other terminal of C(1,q).

The N:1 step-down Dickson-Star SC regulator can be duty-cycled between State0 and State1, shown in FIG. 35A and FIG. 35B, respectively, by turning on and off switches in the switch matrices.

FIGS. 35A-35B show the operation of the N:1 step-down Dickson Star SC regulator in the N:1 conversion mode. In State0, in the first switch sub-matrix, SW1 216 and SW3 220 are turned off, while SW2 218 and SW4 222 are turned on. In the second switch sub-matrix, all odd indexed switches are off while all even indexed switches are on. Subsequently, in State1, all switch states are inverted compared to State0.

An advantage of this switch configuration is that all switches only have at most $V_{OUT}$ 208 applied across them, regardless of how large N is. One drawback is that some capacitors have high voltages applied across them, which requires high voltage rated capacitors that can be bulky and expensive. In some embodiments, the voltages across the capacitors $V_{C(1,p)}$ and $V_{C(2,q)}$ are equal to $((p-1)\times 2+1)\times V_{OUT}$ 208 and $q\times 2\times V_{OUT}$ 208. As a result, this Dickson Star configuration is useful when low voltage switches and high voltage capacitors are available.

Although Dickson Star SC regulators can be useful, such a design would still be limited to a single conversion ratio (a ratio between an input voltage $V_{IN}$ 202 and an output voltage $V_{OUT}$ 208 of N:1 and cannot efficiently regulate voltages to provide other conversion ratios.

One disadvantage of using a single-conversion ratio SC regulator is the limited range of output voltages. Oftentimes, efficiencies of SC regulators can degrade at output voltages that are not a predetermined fraction (e.g., 1/N) of the input voltage. As discussed with respect to FIGS. 3A-3C, an SC regulator is typically optimized to achieve high efficiency at a single conversion ratio. For example, when a SC regulator is coupled to a battery providing 3.3V, the SC regulator may be optimized to receive the 3.3V and provide a fixed output voltage of 1.1V. In this case, the efficiency of the SC regulator is optimized to provide an output voltage of 1.1V—the efficiency of the SC regulator would degrade as the output voltage deviates from 1.1V. Put another way, the SC regulator may be optimized to provide a high efficiency at a conversion ratio of 3:1, and the efficiency of the SC regulator may degrade as the conversion ratio deviates from 3:1. This efficiency degradation is unfortunate because a system on chip (SoC) may operate at many voltage levels, and it would be desirable to use a single SC regulator to accommodate all of those voltage levels in the SoC.

One way to support multiple conversion ratios is to provide a plurality of regulators each dedicated to a particular conversion ratio, and enable only one of these regulators depending on which conversion ratio needs to be supported. However, this requires many redundant capacitors and switches. For example, when the 3:1 regulator is being used, all switches and capacitors for 2:1 and 1:1 regulators stay idle without being used. The redundant capacitors and switches require real estate on an integrated circuit chip and add costs, both of which are undesirable.

Therefore, it would be desirable to provide a single SC regulator that could achieve high efficiencies at multiple conversion ratios. In other words, it would be desirable to provide a single SC regulator that could be reconfigured for one of many conversion ratios (e.g., ½, ⅓, ⅔, ⅖, ⅗, ⅘) so that a single SC regulator can accommodate one of many output voltage levels at high efficiency.

The present disclosure shows a reconfigurable Dickson Star SC regulator that can support multiple conversion ratios by reconfiguring between various modes. The reconfigurable Dickson Star SC regulator is designed to reduce the number of redundant capacitors by reusing capacitors and switches across multiple modes of operation (across multiple conversion ratios).

In some embodiments, a reconfigurable Dickson Star SC regulator includes a regular Dickson Star SC regulator and a mode switch matrix. The mode switch matrix includes a plurality of switches coupled to the regular Dickson Star SC regulator. Depending on the desired conversion ratio, one or more switches in the mode switch matrix may be enabled to reconfigure the arrangement of capacitors in the regular Dickson Star SC regulator. This way, the mode switch matrix is capable of reconfiguring the conversion ratio of the regular fixed-conversion mode Dickson Star SC regulator.

In some embodiments, depending on the reconfigured conversion ratio of the reconfigurable Dickson Star SC regulator, switches in the regular fixed-conversion mode Dickson Star SC regulator may be controlled differently (compared to its regular fixed-conversion mode operation) to account for the reconfigured arrangement of capacitors.

In the foregoing discussions, a N:1 reconfigurable Dickson Star SC regulator refers to a reconfigurable Dickson Star SC regulator that can be reconfigured to provide any one of M:1 conversion ratios, where M is a value between 1 and N.

Figure 4:
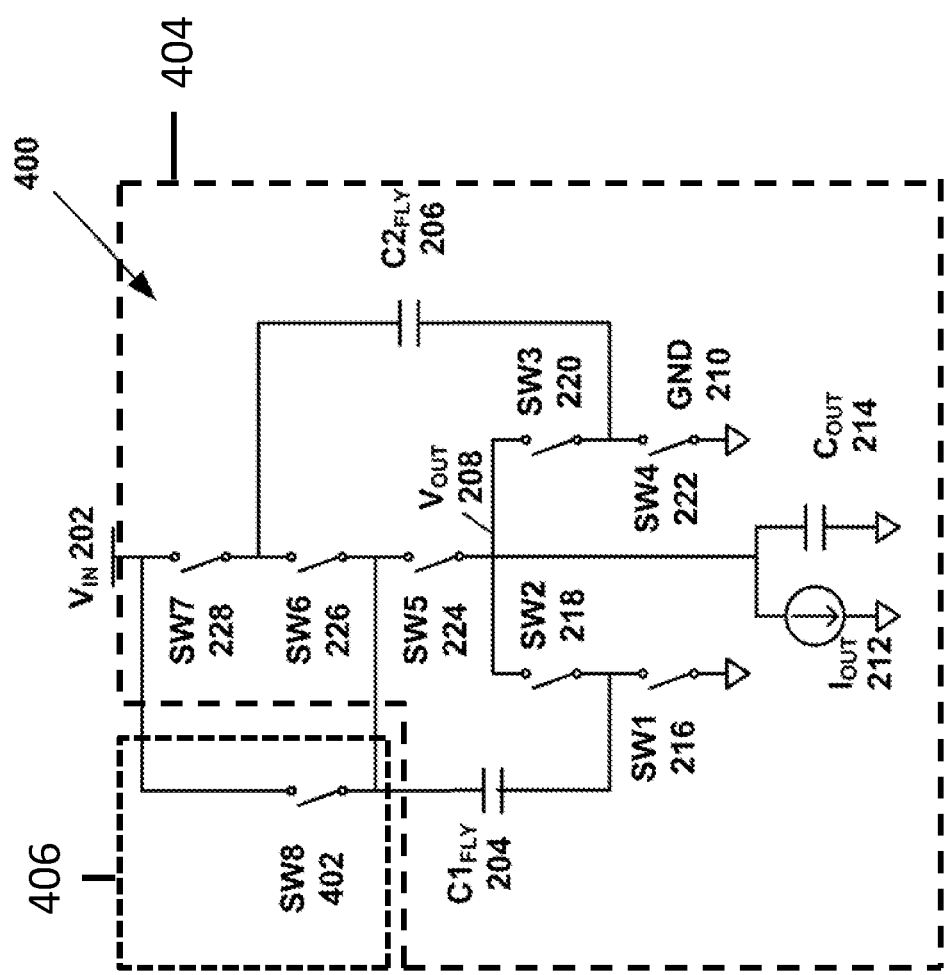
FIG. 4 illustrates an exemplary reconfigurable Dickson Star SC regulator that can be reconfigured to support a plurality of conversion ratios in accordance with some embodiments.

FIG. 4 illustrates an exemplary reconfigurable Dickson Star SC regulator that can be reconfigured to support a plurality of conversion ratios in accordance with some embodiments. FIG. 4 shows a 3:1 reconfigurable Dickson Star SC regulator 400 that can be reconfigured into one of conversion ratios: 3:1, 2:1, 1:1. The 3:1 reconfigurable Dickson Star SC regulator 400 includes a fixed 3:1 Dickson Star SC regulator 200 of FIG. 2, identified using the box 404, and a mode switch matrix 406 including a single mode switch SW8 402. This additional mode switch 402 can be selectively operated to transform a fixed 3:1 Dickson Star SC regulator of FIG. 2 into a 3:1 reconfigurable Dickson Star SC regulator.

FIGS. 5-7 illustrate the operation of the reconfigurable regulator in FIG. 4 for conversion ratios 3:1, 2:1, 1:1, respectively, in accordance with some embodiments. As shown in FIGS. 5A-5C, to operate the reconfigurable Dickson Star SC regulator 400 in a 3:1 conversion mode, the mode switch SW8 402 can be simply turned off (in an "open" position), and the fixed 3:1 Dickson Star SC regulator 404 in the reconfigurable regulator 400 can be operated the same way as in FIG. 3 (a plurality of switches can be duty-cycled to switch the regulator between State0 and State1).

As shown in FIGS. 6A-6C, to operate the reconfigurable Dickson Star SC regulator 400 in a 2:1 conversion mode, as the fixed 3:1 regulator 404 is duty-cycled between State0 and State1, the switch SW8 402 can be turned on during State0 and the switch SW8 402 can be turned off during State 1. In some sense, this 3:1 reconfigurable Dickson Star SC regulator operates in a 2:1 conversion mode because the mode switch SW8 402 ties together all switching capacitors C1$_{FLY}$ 204, C2$_{FLY}$ 206 in a parallel manner and makes them to operate collectively as a single large capacitor in State0, just as in a traditional 2:1 SC regulator. For example, in a traditional 2:1 SC regulator, a switching capacitor, or several switching capacitors connected in parallel acting like one switching capacitor, is connected between the input and output voltages in one state, while it is connected between the output voltage and ground in another state. By switching between these two states, the output voltage becomes half of the input voltage. The switches in FIGS. 6A-6B are turned on and off accordingly so that the switching capacitors behave like as in a traditional 2:1 SC regulator.

Figures 7A, 7B, 7C:
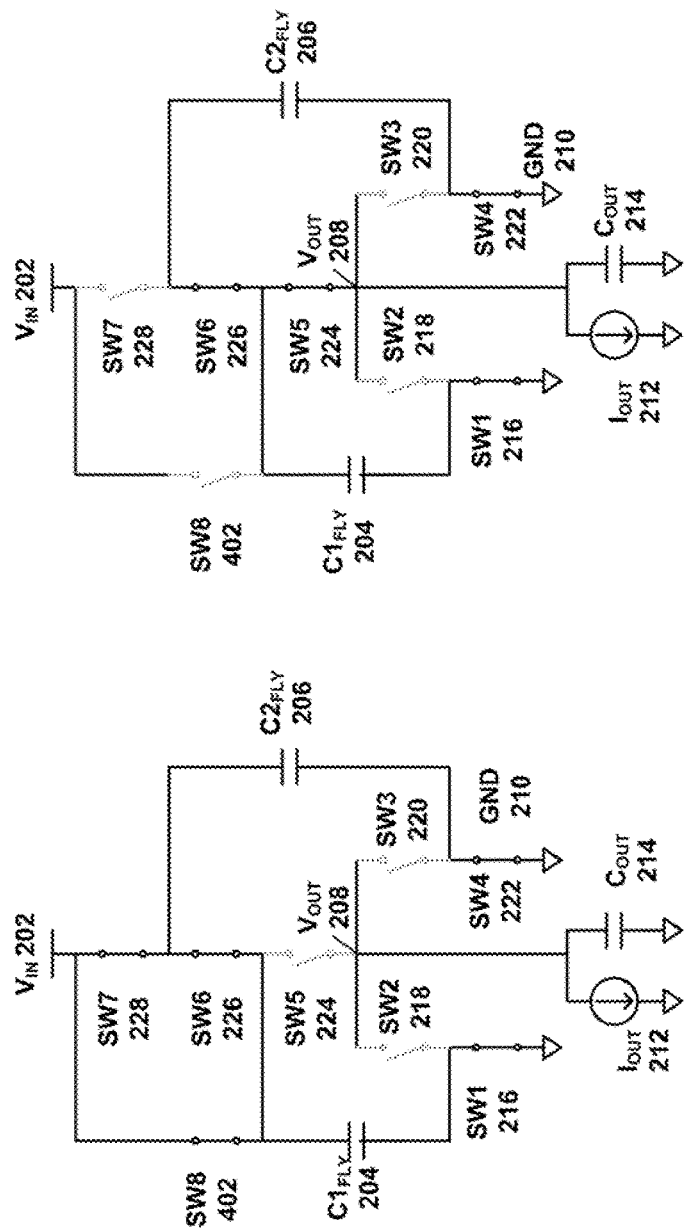
FIGS. 7A-7C illustrate an operation of the reconfigurable regulator in FIG. 4 for the conversion ratio of 1:1 in accordance with some embodiments.

As shown in FIGS. 7A-7C, to operate the reconfigurable Dickson Star SC regulator 400 in a 1:1 conversion mode, as the regulator is duty-cycled between State0 and State1, the switch SW8 402 can be turned on during State0 and the switch SW8 402 can be turned off during State 1. The remaining switches are turned on and off accordingly so that the switching capacitors behave like as in a traditional 1:1 SC regulator. For example, in a traditional 1:1 SC regulator, a switching capacitor, or several switching capacitors connected in parallel acting like one switching capacitor, is connected between the input voltage and ground in one state, while it is connected between the output voltage and ground in another state. By switching between these two states, the output voltage becomes similar to the input voltage. The switches in FIGS. 7A-7B are turned on and off accordingly so that the switching capacitors behave like as in a traditional 1:1 SC regulator.

Figure 8:
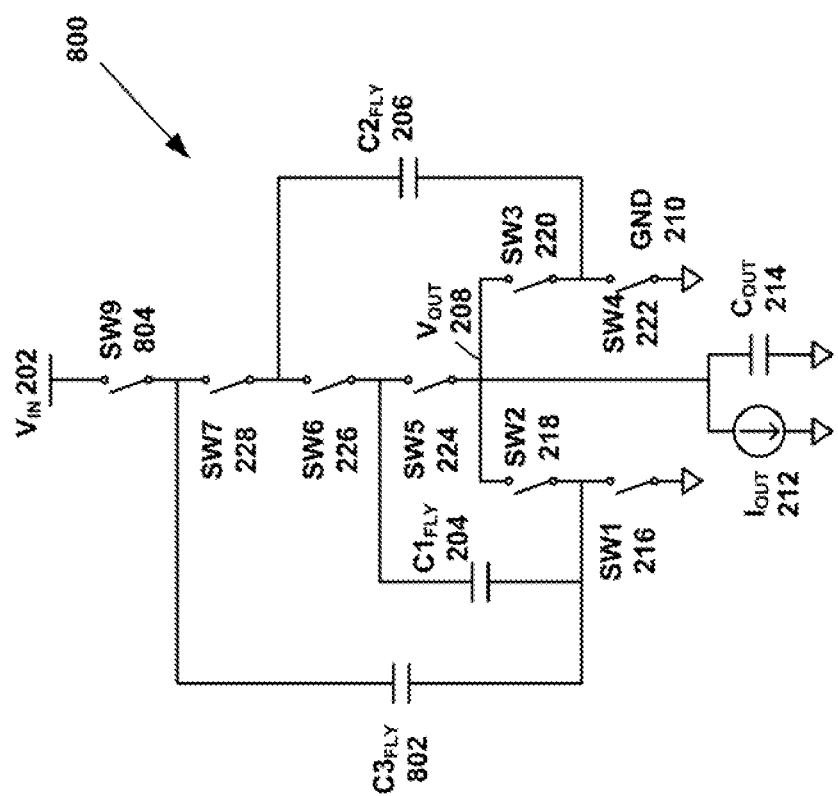
FIG. 8 illustrates a fixed conversion ratio 4:1 Dickson Star SC regulator.

In some embodiments, the reconfigurable Dickson Star SC regulator can be a 4:1 reconfigurable Dickson Star SC regulator. In other words, the reconfigurable Dickson Star SC regulator can be configured to provide one of the following conversion ratios: 4:1, 3:1, 2:1, 3:1. To facilitate the discussion of the 4:1 reconfigurable Dickson Star SC regulator, FIG. 8 illustrates a fixed conversion ratio 4:1 Dickson Star SC regulator 800. Compared to the 3:1 Dickson Star SC regulator 200 in FIG. 2, the 4:1 Dickson Star SC regulator 800 has one more switching capacitor C3$_{FLY}$ 802 and one more switch SW9 804.

Figures 9A, 9B, 9C:
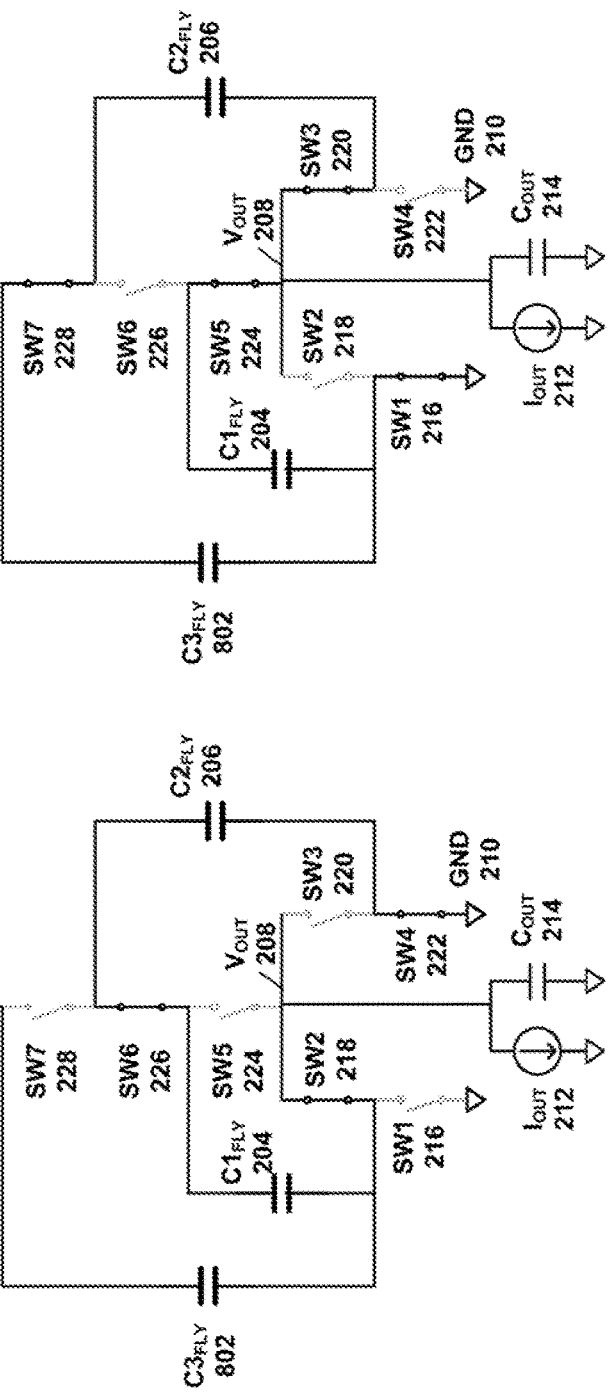
FIGS. 9A-9C show an operation of the 4:1 Dickson Star SC regulator.

Similar to the 3:1 Dickson Star SC regulator 200, the 4:1 regulator 800 is duty-cycled between State0 and State1 to provide voltage regulation. FIGS. 9A-9C show the duty-cycling of the 4:1 regulator 800 between State0 and State1. Assuming that the switching capacitors C1$_{FLY}$ 204, C2$_{FLY}$ 206, and C3$_{FLY}$ 802 and the decoupling capacitor C$_{OUT}$ 214 are large, the following relationships can be derived for the two states:

$$V_{IN}202=V_{C3FLY}+V_{OUT}208 \qquad \text{State0:}$$

$$V_{C2FLY}=V_{C1FLY}V_{OUT}208 \qquad \text{State0:}$$

$$V_{OUT}208=V_{C1FLY} \qquad \text{State1:}$$

$$V_{C3FLY}=V_{OUT}208+V_{C2FLY} \qquad \text{State1:}$$

where V$_{C1FLY}$ is a voltage across the first switching capacitor C1$_{FLY}$ 204, V$_{C2FLY}$ is a voltage across the second switching capacitor C2$_{FLY}$ 206, and V$_{C1FLY}$ is a voltage across the third switching capacitor C3$_{FLY}$ 802. These relationship can be reorganized as follows:

$$V_{C2FLY}=2\times V_{OUT}$$

$$V_{C3FLY}=3\times V_{OUT}$$

$$V_{OUT}=(1/4)\times V_{IN}$$

Therefore, the Dickson Star SC regulator illustrated in FIG. 8 operates as a 4:1 step-down Dickson Star SC regulator.

Figure 10:
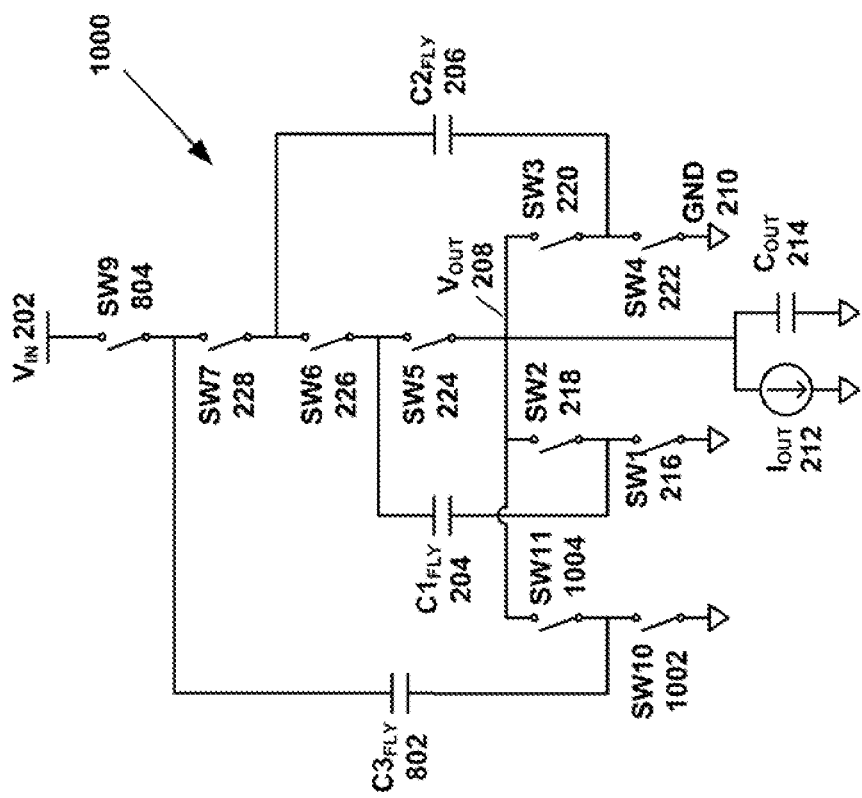
FIG. 10 shows a 4:1 reconfigurable Dickson Star SC regulator in accordance with some embodiments.

In some embodiments, the fixed conversion mode 4:1 Dickson Star SC regulator can be augmented with a mode switch matrix to provide a 4:1 reconfigurable Dickson Star SC regulator. FIG. 10 shows a 4:1 reconfigurable Dickson Star SC regulator in accordance with some embodiments. The 4:1 reconfigurable Dickson Star SC regulator 1000 includes a fixed conversion mode 4:1 Dickson Star SC regulator and a mode switch matrix with two mode switches SW10 1002 and SW11 1004. The mode switch matrix is designed to reconfigure the arrangement of capacitors in the fixed conversion mode 4:1 Dickson Star SC regulator 800 to enable reconfiguration between 4:1, 3:1, 2:1, 1:1 conversion ratios.

FIGS. 11A-11C illustrate the operation of a 4:1 reconfigurable Dickson Star SC regulator in a 4:1 conversion mode in accordance with some embodiments. In this mode of operation, while the Dickson Star SC regulator duty-cycles between State0 and State1 as shown in FIG. 11C, the mode switches SW10 1002 and SW11 1004 are also duty-cycled to provide a 4:1 conversion ratio, behaving similarly as SW1 216 and SW2 218. For example, in State0, the first mode switch SW10 1002 is turned off ("open") and the second mode switch SW11 1004 is turned on ("closed"), and in State1, the first mode switch SW10 1002 is turned on ("closed") and the second mode switch SW11 1004 is turned off ("open").

Assuming that the switching capacitors C1$_{FLY}$ 204, C2$_{FLY}$ 206, and C3$_{FLY}$ 802 and the decoupling capacitor C$_{OUT}$ 214 are large, the following relationships can be derived for the two states:

$$V_{IN}202=V_{C3FLY}V_{OUT}208 \qquad \text{State0:}$$

$$V_{C2FLY}=V_{C1FLY}V_{OUT}208 \qquad \text{State0:}$$

$$V_{OUT}208=V_{C1FLY} \qquad \text{State1:}$$

$$V_{C3FLY}=V_{OUT}208+V_{C2FLY} \qquad \text{State1:}$$

where V$_{C1FLY}$ is a voltage across the first switching capacitor C1$_{FLY}$ 204, V$_{C2FLY}$ is a voltage across the second switching capacitor C2$_{FLY}$ 206, and V$_{C1FLY}$ is a voltage across the third switching capacitor C3$_{FLY}$ 802. These relationships can be reorganized as follows:

$$V_{C2FLY}=2\times V_{OUT}$$

$$V_{C3FLY}=3\times V_{OUT}$$

$$V_{OUT}=(1/4)\times V_{IN}$$

Therefore, the reconfigurable Dickson Star SC regulator illustrated in FIGS. 11A-11B operates as a 4:1 step-down Dickson Star SC regulator.

FIGS. 12A-12C illustrate the operation of a 4:1 reconfigurable Dickson Star SC regulator in a 3:1 conversion mode in accordance with some embodiments. In this mode of operation, while the regulator duty-cycles between State0 and State1 as shown in FIG. 12C, the mode switches SW10 1002 and SW11 1004 are also duty-cycled to provide a 3:1 conversion ratio. For example, in State0, the first mode switch SW10 1002 is turned on ("closed") and the second mode switch SW11 1004 is turned off ("open"), and in State1, the first mode switch SW10 1002 is turned off ("open") and the second mode switch SW11 1004 is turned on ("closed").

In some sense, the operation of this 4:1 reconfigurable Dickson Star SC regulator operating in the 3:1 conversion mode is similar to the operation of the fixed conversion mode 3:1 Dickson Star SC regulator 200 in FIG. 2. For example, the switching capacitors $C2_{FLY}$ 206 and $C3_{FLY}$ 802 are tied together in parallel to provide a larger single capacitor, which together operates as $C2_{FLY}$ 206 in FIG. 2. As another example, the switching capacitor $C1_{FLY}$ 204 in FIGS. 12A-12B operates as $C1_{FLY}$ 204 in FIG. 2. Therefore, although the number of capacitors in the 4:1 reconfigurable Dickson Star SC regulator is different from the fixed conversion mode 3:1 Dickson Star SC regulator in FIG. 2, the 4:1 reconfigurable Dickson Star SC regulator can operate in the 3:1 conversion mode through reconfiguration of capacitor arrangements using a plurality of switches.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C2FLY}=V_{C3FLY} \quad \text{State0:}$$

$$V_{C2FLY}=V_{C1FLY}V_{OUT}208 \quad \text{State0:}$$

$$V_{OUT}208=V_{C1FLY} \quad \text{State1:}$$

$$V_{IN}202=V_{OUT}208+V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationships can be reorganized as follows:

$$V_{C2FLY}=2\times V_{OUT}208$$

$$V_{C3FLY}=2\times V_{OUT}208$$

$$V_{OUT}=(\tfrac{1}{3})\times V_{IN}$$

Therefore, the reconfigurable Dickson Star SC regulator illustrated in FIGS. 12A-12C operates as a 3:1 step-down Dickson Star SC regulator.

FIGS. 13A-13C illustrate the operation of a 4:1 reconfigurable Dickson Star SC regulator in a 2:1 conversion mode in accordance with some embodiments. In this mode of operation, while the Dickson Star SC regulator duty-cycles between State0 and State1 as shown in FIG. 13C, the mode switches SW10 1002 and SW11 1004 are also duty-cycled to provide a 2:1 conversion ratio. For example, in State0, the first mode switch SW10 1002 is turned off ("open") and the second mode switch SW11 1004 is turned on ("closed"), and in State 1, the first mode switch SW10 1002 is turned on ("closed") and the second mode switch SW11 1004 is turned off ("open").

In some sense, this 4:1 reconfigurable Dickson Star SC regulator operates in a 2:1 conversion mode because the regulator ties together all three switching capacitors $C1_{FLY}$ 204, $C2_{FLY}$ 206, $C3_{FLY}$ 802 in parallel and makes them to operate collectively as a single large capacitor, just as in a traditional 2:1 SC regulator. For example, in a traditional 2:1 SC regulator, a switching capacitor, or several switching capacitors connected in parallel acting like one switching capacitor, is connected between the input and output voltages in one state, while it is connected between the output voltage and ground in another state. By switching between these two states, the output voltage becomes half of the input voltage. The switches in FIGS. 13A-13B are turned on and off accordingly so that the switching capacitors behave like as in a traditional 2:1 SC regulator.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202-V_{OUT}208 \quad \text{State0:}$$

$$V_{C1FLY}=V_{C2FLY}=V_{C3FLY}=V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=(\tfrac{1}{2})\times V_{IN}$$

Therefore, the reconfigurable Dickson Star SC regulator illustrated in FIGS. 13A-13C operates as a 2:1 step-down Dickson Star SC regulator.

FIGS. 14A-14C illustrate the operation of a 4:1 reconfigurable Dickson Star SC regulator in a 1:1 conversion mode in accordance with some embodiments. In this mode of operation, while the Dickson Star SC regulator duty-cycles between State0 and State1 as shown in FIG. 14C, the mode switches SW10 1002 and SW11 1004 are not duty-cycled. For example, in both State0 and State1, the first mode switch SW10 1002 is turned on ("closed") and the second mode switch SW11 1004 is turned off ("open").

In some sense, this 4:1 reconfigurable Dickson Star SC regulator operates in a 1:1 conversion mode because the regulator ties together all three switching capacitors $C1_{FLY}$ 204, $C2_{FLY}$ 206, $C3_{FLY}$ 802 in parallel and makes them to operate collectively as a single large capacitor, just as in a traditional 1:1 SC regulator. For example, in a traditional 1:1 SC regulator, a switching capacitor, or several switching capacitors connected in parallel acting like one switching capacitor, is connected between the input voltage and ground in one state, while it is connected between the output voltage and ground in another state. By switching between these two states, the output voltage becomes similar to the input voltage. The switches in FIGS. 14A-14B are turned on and off accordingly so that the switching capacitors behave like as in a traditional 1:1 SC regulator.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY}=V_{C2FLY}=V_{C3FLY}=V_{IN}202 \quad \text{State0:}$$

$$V_{C1FLY}=V_{C2FLY}=V_{C3FLY}=V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationships can be reorganized as follows:

$$V_{C1FLY}=V_{OUT}$$

$$V_{C2FLY}=V_{OUT}$$

$$V_{C3FLY}=V_{OUT}$$

$$V_{OUT}=V_{IN}$$

Therefore, the reconfigurable Dickson Star SC regulator illustrated in FIGS. 14A-14C operates as a 1:1 step-down Dickson Star SC regulator.

In some embodiments, the 3:1 reconfigurable Dickson Star SC regulator 400 illustrated in FIG. 4 and the 4:1 reconfigurable Dickson Star SC regulator 1000 illustrated in FIG. 10 can be extended to a N:1 reconfigurable Dickson Star SC regulator, where N can be any number greater than one.

Figure 15A:
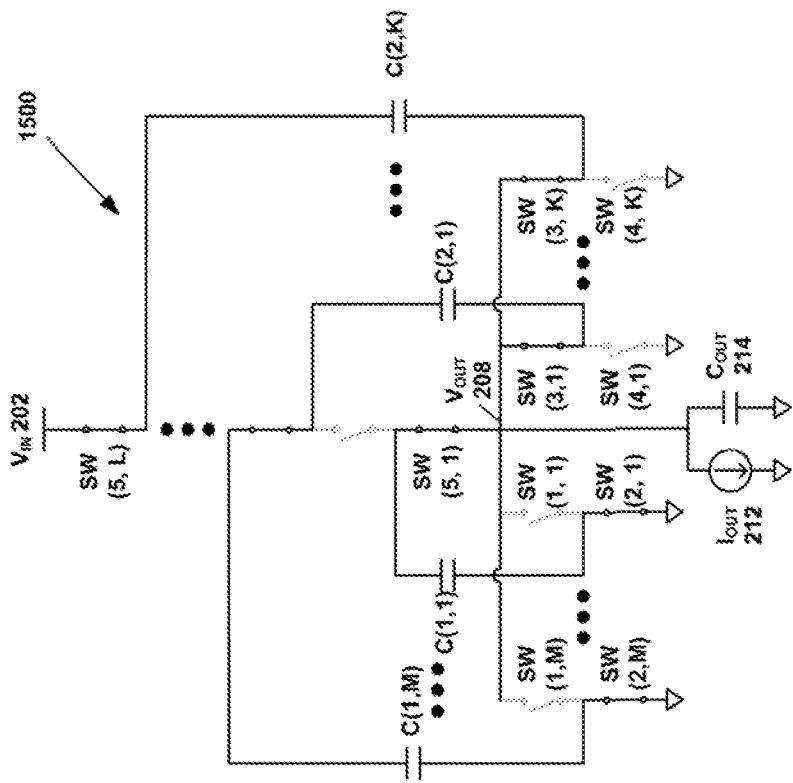
FIGS. 15A-15B illustrate a N:1 reconfigurable Dickson Star SC regulator in accordance with some embodiments.
Figure 15B:
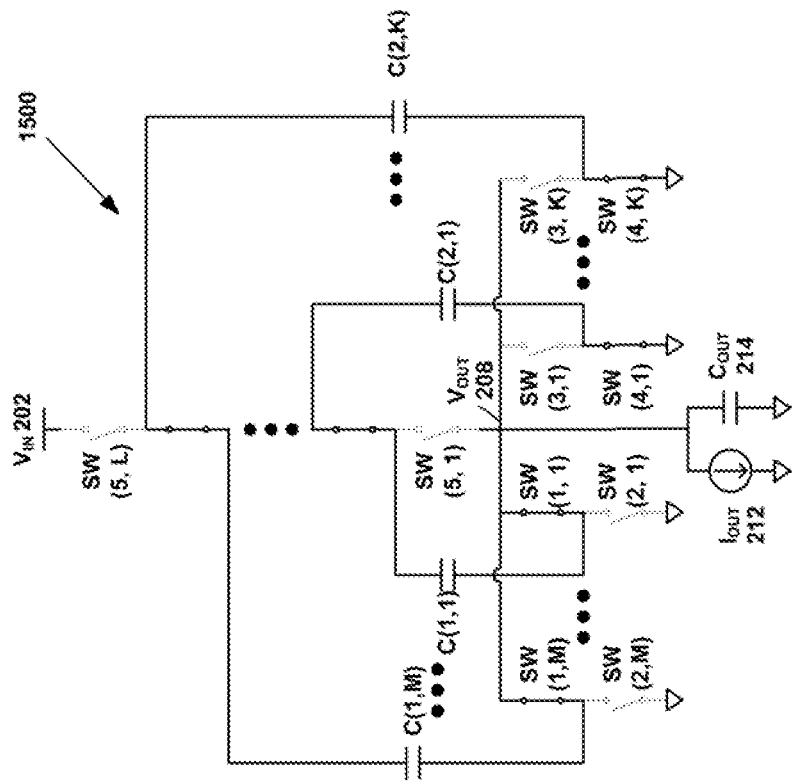

FIGS. 15A-15B illustrate a N:1 reconfigurable Dickson Star SC regulator in accordance with some embodiments.

In some embodiments, the N:1 reconfigurable Dickson Star SC regulator 1500 can include a capacitor matrix (also referred to as a capacitor bank). The capacitor matrix can include a first capacitor sub-matrix and a second capacitor sub-matrix. The capacitors in the first capacitor sub-matrix are referred to as C(1, j), where the first index "1" refers to the "first" capacitor matrix, and the second index "j" refers to the $j^{th}$ capacitor in the first capacitor sub-matrix. Likewise, the capacitors in the second capacitor sub-matrix are referred to as C(2, j). In FIGS. 15A-15B, the first capacitor sub-matrix include M number of capacitors; and the second capacitor sub-matrix include K number of capacitors. In some embodiments, M is equal to floor(N/2), and K is equal to floor((N−1)/2).

In some embodiments, the N:1 reconfigurable Dickson-Star SC regulator 1500 includes a switch matrix having a first switch sub-matrix, a second switch sub-matrix, a third switch sub-matrix, a fourth switch sub-matrix, and a fifth switch matrix.

The switches in the first switch sub-matrix are referred to as SW(1, j), where the first index "1" refers to the "first" switch matrix, and the second index "j" refers to the $j^{th}$ switch in the first switch sub-matrix. Likewise, the switches in the second switch sub-matrix are referred to as SW(2, j); the switches in the third switch sub-matrix are referred to as SW(3, j); the switches in the fourth switch sub-matrix are referred to as SW(4, j); and the switches in the fifth switch sub-matrix are referred to as SW(5, j).

In FIGS. 15A-15B, the first switch sub-matrix and second switch sub-matrix each includes M number of switches; the third switch sub-matrix and the fourth switch sub-matrix each includes K number of switches; and the fifth switch sub-matrix include L number of switches. In some embodiments, M is equal to floor(N/2); K is equal to floor((N−1)/2); and L is equal to N.

In some embodiments, this regulator 1500 can be duty-cycled between State0 and State1 by turning on and off switches in the switch matrix of the regulator 1500.

Figure 35C:
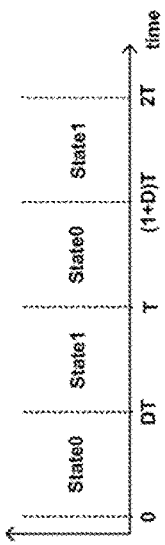

FIGS. 15A-15B show the operation of the N:1 reconfigurable Dickson Star SC regulator 1500 in the N:1 conversion mode in accordance with some embodiments. In State0, all switches in the first switch sub-matrix at the bottom left side are turned on, while all switches in the second switch sub-matrix side are turned off. Additionally, all switches in the third switch sub-matrix are turned off while all switches in the fourth switch sub-matrix are turned on. In the fifth switch sub-matrix, all odd indexed switches are off while all even indexed switches are on. Subsequently, in State1, all switch states are inverted compared to State0. While there are additional switches, including SW(j,1), SW(j,2), SW(j,3), SW(j,4) where j is larger than 1, the capacitor topologies are similar to the N:1 step-down Dickson Star in FIG. 35.

To operate the N:1 reconfigurable Dickson-Star SC regulator 1500 in the (N−1):1 conversion mode, the capacitor with the highest index in the first capacitor sub-matrix (C(1, M)) and the capacitor with the highest index in the second capacitor sub-matrix (C(2, K)) can be tied together in parallel to operate as a single capacitor. This "single" capacitor can work similar to C(1, M) in an (N−1):1 fixed conversion mode Dickson-Star SC regulator—a Dickson-Star SC regulator that is identical to a N:1 fixed conversion mode Dickson-Star SC regulator without C(2, K), which is the capacitor that is connected to $V_{IN}$ 202 through fewer switches, and the top switch in the 5th switch matrix, which is SW(5, L), and SW(3, K) and SW(4, K), which are two switches connected to C(2,K).

To operate the N:1 reconfigurable Dickson-Star SC regulator in the (N−2):1 conversion mode, three capacitors that are connected to $V_{IN}$ 202 through fewest switches (or, put differently) in the fifth switch sub-matrix can be tied together in parallel to work like a single capacitor. These three capacitors includes, for example, one capacitor with the highest index in the first capacitor sub-matrix C(1, M) and two capacitors with the highest indices in the second capacitor sub-matrix (C(2, K), C(2, K−1)). This "single" capacitor can work similar to C(2, K−1) in an (N−2):1 fixed conversion mode Dickson-Star SC regulator—a Dickson-Star SC regulator that is identical to a N:1 fixed conversion mode Dickson-Star SC regulator without C(1, M) and C(2, K) and the top two switches in the 5th switch matrix, which are SW(5, L) and SW(5, L−1), and SW(1,M), SW(2,M), SW(3, K), SW(4,K), which are switches connected to C(1,M) and C(2,K).

More generally, to operate the N:1 reconfigurable Dickson-Star SC regulator in the (N−R):1 conversion mode, "R+1" number of capacitors that are connected to $V_{IN}$ 202 through fewest switches in the fifth switch sub-matrix can be tied together in parallel to work like a single capacitor, and operate the remaining switches as if operating the (N−R):1 fixed conversion mode Dickson-Star SC regulator.

Figure 16:
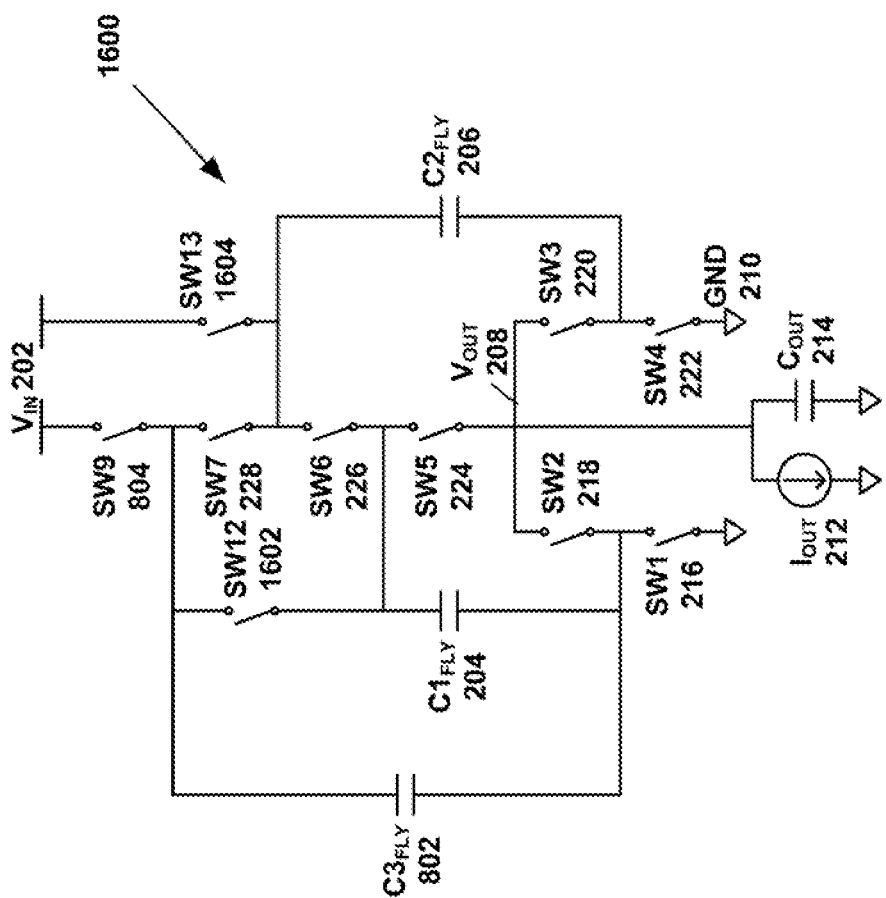
FIG. 16 illustrates a 4:1 reconfigurable Dickson Star SC regulator in accordance with some embodiments.

In some embodiments, another topology of a Dickson Star SC regulator can enable reconfiguration between conversion modes. FIG. 16 illustrates a 4:1 reconfigurable Dickson Star SC regulator in accordance with some embodiments. The 4:1 reconfigurable Dickson Star SC regulator 1000 in FIGS. 10-14 have two additional mode switches SW10 1002 and SW11 1004 compared to a fixed conversion mode 4:1 Dickson Star SC regulator 800 in FIG. 8. FIG. 16 illustrates a different type of 4:1 reconfigurable Dickson Star SC regulator, which uses two additional mode switches SW12 1602 and SW 13 1604 in different locations.

FIGS. 17A-17C illustrate the operation of a 4:1 reconfigurable Dickson Star SC regulator operating in the 4:1 conversion mode in accordance with some embodiments. Although the locations of mode switches are slightly different, the capacitor topology in State0 and State1 is same as the regulator 1000 in FIGS. 11A-11B. Therefore, the relationships between voltages across capacitors in State0 and State1 in FIGS. 17A-17B are identical to the relationships between voltages across capacitors in State0 and State1 in FIGS. 11A-11B. As in FIGS. 11A-11B, assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{IN}202 = V_{C3FLY} + V_{OUT}208 \quad \text{State0:}$$

$$V_{C2FLY} = V_{C1FLY} V_{OUT}208 \quad \text{State0:}$$

$$V_{OUT}208 = V_{C1FLY} \quad \text{State1:}$$

$$V_{C3FLY} = V_{OUT}208 + V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationship can be reorganized as follows:

$$V_{C2FLY} = 2 \times V_{OUT}$$

$$V_{C3FLY} = 3 \times V_{OUT}$$

$$V_{OUT} = (1/4) \times V_{IN}$$

Therefore, the reconfigurable Dickson Star SC regulator illustrated in FIGS. 17A-17B operates as a 4:1 step-down Dickson Star SC regulator.

FIGS. 18A-18C illustrate the operation of a 4:1 reconfigurable Dickson Star SC regulator in the 3:1 conversion mode in accordance with some embodiments. The operating principle in the 3:1 conversion mode is similar to the 3:1 SC regulator illustrated in FIG. 2. The switching capacitors $C1_{FLY}$ 204 and $C3_{FLY}$ 802 are tied together in parallel to operate as a single large capacitor, similar to the capacitor $C1_{FLY}$ 204 in FIG. 2. The switching capacitor $C2_{FLY}$ 206 in FIGS. 18A-18B operates in a similar way as $C2_{FLY}$ 206 in FIG. 2.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C2FLY} = V_{C3FLY} \quad \text{State0:}$$

$$V_{C2FLY} = V_{C1FLY} V_{OUT}208 \quad \text{State0:}$$

$$V_{OUT}208 = V_{C1FLY} \quad \text{State1:}$$

$$V_{IN}202 = V_{OUT}208 + V_{C2FLY} \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationship can be reorganized as follows:

$$V_{C2FLY} = 2 \times V_{OUT}208$$

$$V_{C3FLY} = 2 \times V_{OUT}208$$

$$V_{OUT} = (1/3) \times V_{IN}$$

Therefore, the reconfigurable Dickson Star SC regulator illustrated in FIGS. 18A-18C operates as a 3:1 step-down Dickson Star SC regulator.

FIGS. 19A-19C illustrate the operation of a 4:1 reconfigurable Dickson Star SC regulator when it is working in 2:1 mode in accordance with some embodiments. The basic principle is similar to the 4:1 reconfigurable Dickson Star SC regulator illustrated in FIGS. 13A-13B. The switching capacitors $C1_{FLY}$ 204, $C2_{FLY}$ 206, $C3_{FLY}$ 802 are tied in parallel to work like a single large capacitor, just like capacitors $C1_{FLY}$ 204, $C2_{FLY}$ 206, $C3_{FLY}$ 802 were tied in parallel to work like a single large capacitor in FIGS. 13A-13B.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY} = V_{C2FLY} = V_{C3FLY} = V_{IN}202 - V_{OUT}208 \quad \text{State0:}$$

$$V_{C1FLY} = V_{C2FLY} = V_{C3FLY} = V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationship can be reorganized as follows:

$$V_{C1FLY} = V_{OUT}$$

$$V_{C2FLY} = V_{OUT}$$

$$V_{C3FLY} = V_{OUT}$$

$$V_{OUT} = (1/2) \times V_{IN}$$

Therefore, the reconfigurable Dickson Star SC regulator illustrated in FIGS. 19A-19C operates as a 2:1 step-down Dickson Star SC regulator.

FIGS. 20A-20C illustrate the operation of a 4:1 reconfigurable Dickson Star SC regulator when it is working in 1:1 mode in accordance with some embodiments. The switching capacitors $C1_{FLY}$ 204, $C2_{FLY}$ 206, $C3_{FLY}$ 802 are tied in parallel to work like a single large capacitor, just like capacitors $C1_{FLY}$ 204, $C2_{FLY}$ 206, $C3_{FLY}$ 802 were tied in parallel to work like a single large capacitor in FIGS. 14A-14B.

Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{C1FLY} = V_{C2FLY} = V_{C3FLY} = V_{IN}202 \quad \text{State0:}$$

$$V_{C1FLY} = V_{C2FLY} = V_{C3FLY} = V_{OUT}208 \quad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationships can be reorganized as follows:

$$V_{C1FLY} = V_{OUT}$$

$$V_{C2FLY} = V_{OUT}$$

$$V_{C3FLY} = V_{OUT}$$

$$V_{OUT} = V_{IN}$$

Therefore, the reconfigurable Dickson Star SC regulator illustrated in FIGS. 14A-14C operates as a 1:1 step-down Dickson Star SC regulator.

The regulators in FIGS. 10-14 and the regulators in FIGS. 16-20 use a mode switch matrix with switches located in different positions, but the eventual capacitor arrangements are identical. Therefore, the reconfigurable regulator 1000 is functionally identical to the reconfigurable regulator 1600.

Figure 21A:
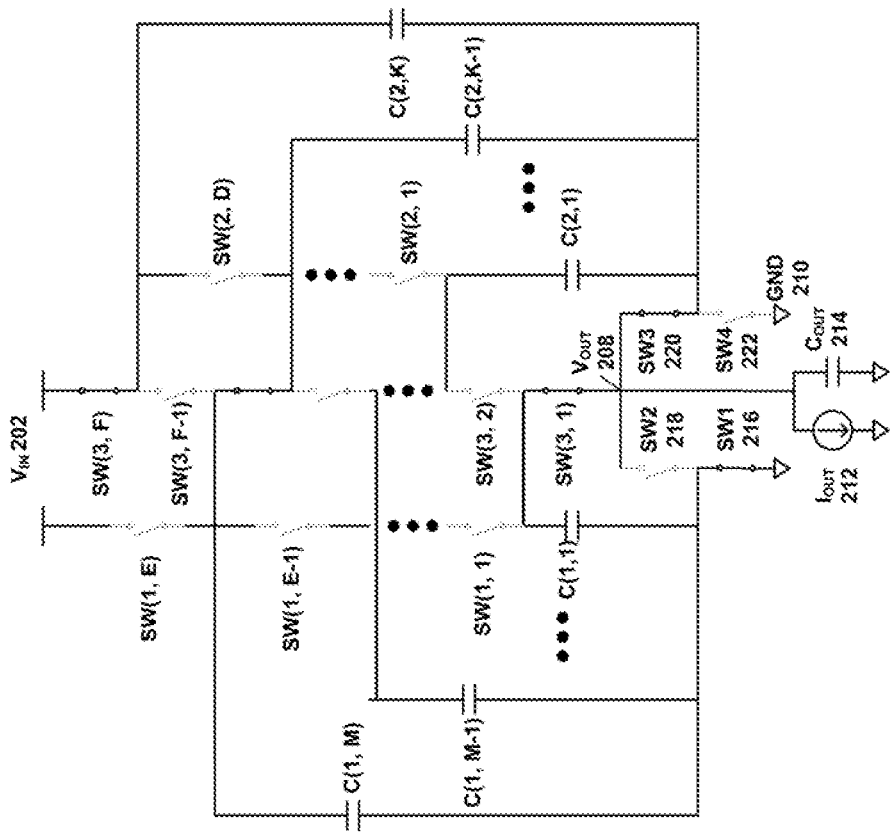
FIGS. 21A-21B illustrate a N:1 reconfigurable Dickson Star SC regulator in accordance with some embodiments.
Figure 21B:
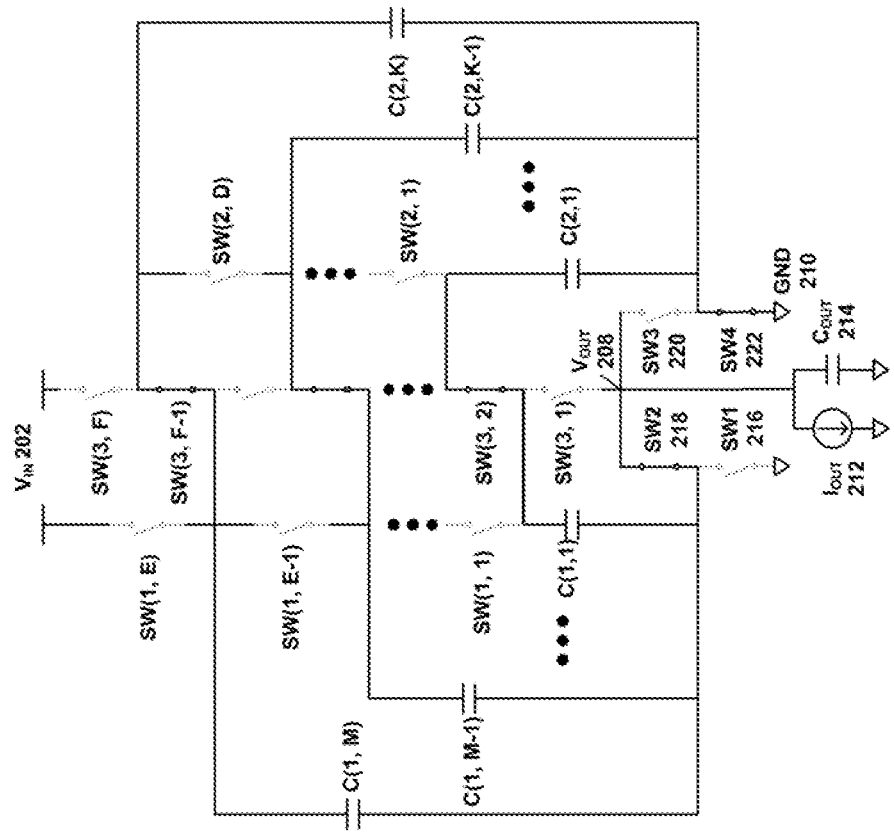

In some embodiments, the 4:1 reconfigurable regulator 1600 can be generalized to provide a N:1 reconfigurable regulator where N is greater than one. FIGS. 21A-21C illustrate a N:1 reconfigurable Dickson-Star SC regulator operating in accordance with some embodiments.

The N:1 reconfigurable Dickson-Star SC regulator 2100 can also include a capacitor matrix. The capacitor matrix can include a first capacitor sub-matrix and a second capacitor sub-matrix. The capacitors in the first capacitor sub-matrix are referred to as $C(1, j)$, where the first index "1" refers to the "first" capacitor matrix, and the second index "j" refers to the $j^{th}$ capacitor in the first capacitor sub-matrix. Likewise, the capacitors in the second capacitor sub-matrix are referred to as $C(2, j)$. In FIGS. 21A-21B, the first capacitor sub-matrix include M number of capacitors; and the second capacitor sub-matrix include K number of capacitors. In some embodiments, M is equal to floor(N/2), and K is equal to floor((N−1)/2).

In some embodiments, the N:1 reconfigurable Dickson-Star SC regulator 2100 includes a switch matrix having a first switch sub-matrix, a second switch sub-matrix, and a third switch sub-matrix. Switches in each of these matrices are arranged serially between input voltage $V_{IN}$ 202 and GND 210.

The switches in the first switch sub-matrix are referred to as $SW(1, j)$, where the first index "1" refers to the "first" switch matrix, and the second index "j" refers to the $j^{th}$ switch in the first switch sub-matrix. Likewise, the switches in the second switch sub-matrix are referred to as $SW(2, j)$, and the switches in the third switch sub-matrix are referred to as $SW(3, j)$. In FIGS. 21A-21B, the first switch sub-matrix include E number of switches; the second switch sub-matrix include D number of switches; and the third switch sub-matrix include F number of switches. In some embodiments, E is equal to 2×ceiling(N/2)−1; D is equal to floor(N/2); and F is equal to N.

In some embodiments, a switch in the first switch sub-matrix connects two capacitors in the first capacitor sub-matrix. For example, $C(1, p)$ and $C(1, p+1)$ are connected through $SW(1, p)$. Similarly, a switch in the second switch sub-matrix connects two capacitors in the second capacitor sub-matrix. For example, $C(2, p)$ and $C(2, p+1)$ are connected through $SW(2, p)$. A switch in the third switch sub-matrix connects a capacitor in the first capacitor sub-matrix to a capacitor in the second capacitor sub-matrix. For example, $C(1, p)$ and $C(2, p)$ are connected through $SW(3, 2\times p)$, and $C(1, p+1)$ and $C(2, p)$ are connected through $SW(3, 2\times p+1)$.

In some embodiments, this regulator 2100 can be duty-cycled between State0 and State1 by turning on and off switches in the switch matrix of the regulator 2100.

FIGS. 21A-21B show the operation of the N:1 reconfigurable Dickson Star SC regulator 2100 in the N:1 conversion mode in accordance with some embodiments. In State0, in the third switch sub-matrix, all odd indexed switches are off while all even indexed switches are on. Subsequently, in State1, all switch states in the third switch sub-matrix are inverted compared to State0. All switches in the first switch sub-matrix and all switches in the second switch sub-matrix side are turned off in both State0 and State1. While there are additional switches including the first and second switch matrices, since all those switches are turned off, the capacitor topologies are similar to the N:1 step-down Dickson Star in FIG. 35.

To operate the N:1 reconfigurable Dickson-Star SC regulator 2100 in the (N−1):1 conversion mode, the capacitor that is connected to $V_{IN}$ 202 through the fewest switches (or, put differently, closest to the input terminal) in the third switch sub-matrix, which is C(2,K) in FIGS. 21A-21B, and the capacitor that is in the same matrix but with a one lower index, which is C(2, K−1) in FIGS. 21A-21B, can be tied together in parallel to operate as a single capacitor. To keep the two capacitors tied into a "single" capacitor, SW(2,D) is always on in State0 and State1. This "single" capacitor can work similar to C(1, M) in an (N−1):1 fixed conversion mode Dickson-Star SC regulator-a Dickson-Star SC regulator that is identical to a N:1 fixed conversion mode Dickson-Star SC regulator without C(2, K), SW(3, F). Since C(2, K) does not exist independently anymore (or works with C(2, K−1)), SW(3, F−1) is turned off in both State0 and State1. C(1, M) acts as the top capacitor, so SW(1, E) acts like the top switch, and SW(3, F) is turned off in both State0 and State1. To summarize, SW(2, D) is always on in State0 and State1, SW(3, F−1) and SW(3, F) are always off in State0 and State1, and SW(1, E) switches on and off in State0 and State1, respectively.

To operate the N:1 reconfigurable Dickson-Star SC regulator in the (N−2):1 conversion mode, three capacitors that are connected to $V_{IN}$ 202 through fewest switches can be tied together in parallel to work like a single capacitor. In FIGS. 21A-21B, these three capacitors are C(2,K), C(1,M), and C(2,K−1). This "single" capacitor can work similar to C(2, K−1) in an (N−2):1 fixed conversion mode Dickson-Star SC regulator-a Dickson-Star SC regulator that is identical to a N:1 fixed conversion mode Dickson-Star SC regulator without C(2, K), C(1,M), SW(3, F), SW(F−1). To keep the three capacitors tied as a "single" capacitor, SW(2,D), SW(3, E−1) are always on in State0 and State1. Since C(2, K) and C(1, M) do not exist independently anymore, SW(3, F−1) and SW(3, F−2) are turned off in both State0 and State1. C(2, K−1) acts as the top capacitor, so SW(3, F) acts like the top switch, and SW(1, E) is turned off in both State0 and State1. To summarize, SW(2, D) and SW(1, E−1) are always on in State0 and State1, SW(3, F−1), SW(3, F−2), SW(1, E) are always off in State0 and State1, and SW(3, F) switches off and on in State0 and State1, respectively.

More generally, to operate the N:1 reconfigurable Dickson-Star SC regulator in the (N−R):1 conversion mode, "R+1" number of capacitors that are connected to $V_{IN}$ 202 through fewest switches in the third switch sub-matrix can be tied together in parallel to work like a single capacitor, and operate the remaining switches as if operating the (N−R):1 fixed conversion mode Dickson-Star SC regulator.

In some embodiments, the control module is configured to perform the following switch operations to operate the N:1 reconfigurable Dickson-Star SC regulator in the (N−R):1 conversion mode. The control module is configured to turn on the top "R" number of switches in the first and second matrices (e.g., R switches that are closest to the input voltage terminal, or, put another way, R switches that have fewest number of switches between them and the input voltage terminal), excluding the top switch in the first switch sub-matrix SW(1, E) that is directly connected to the input voltage terminal. When a first switch in a first switch sub-matrix and a second switch in a second switch sub-matrix have the same number of switches between them and the input voltage terminal and only one of them can be included in the set of R switches, then the second switch in the second switch sub-matrix would be selected. For example, if R is equal to 3, SW(2, D), SW(1, E−1), SW(2, D−1) are selected as the "3" switches closest to the input voltage terminal. The control module is configured to keep the R switches turned on in both State0 and State1 to tie the top 3 capacitors in parallel.

Also, the control module is configured to turn off the top "R" number of switches in the third switch matrix (e.g., R number of switches that are closest to the input voltage terminal, or, put another way, R number of switches that have fewest number of switches between them and the input voltage terminal), excluding the top switch SW(3, F) in the third switch sub-matrix that is connected to the input voltage terminal. For example, if R is equal to 3, SW(3, F−1), SW(3, F−2), SW(3, F−3) are always off in State0 and State1.

Also, when R is an odd number, the control module is configured to turn off the top switch SW(3, F) in the third switch sub-matrix and operate the top switch SW(1, E) in the first switch sub-matrix as if the top switch SW(1, E) in the first switch sub-matrix is the top switch of the third switch sub-matrix.

In some embodiments, when R is an even number, the control module is configured to turn off the top switch SW(1, E) in the first switch sub-matrix and operate the top switch SW(3, F) in the third switch sub-matrix as if the top switch SW(3, F) in the third switch sub-matrix is the top switch of the first switch sub-matrix.

In some embodiments, the state of the top switch is inverted compared to the top most switch in the third switch matrix that is not always off. For example, if R is equal to 3, since R is an odd number, SW(3, F) is turned off. Also, SW(3, F−1), SW(3, F−2), SW(3, F−3) are always off. Therefore, the top switch, which is SW(1, E), is in a state that is inverted compared to SW(3, F−4), the top most switch in the third switch matrix that is not always off.

In some embodiments, the reconfigurable Dickson-Star SC regulator can be operated as a part of a voltage regulator system. The voltage regulator system can operate in multiple interleaved phases (e.g., in a time-interleaved manner over a single period), and the reconfigurable Dickson-Star SC regulator can be used to provide an output voltage in one of the interleaved phases. For example, a voltage regulator system can include three reconfigurable Dickson-Star SC regulators that each operate 0 degrees, 120 degrees, 240 degrees out of phase, respectively.

In some embodiments, the reconfigurable Dickson-Star SC regulator can be used for various applications including power management integrated circuits (PMICs), battery chargers, LED drivers, envelope tracking power amplifiers.

In some embodiments, the capacitance of switching capacitors (e.g., $C1_{FLY}$ 204, $C2_{FLY}$ 206, and $C3_{FLY}$ 802) can be set to be proportional to an output current of the reconfigurable Dickson-Star SC regulator. For example, the capacitance of switching capacitors can be in the range of 0.1 nF/mA and 100 nF/mA, depending on the target power efficiency. The reconfigurable Dickson-Star SC regulator can improve its efficiency by using larger capacitance values.

In some embodiments, a reconfigurable Dickson-Star SC regulator can be operated in a reverse configuration (e.g., the input node and the output node of the reconfigurable Dickson-Star SC regulator are switched.) The operational direction of the reconfigurable Dickson-Star SC regulator can be flexibly modified to accommodate various types of input voltage sources and output loads coupled to the input node and the output node of the reconfigurable Dickson-Star SC regulator.

In some embodiments, a reconfigurable Dickson-Star SC regulator can be operated in a reverse direction to operate it as a step-up regulator. For example, an input node of the reconfigurable Dickson-Star SC regulator can be coupled to a target load (e.g., a chip) and an output node of the reconfigurable Dickson-Star SC regulator can be coupled to an input voltage source (e.g., a battery).

Figure 22:
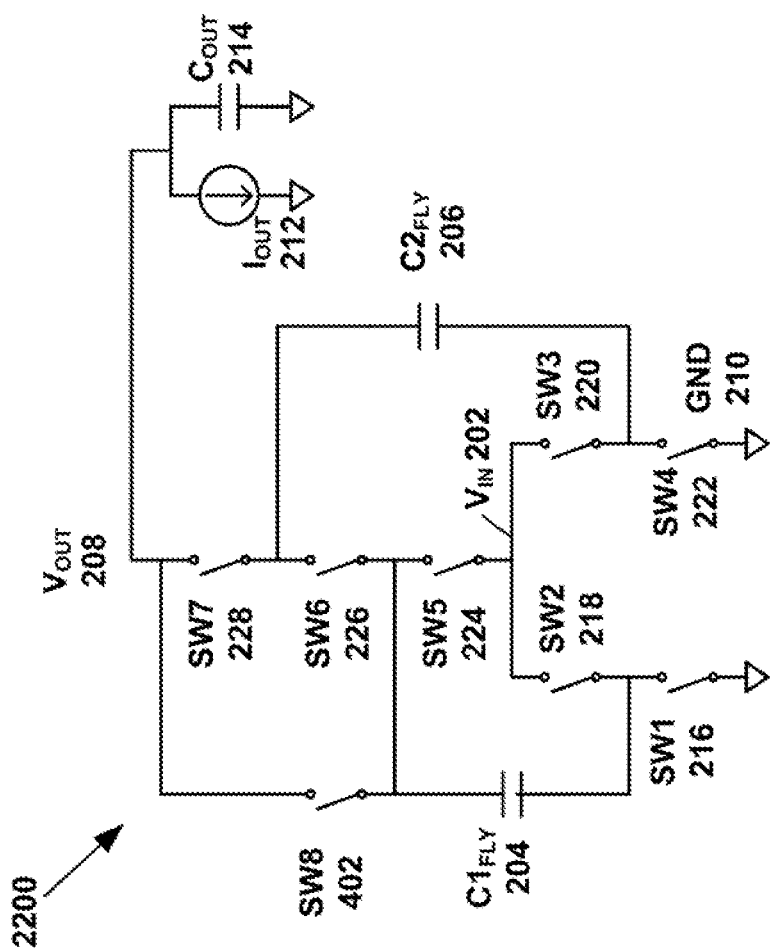
FIGS. 22-24 illustrate step-up reconfigurable Dickson-Star SC regulators in accordance with some embodiments.
Figure 23:
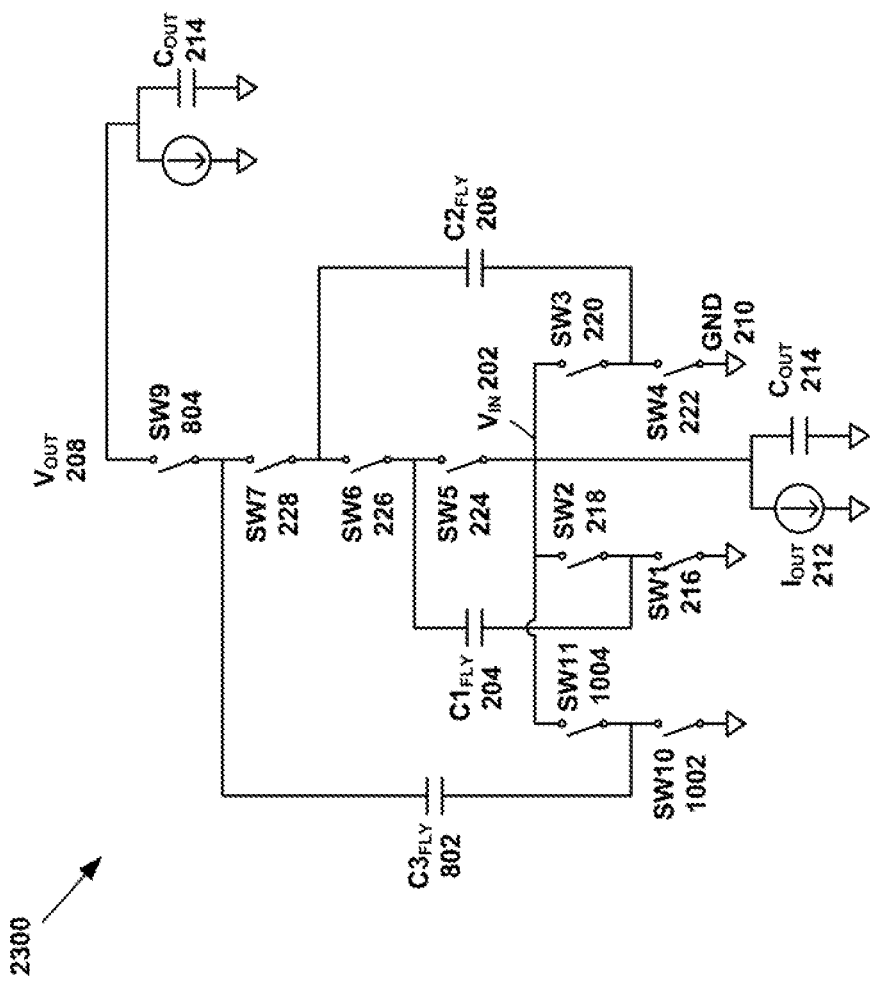
Figure 24:
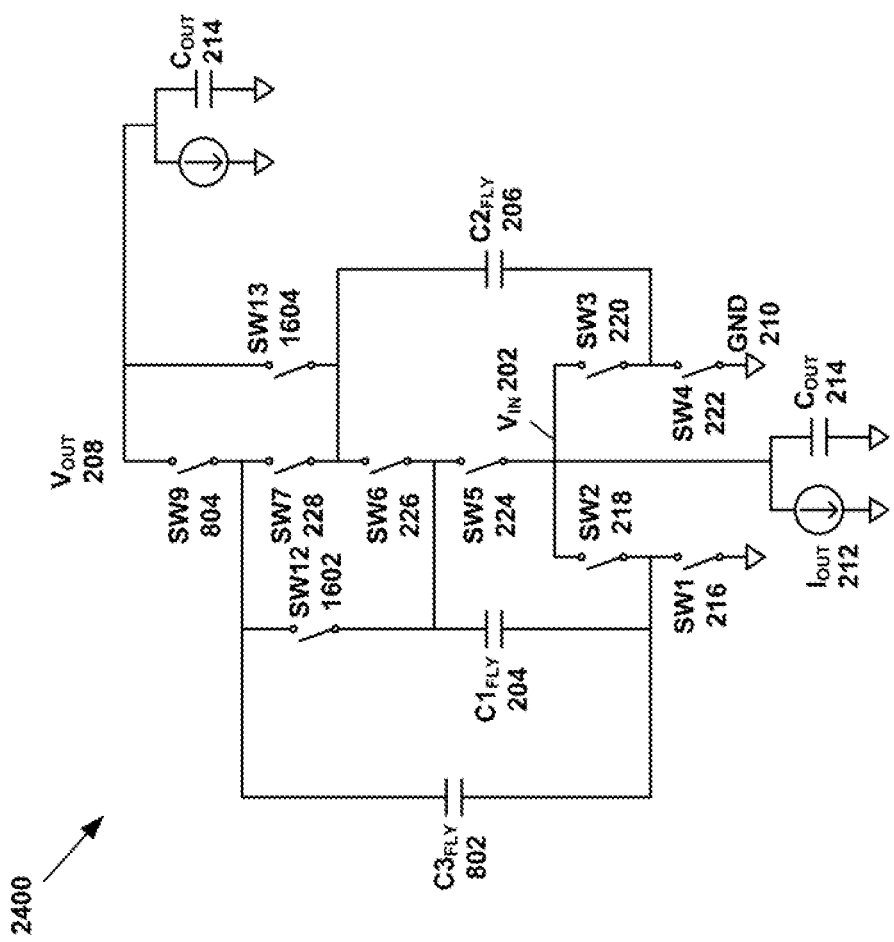

FIGS. 22-24 illustrate step-up reconfigurable Dickson-Star SC regulators in accordance with some embodiments. The regulator 2200 is a step-up reconfigurable 1:3 Dickson-Star SC regulator; the regulator 2300 is a step-up reconfigurable 1:4 Dickson-Star SC regulator; and the regulator 2400 is a step-up reconfigurable 1:4 Dickson-Star SC regulator. The step-up reconfigurable Dickson-Star SC regulators in FIGS. 22-24 are similar to the step-down regulators in FIGS. 6, 10, and 16, respectively, except that the location of $V_{IN}$ 202 and V OUT 208 are swapped and $V_{IN}$ 202 is lower than $V_{OUT}$ 208.

In some embodiments, a reconfigurable Dickson-Star SC regulator can be operated in a reverse direction to operate it as a battery charger. For example, an input node of the reconfigurable Dickson-Star SC regulator can be coupled to a power source, e.g., a power line of a Universal Serial Bus (USB), and an output node of the reconfigurable Dickson-Star SC regulator can be coupled to a battery so that the output voltage and the output current of the reconfigurable Dickson-Star SC regulator are used to charge the battery.

In some embodiments, the reconfigurable Dickson-Star SC regulator can be particularly useful in charging batteries in a handheld device. A handheld device, such as a smart-phone, can use a Lithium-Ion (Li-Ion) battery that is configured to provide a voltage output within the range of approximately 2.8-4.3V, depending on whether the battery is charged or not (e.g., 4.3V when fully charged, 2.8V when fully discharged). The Li Ion battery in the handheld device can be charged using a Universal Serial Bus (USB). The current version of the USB power line uses 5V (and the future versions of the USB may use even higher voltages), which is higher than the voltage output of the Li Ion battery. Therefore, the voltage from the USB power line should be stepped down before it can be used to charge the Li Ion battery. To this end, the reconfigurable Dickson-Star SC regulator can be configured to receive the power line voltage (and current) from the USB and provide a step-down version of the power line voltage (and current) to the Li-Ion battery so that the Li-Ion battery can be charged based on the voltage and current from the USB.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the reconfigurable Dickson-Star SC regulator can operate in a step-up configuration to step-up the output voltage of the battery to that of the USB power line. This way, the battery in the first device can charge the battery in the second device over the USB power line.

Figure 25:
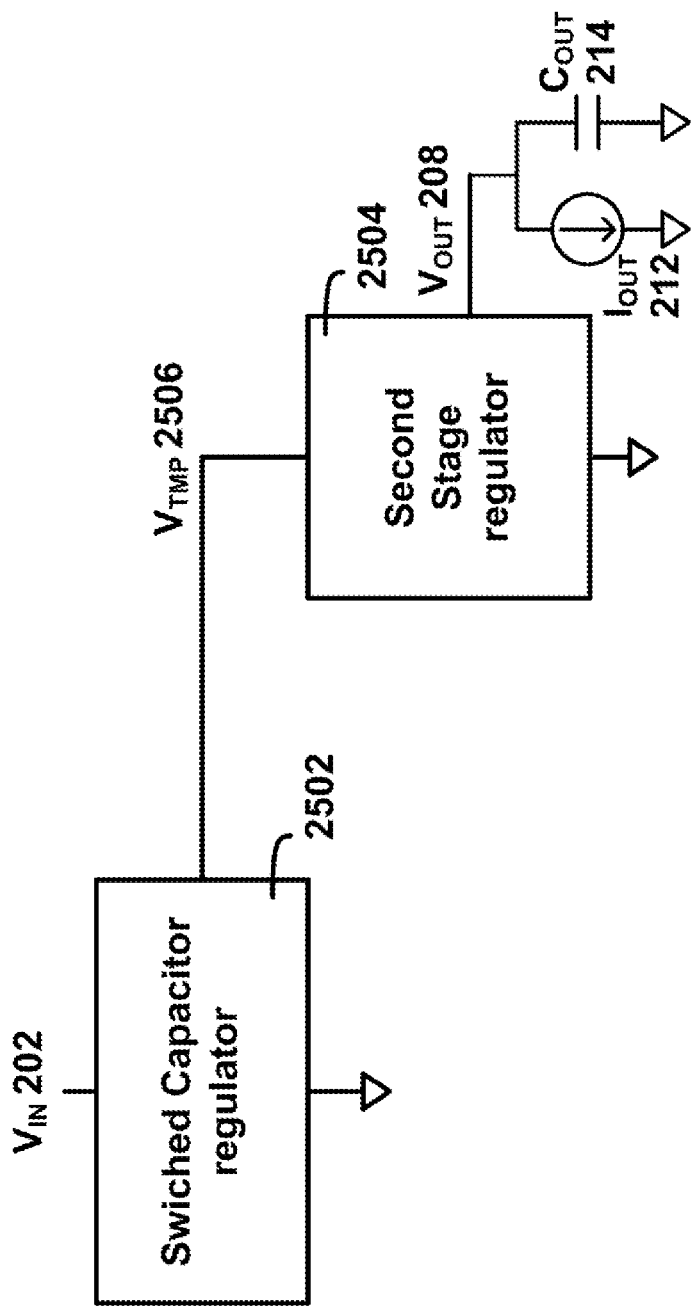
FIG. 25 illustrates a two-stage voltage regulation system in which a SC regulator provides the first stage voltage regulation in accordance with some embodiments.

In some embodiments, a SC regulator, such as a reconfigurable Dickson-Star SC regulator, can be operated in conjunction with another voltage regulator to provide a two-stage voltage regulation. FIG. 25 illustrates a two-stage voltage regulation system in which a SC regulator provides the first stage voltage regulation in accordance with some embodiments. FIG. 25 includes a regulator 2502 and a second-stage voltage regulator 2504. The SC regulator 2502 can be any type of SC regulator, including, for example, one of reconfigurable Dickson-Star SC regulators disclosed herein. In some embodiments, the second-stage voltage regulator 2504 can include one or more of a buck regulator, a SC regulator, a linear regulator, and/or any types of voltage regulators capable of providing voltage regulation.

In some embodiments, the SC regulator 2502 can be operated to provide an output voltage at which the SC regulator 2502 can provide a high efficiency, and subsequently regulate the output voltage of the SC regulator 2502 using the second stage regulator 2504.

For example, the reconfigurable Dickson-Star SC regulator 2502 can convert the input voltage 202 to $V_{TMP}$ 2506, which is a fraction of the input voltage 202 at which the reconfigurable Dickson-Star SC regulator 2502 can provide high efficiency. For example, $V_{TMP}$ 2506 can be $V_{IN}/N$, where N is the step-down ratio. Then the second stage voltage regulator 2504 can receive $V_{TMP}$ 2506 and regulate it to provide $V_{OUT}$ 208.

Figure 26A:
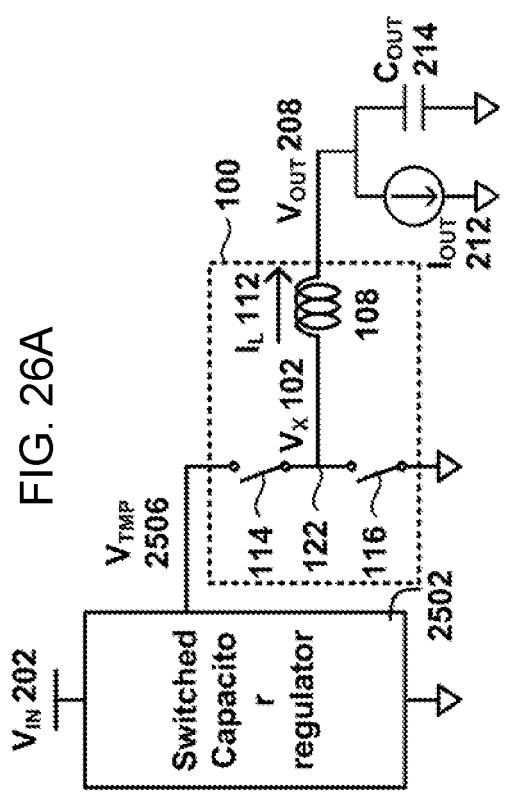
FIGS. 26A-26B illustrate an embodiment of FIG. 25 in which the second stage regulator is a buck converter in accordance with some embodiments.
Figure 26B:
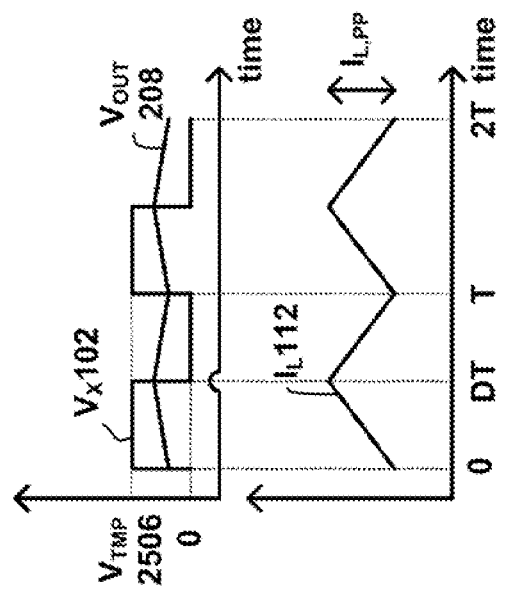

FIG. 26A illustrates an embodiment of FIG. 25 in which the second stage regulator is a buck converter in accordance with some embodiments. Here, $V_{TMP}$ 2506 is regulated by the buck converter 100 in fine steps using multiple power switches 114, 116 and one or more inductors 108. FIG. 26B illustrates the timing diagram of signals in the regulator.

The two-stage regulator illustrated in FIGS. 25-26, also referred to as a hybrid regulator, hinges on the fact that SC regulators are good at dividing voltages across predetermined fractional values and that the second stage regulators, such as buck regulators, can be good at regulating across a wide range of output voltage in fine steps. For example, in a 12V-to-1V step-down regulator, the reconfigurable Dickson-Star SC regulator 2502 can receive 12V at $V_{IN}$ 202 and provide a ⅙ step-down, thereby providing 2V at $V_{TMP}$ 2506. Subsequently, the buck regulator 100 can provide a subsequent regulation to regulate 2V to 1V. Since this two-stage regulator reduces the voltage swing at the internal node $V_X$ of the buck regulator 100 to $V_{TMP}$ 2506, which can be substantially less than $V_{IN}$ 202, this topology can reduce the capacitive power loss in the buck regulator 100 due to the parasitic capacitance at the junction 122.

Figure 27:
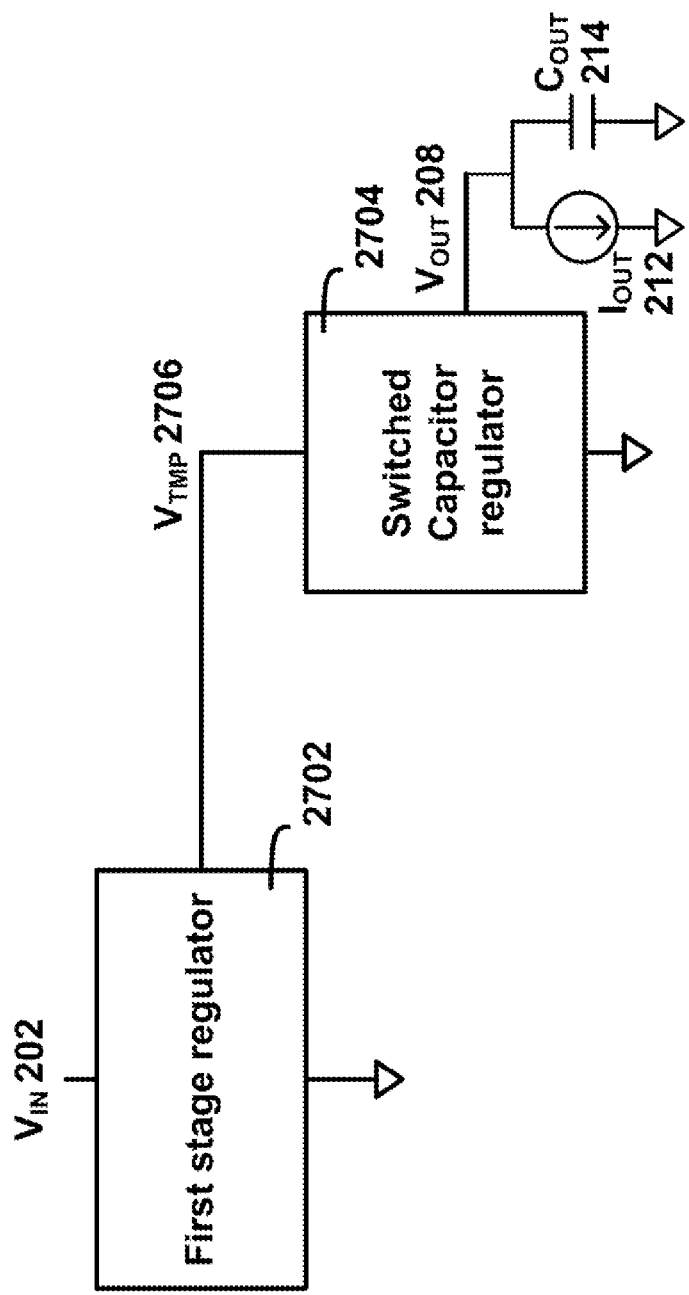
FIG. 27 illustrates a two-stage voltage regulation system in which a SC regulator provides the second stage voltage regulation in accordance with some embodiments.

FIG. 27 illustrates a two-stage voltage regulation system in which a SC regulator provides the second stage voltage regulation in accordance with some embodiments. FIG. 27 includes a first stage voltage regulator 2702 and a SC regulator 2704. The SC regulator 2704 can be any type of SC regulators, including, for example, one of reconfigurable Dickson-Star SC regulators disclosed herein. In some embodiments, the first stage voltage regulator 2702 can include one or more of a buck regulator, a SC regulator, a linear regulator, and/or any types of voltage regulators capable of providing voltage regulation.

In FIG. 27, the first stage voltage regulator 2702 receives an input voltage $V_{IN}$ 202, and provides as output $V_{TMP}$ 2706 to the SC regulator 2704. The SC regulator 2704 can subsequently step-down $V_{TMP}$ 2706 to the desired output voltage 208.

When the first stage regulator 2702 is a switched inductor regulator, the two-stage voltage regulation system of FIG. 27 can reduce the inductor resistive loss of the switched inductor regulator by operating the switched inductor regulator at a high switching frequency and with a small amount of current flow through the inductor. This approach can reduce the resistive loss of the switched inductor regulator even with a small inductor with a low inductance. Furthermore, this topology can also reduce the capacitive loss ($CV^2f$ loss) of the switched inductor regulator by limiting the voltage swing across the switches.

Figure 28A:
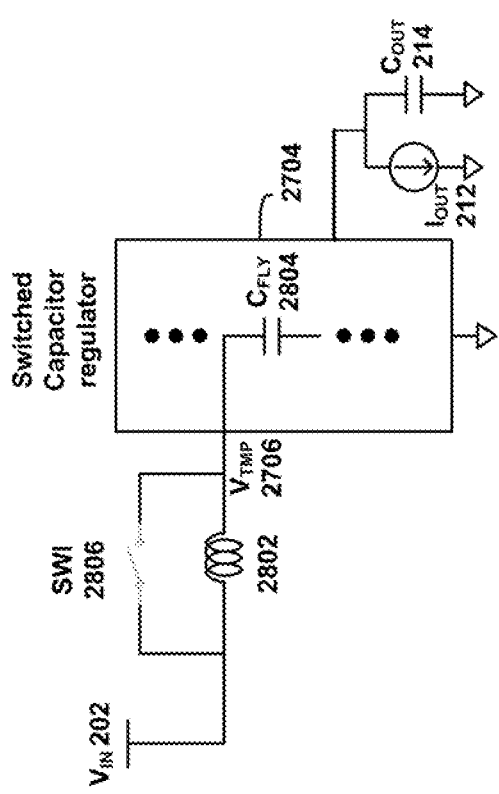
FIGS. 28A-28B illustrate a two-stage voltage regulator in which the first stage regulator consists sole of an inductor in accordance with some embodiments.
Figure 28B:
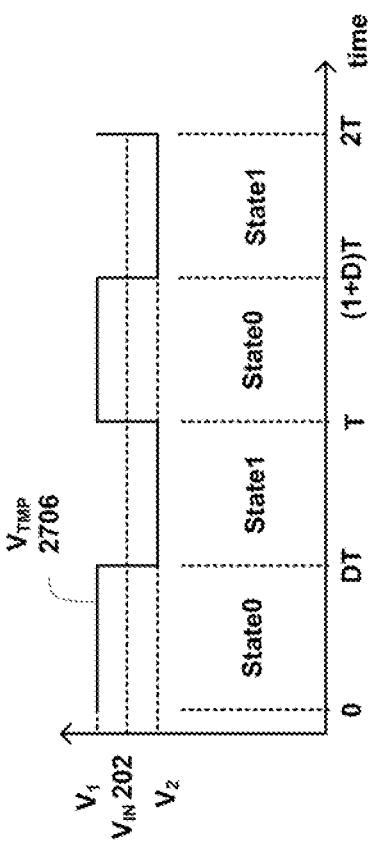

In some embodiments, the first stage regulator 2702 can include only an inductor. FIG. 28A illustrates a two-stage voltage regulator in which the first stage regulator consists sole of an inductor in accordance with some embodiments. FIG. 28B illustrates a timing diagram of signals in the two-stage voltage regulator of FIG. 28A in accordance with some embodiments. Here, the first stage regulator is a single inductor 2802. One terminal of the inductor 2802 is coupled to the input voltage $V_{IN}$ 202, and the other terminal of the inductor 2802 is coupled to an input of the SC regulator 2704. The input voltage to the SC regulator 2704 is referred to as $V_{TMP}$ 2706.

In some embodiments, the input voltage $V_{TMP}$ 2706 of the SC regulator 2704 is connected to one of the plates of a switching capacitor $C_{FLY}$ 2804 in the SC regulator 2704. As the SC regulator 2704 switches between State0 and State1 (see, e.g., FIGS. 3A-3B), the voltage potential $V_{TMP}$ 2706 on the top plate of the switching capacitor $C_{FLY}$ 2804 is switched between two voltages $V_1$ and $V_2$. Based on this operation, the following relationship can be derived:

$$V_{IN}202 = V_1 D + V_2(1-D)$$

The value of $V_1$ and $V_2$ are set by the conversion ratio of the SC regulator 2704 and $V_{OUT}$ 208. As a result, the conversion ratio between $V_{IN}$ 202 and $V_{OUT}$ 208 can be finely controlled based on the duty cycle D and the conversion ratio of the SC regulator 2704. The advantage of the two-stage regulator in FIG. 28 is that a single-stage SC regulator 2704, which can only provide integer-ratio conversion modes, can be converted into a two-stage regulator capable of providing non-integer-ratio conversion modes, simply by adding a single inductor 2802.

In some embodiments, the two-stage regulator may have a by-pass switch SWI 2806 that is configured to short the inductor 2802 in the first-stage regulator. The by-pass switch SWI 2806 allows the first-stage regulator to be turned off in case its operation is not needed.

FIGS. 29A-29B illustrate an operation of a two-stage regulator in FIG. 28 in which the SC regulator 2704 is a 4:1 Dickson Star switched-capacitor (SC) regulator 800 in accordance with some embodiments.

In some embodiments, the second stage 4:1 regulator 800 is duty-cycled between State0 and State1 to provide voltage regulation, as is also illustrated in FIGS. 9A-9B. Assuming that the switching capacitors $C1_{FLY}$ 204, $C2_{FLY}$ 206, and $C3_{FLY}$ 802 and the decoupling capacitor $C_{OUT}$ 214 are large, the following relationships can be derived for the two states:

$$V_{TMP}2706 = V_{C3FLY} V_{OUT}208 \qquad \text{State0:}$$

$$V_{C2FLY} = V_{C1FLY} V_{OUT}208 \qquad \text{State0:}$$

$$V_{OUT}208 = V_{C1FLY} \qquad \text{State1:}$$

$$V_{C3FLY} = V_{OUT}208 + V_{C2FLY} \qquad \text{State1:}$$

where $V_{C1FLY}$ is a voltage across the first switching capacitor $C1_{FLY}$ 204, $V_{C2FLY}$ is a voltage across the second switching capacitor $C2_{FLY}$ 206, and $V_{C1FLY}$ is a voltage across the third switching capacitor $C3_{FLY}$ 802. These relationship can be reorganized as follows:

$$V_{C2FLY} = 2 \times V_{OUT}$$

$$V_{C3FLY} = 3 \times V_{OUT}$$

$$V_{OUT} = (¼) \times V_{TMP}$$

Figure 30:
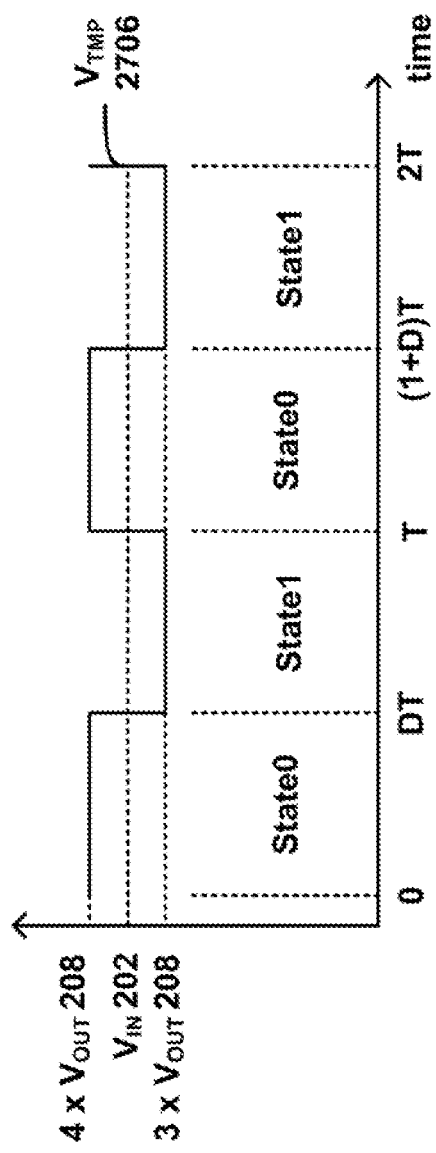
FIG. 30 illustrates the duty-cycling of the second stage regulator and the voltage swing of $V_{TMP}$ in accordance with some embodiments.

Therefore, the second stage SC regulator operates as a 4:1 step-down regulator, and $V_{TMP}$ 2706 swings between $3 \times V_{OUT}$ and $4 \times V_{OUT}$ in State0 and State1. The duty-cycling of the second stage regulator, as well as the voltage swing of $V_{TMP}$ 2706 is illustrated in FIG. 30.

Since $V_{TMP}$ 2706 swings between $3 \times V_{OUT}$ and $4 \times V_{OUT}$, this voltage swing is regulated by the inductor 2802 to provide the following relationship:

$$V_{IN}202 = (3 \times V_{OUT})D + (4 \times V_{OUT})(1-D) = (4-D) \times V_{OUT}$$

where D is a value between 0 and 1, and preferably between 0.25 and 0.75. In other words, the two-stage regulator in FIG. 29 allows for the following voltage relationship:

$$V_{OUT}=(1/(4-D))V_{IN}$$

Therefore, a voltage regulator control system can control the duty cycle D between 0 and 1 to fine-tune the relationship between $V_{IN}$ 202 and $V_{OUT}$ 208 beyond integer conversion ratios. In some sense, the first stage regulator and the second stage regulator in FIG. 28 have an identical duty cycle D.

Figure 31:
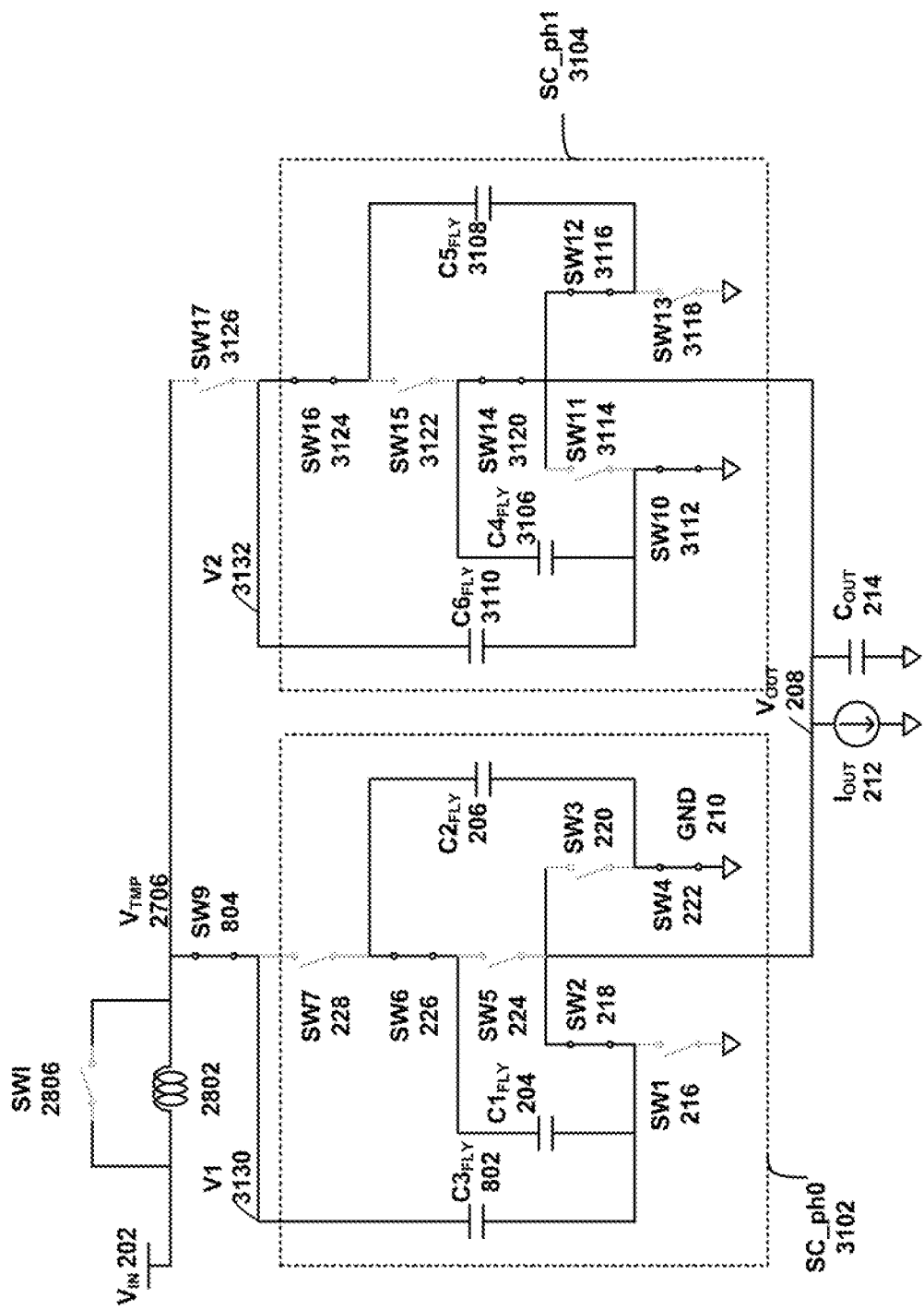
FIG. 31 illustrates a two-stage voltage regulation system in which the second stage regulator is a multi-phase voltage regulator in accordance with some embodiments.

FIG. 31 illustrates a two-stage voltage regulation system in which the second stage regulator is a multi-phase voltage regulator in accordance with some embodiments. The multi-phase voltage regulator in the second stage regulator allows the first stage regulator and the second stage regulator to use independent duty cycles. This may be beneficial in some cases because the efficiency of an SC regulator may degrade when the duty-cycle of the SC regulator deviates from 0.5. By allowing the first stage regulator and the second stage regulator to have independent duty cycles, the second stage regulator can be operated at a high efficiency level (e.g., close to a duty cycle of 0.5) regardless of the desired output voltage of the voltage regulation system.

Figure 32:
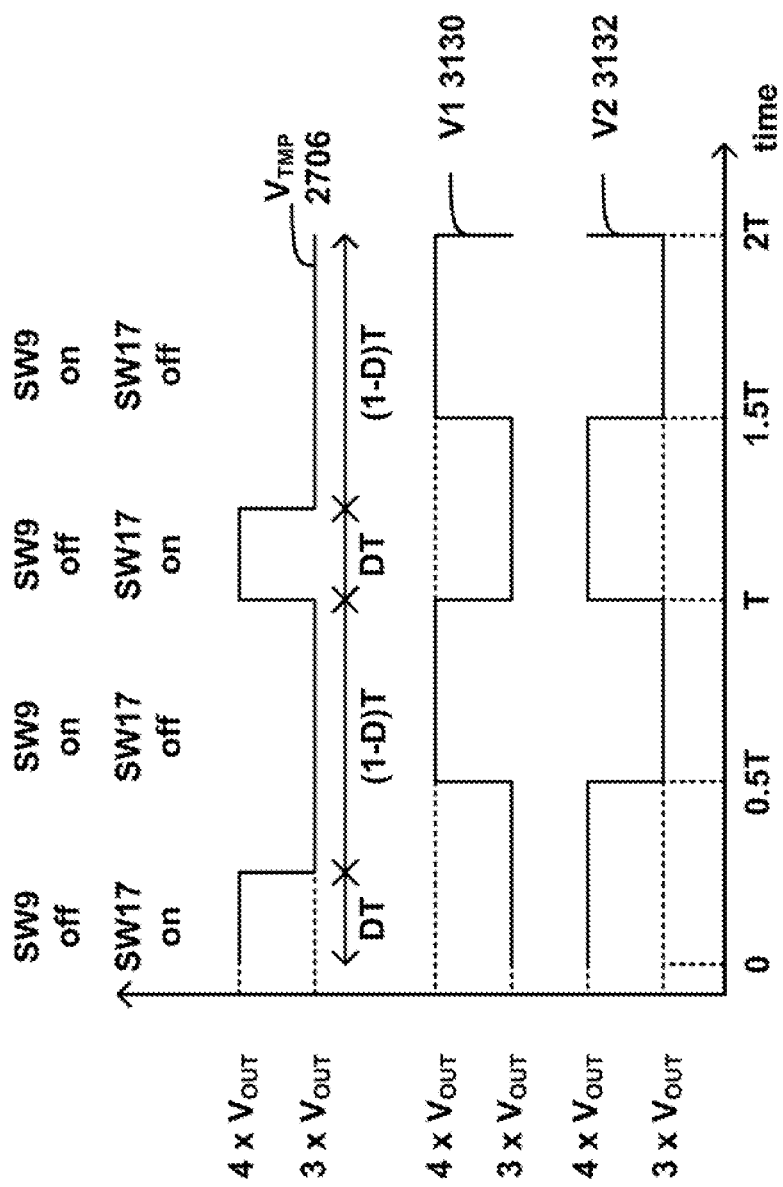
FIG. 32 illustrates the phase relationship between switch capacitors in FIG. 31 in accordance with some embodiments.

As shown in FIG. 31, in some embodiments, the second stage SC regulator has two 4:1 SC regulator modules, SC_ph0 3102 and SC_ph1 3104, where SC_ph0 3102 and SC_ph1 3104 operate with their own phases. In some embodiments, the two SC regulator modules may be 180 degrees out of phase. The phase relationship between SC_ph0 3102 and SC_ph1 3104 is illustrated in FIG. 32 in accordance with some embodiments. In FIG. 32, the two 4:1 SC regulator modules operate at a duty cycle of 0.5, thereby achieving high efficiency.

While the two 4:1 SC regulator modules operate at a duty cycle of 0.5, the duty cycle of the switched-inductor regulator in the first stage regulator can be independently controlled. In particular, the switched-inductor regulator can have its own duty cycle D by switching switches SW9 804 and SW17 3126 out of phase at a duty cycle D, irrespective of the duty cycle of the two 4:1 SC regulator modules.

For example, when both modules SC_ph0 3102 and SC_ph1 3104 operate at a duty cycle of 0.5, the voltages V1 3130 and V2 3132 at the top plate of $C3_{FLY}$ 802 and $C6_{FLY}$ 3110 swing between $3 \times V_{OUT}$ 208 and $4 \times V_{OUT}$ 208 at a duty cycle of 0.5, as illustrated in the waveforms of FIG. 32. Since the voltages V1 3130 and V2 3132 at the top plate of $C3_{FLY}$ 802 and $C6_{FLY}$ 3110 swing between $3 \times V_{OUT}$ 208 and $4 \times V_{OUT}$ 208 at any given time, the switches SW9 804 and SW17 3126 can turn on and off (out of phase) at a duty cycle D to connect $V_{TMP}$ 2706 to either $3 \times V_{OUT}$ 208 or $4 \times V_{OUT}$ 208 at a duty cycle D, as shown in FIG. 32. This allows the first stage regulator to operate at a duty cycle D, while the second stage regulator (including the two 4:1 SC regulator modules, SC_ph0 3102 and SC_ph1 3104) operates at a duty cycle of 0.5, thereby improving the operating efficiency of the second stage regulator.

When the switches SW9 804 and SW17 3126 are duty-cycled at a duty cycle of D, the amount of time that one particular SC module is used can depend on the duty cycle D. For example, in FIG. 32, the duty cycle D is less than 0.5. Therefore, the first SC module 3102 is used less than 50% of the time while the second SC module 3104 is used more than 50% of the time. In an extreme case, one SC module could be used 100% of the time while the other SC module is used 0% of the time. To accommodate such extreme scenarios, all switches and capacitors in the two SC modules 3102, 3104 may need to be sized sufficiently large so that a single SC module can deliver the maximum required output power—as if the other SC module does not exist.

In some embodiments, the switches SW9 804 and SW17 3126 can be controlled such that each switch SW9 804 and SW17 3126 is turned on for the same amount of time while maintaining the duty cycle of the first stage regulator. This way, the SC modules in the multi-phase regulator (the second stage regulator) are used the same amount of time regardless of the duty cycle of the first stage regulator. This allows the switches and capacitors in the SC modules to be about half the size compared to the scenario in which a single SC module needs to be able to deliver the maximum required output power.

Figure 33:
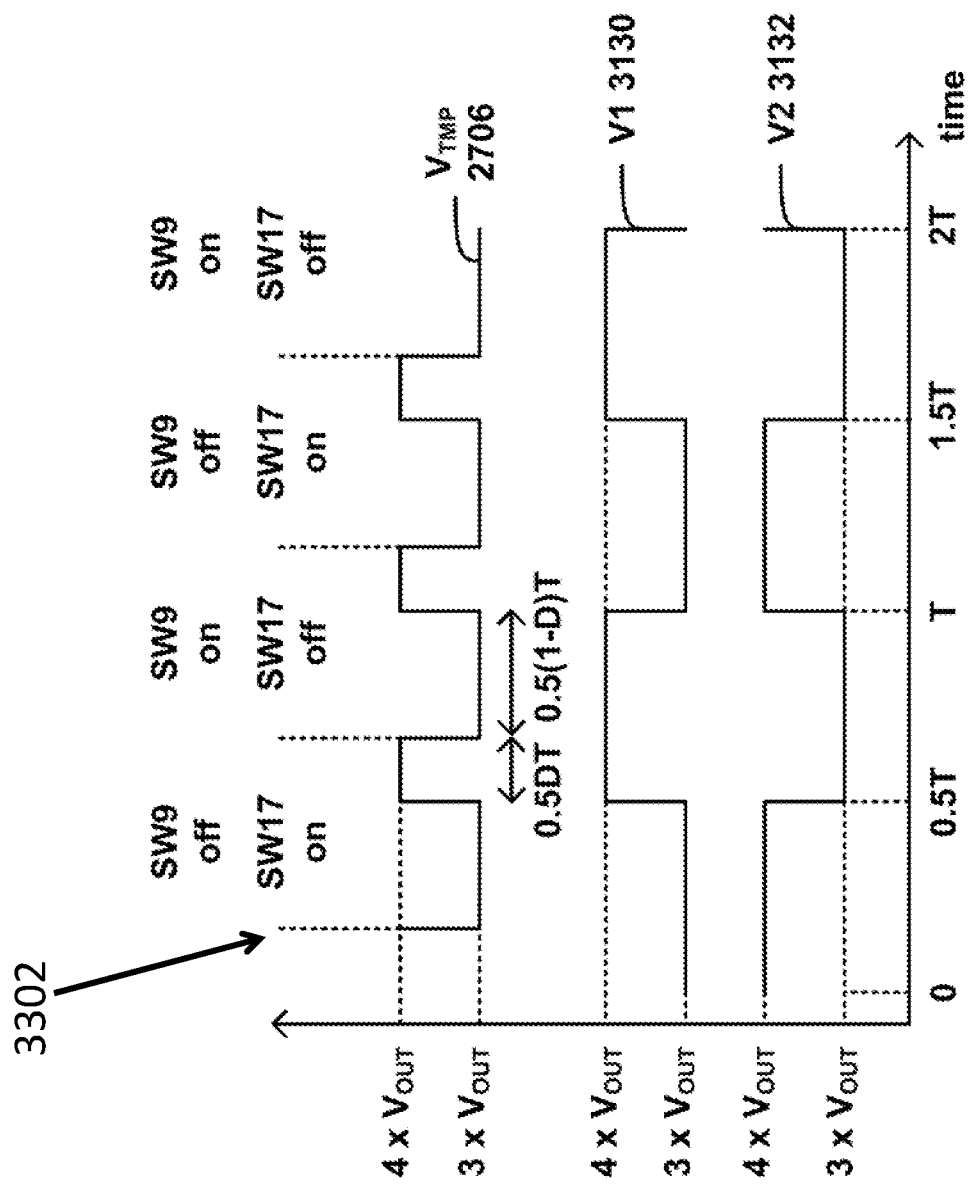
FIG. 33 illustrates a control sequence of switches that allows maintaining the duty cycle of the first stage regulator in accordance with some embodiments.

FIG. 33 illustrates the control sequence of switches that allows each switch SW9 804 and SW17 3126 to be turned on for the same amount of time while maintaining the duty cycle of the first stage regulator in accordance with some embodiments. In a given period, the first switch SW9 804 is turned on 50% of the time while keeping the second switch SW17 3126 turned off, and the second switch SW17 3126 is turned on 50% of the time while keeping the first switch SW9 804 turned off. However, the time instance at which the period starts is determined such that the voltage $V_{TMP}$ 2706 swings between $3 \times V_{OUT}$ and $4 \times V_{OUT}$ at a duty cycle D.

For example, when the SW9 804 is turned on and SW17 is turned off, the voltage $V_{TMP}$ 2706 is coupled to V1 3130, and when the SW9 804 is turned off and SW17 is turned on, the voltage $V_{TMP}$ 2706 is coupled to V2 3132. Therefore, by shifting the time instance 3302, the duty cycle D during which the $V_{TMP}$ 2706 is at $4 \times V_{OUT}$ can be controlled. For instance, when the time instance 3302 is shifted to the right, the duty cycle D would increase proportionally; when the time instance 3302 is shifted to the left, the duty cycle D would decrease proportionally. One additional benefit of this configuration is that $V_{TMP}$ 2706 switches at twice the frequency of the switched-inductor and switched-capacitor regulators. This feature can enable the use of a smaller inductor 3302 without incurring additional switching loss.

Although the second stage regulator was illustrated using a reconfigurable Dickson Star regulator, other types of SC regulators can also be used for the second stage regulator in FIGS. 27-29, and 31. For example, the second stage regulator can include a ladder SC regulator, a reconfigurable ladder SC regulator, a series-to-parallel SC regulator, a reconfigurable series-to-parallel regulator, and/or any other types of SC regulators.

In some embodiments, the two-stage regulator can be used for various applications including power management integrated circuits (PMICs), battery chargers, LED drivers, envelope tracking power amplifiers.

In some embodiments, the capacitance of the switched capacitor regulator can be set to be proportional to an output current of the two-stage regulator. For example, the capacitance of the switched capacitor regulator can be in the range of 0.1 nF/mA and 100 nF/mA, depending on the target power efficiency. The two-stage regulator can improve its efficiency by using larger capacitance values.

In some embodiments, a two-stage regulator can be operated in a reverse direction to operate it as a step-up regulator. For example, an input node of the two-stage regulator can be coupled to a target load (e.g., a chip) and an output node of the two-stage regulator can be coupled to an input voltage source (e.g., a battery).

In some embodiments, a two-stage regulator can be operated in a reverse direction to operate it as a battery charger. For example, an input node of the two-stage regulator can be coupled to a power source (e.g., a power line of a Universal Serial Bus (USB)) and an output node of the two-stage regulator can be coupled to a battery.

Various embodiments of the disclosed two-stage regulator can be used as a battery charger in a battery-operated device. For example, an output node of a two-stage regulator can be coupled to a battery so that the output voltage and the output current of the two-stage regulator are used to charge the battery.

The two-stage regulator can be particularly useful in charging batteries in a handheld device. A handheld device, such as a smartphone, can use a Lithium-Ion (Li-Ion) battery that is configured to provide a voltage output within the range of approximately 2.8-4.3V, depending on whether the battery is charged or not (e.g., 4.3V when fully charged, 2.8V when fully discharged). The Li Ion battery in the handheld device can be charged using a Universal Serial Bus (USB). The current version of the USB power line uses 5V (and the future versions of the USB may use even higher voltages), which is higher than the voltage output of the Li Ion battery. Therefore, the voltage from the USB power line should be stepped down before it can be used to charge the Li Ion battery. To this end, the two-stage regulator can be configured to receive the power line voltage and current from the USB and provide a step-down version of the power line voltage and current to the Li-Ion battery so that the Li-Ion battery can be charged based on the voltage and current from the USB.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the two-stage regulator can operate in a step-up configuration to step-up the output voltage of the battery to that of the USB power line. This way, the battery in the first device can charge the battery in the second device over the USB power line.

Figure 34:
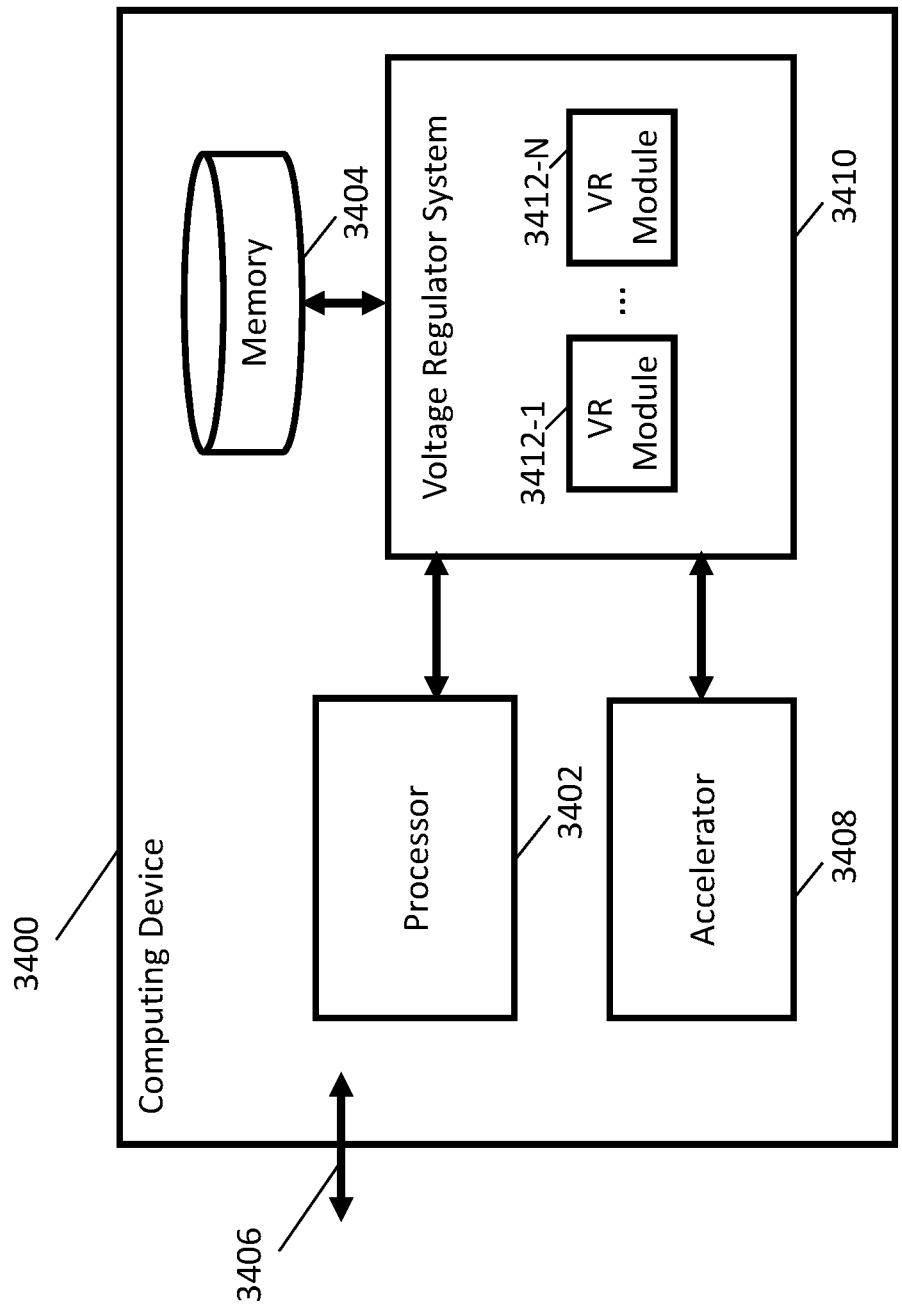
FIG. 34 is a block diagram of a computing device that includes a voltage regulation system in accordance with some embodiments.

FIG. 34 is a block diagram of a computing device that includes a voltage regulation system in accordance with some embodiments. The computing device 3400 includes a processor 3402, memory 3404, one or more interfaces 3406, an accelerator 3408, and a voltage regulator system 3410. The computing device 3400 may include additional modules, fewer modules, or any other suitable combination of modules that perform any suitable operation or combination of operations.

In some embodiments, the accelerator 3408 can be implemented in hardware using an application specific integrated circuit (ASIC). The accelerator 3408 can be a part of a system on chip (SOC). In other embodiments, the accelerator 3408 can be implemented in hardware using a logic circuit, a programmable logic array (PLA), a digital signal processor (DSP), a field programmable gate array (FPGA), or any other integrated circuit. In some cases, the accelerator 3408 can be packaged in the same package as other integrated circuits.

In some embodiments, the voltage regulator system 3410 can be configured to provide a supply voltage to one or more of the processor 3402, memory 3404, and/or an accelerator 3408. The voltage regulator system 3410 can include one or more voltage regulator (VR) modules 3412-1 . . . 3412-N. In some embodiments, one or more of the VR modules 3412-1 . . . 3412-N can be a reconfigurable Dickson-Star SC regulator, for example, as disclosed in FIGS. 4, 10, and 16.

In some embodiments, one or more of the VR modules 3412-1 . . . 3412-N can be a two-stage regulator, for example, as disclosed in FIGS. 27-29, 31. The one or more VR modules 3412-1 . . . 3412-N may operate in multiple interleaved phases.

In some embodiments, the voltage regulator system 3410 can include a switch control module that is configured to control the switch configuration in one or more VR modules 3412-1 . . . 3412-N. For example, when the switch control module receives an instruction to operate a 3:1 reconfigurable Dickson Star SC regulator in a 3:1 conversion mode, the switch control module can be configured to control the switch matrix 216-228 and the mode switch SW8 402 to operate the reconfigurable Dickson Star SC regulator in a 3:1 conversion mode, as shown in FIGS. 5A-5C. As another example, when the switch control module receives an instruction to operate the 3:1 reconfigurable Dickson Star SC regulator in a 2:1 conversion mode, the switch control module can be configured to control the switch matrix 216-228 and the mode switch SW8 402 to operate the reconfigurable Dickson Star SC regulator in a 2:1 conversion mode, as shown in FIGS. 6A-6C. In some embodiments, the switch control module can be synthesized using hardware programming languages. The hardware programming languages can include Verilog, VHDL, Bluespec, or any other suitable hardware programming language. In other embodiments, the switch control module can be manually designed and can be manually laid-out on a chip.

The computing device 3400 can communicate with other computing devices (not shown) via the interface 3406. The interface 3406 can be implemented in hardware to send and receive signals in a variety of mediums, such as optical, copper, and wireless, and in a number of different protocols, some of which may be non-transient.

In some embodiments, the computing device 3400 can include user equipment. The user equipment can communicate with one or more radio access networks and with wired communication networks. The user equipment can be a cellular phone having telephonic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, Tizen, Android, or any other suitable operating system. The screen might be a touch screen that is used to input data to the mobile device, in which case the screen can be used instead of the full keyboard. The user equipment can also keep global positioning coordinates, profile information, or other location information. The user equipment can also be a wearable electronic device.

The computing device 3400 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The computing device 3400 can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 3400 can also provide a variety of user interfaces such as a keyboard, a touch screen, a trackball, a touch pad, and/or a mouse. The computing device 3400 may also include speakers and a display device in some embodiments. The computing device 3400 can also include a bio-medical electronic device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, apparatuses, systems, and methods for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A voltage regulator configured to receive a first voltage signal and provide a final voltage signal based, at least in part, on the first voltage signal, the voltage regulator comprising:
   an inductor, wherein a first terminal of the inductor comprises an input terminal configured to receive the first voltage signal, and a second terminal of the inductor comprises an output terminal configured to provide an intermediate voltage signal;
   a step-down regulator comprising an input terminal configured to receive the intermediate voltage signal from the output terminal of the inductor, a switch matrix, a plurality of capacitors, and an output terminal, configured to provide the final voltage signal; and
   a control module configured to cause the switch matrix in the step-down regulator to alternate between a first configuration and a second configuration to arrange the plurality of capacitors in a first arrangement and a second arrangement, respectively, with a predetermined duty cycle, thereby also duty-cycling the inductor.

2. The voltage regulator of claim 1, wherein, when the switch matrix is in a first configuration, the intermediate voltage signal is at a first voltage level, and when the switch matrix is in a second configuration, the intermediate voltage signal is at a second voltage level.

3. The voltage regulator of claim 2, wherein the first voltage level is a first fractional multiple of the final voltage signal, and wherein the second voltage level is a second fractional multiple of the final voltage signal.

4. The voltage regulator of claim 1, wherein the step-down regulator comprises a Dickson Star switched capacitor regulator.

5. The voltage regulator of claim 4, wherein the Dickson Star switched capacitor regulator comprises a reconfigurable Dickson Star switched capacitor regulator.

6. A voltage regulator configured to receive a first voltage signal and provide a final voltage signal based, at least in part, on the first voltage signal, the voltage regulator comprising:
   an inductor, wherein a first terminal of the inductor comprises an input terminal configured to receive the first voltage signal, and a second terminal of the inductor comprises an output terminal configured to provide an intermediate voltage signal;
   a step-down regulator comprising an input terminal configured to receive the intermediate voltage signal from the output terminal, and an output terminal configured to provide the final voltage signal, wherein the step-down regulator further comprises:
   a first switched capacitor regulator comprising:
      a switch matrix comprising a first switch configured to couple the first switched capacitor regulator to the input terminal of the step-down regulator, and
      a plurality of capacitors; and
   a second switched capacitor regulator comprising:
      a switch matrix comprising a second switch configured to couple the second switched capacitor regulator to the input terminal of the step-down regulator, and
      a plurality of capacitors; and
   a control module configured to:
      cause the switch matrix in the first switched capacitor regulator to alternate between a first configuration and a second configuration to arrange the plurality of capacitors in the first switched capacitor regulator in a first arrangement and a second arrangement, respectively, with a first duty cycle,
      cause the switch matrix in the second switched capacitor regulator to alternate between a third configuration and a fourth configuration to arrange the plurality of capacitors in the second switched capacitor regulator in a third arrangement and a fourth arrangement, respectively, with the first duty cycle, and
      cause the first switch and the second switch to alternately couple the first switched capacitor regulator and the second switched capacitor regulator at a second duty cycle.

7. The voltage regulator of claim 6, wherein the first switched capacitor regulator and the second switched capacitor regulator operate out-of-phase.

8. The voltage regulator of claim 6, wherein the first switched capacitor regulator and the second switched capacitor regulator comprise an identical switched capacitor regulator topology.

9. The voltage regulator of claim 6, wherein alternately coupling the first switched capacitor regulator and the second switched capacitor regulator at the second duty cycle causes duty-cycling of the inductor at the second duty cycle.

10. The voltage regulator of claim 6, wherein the second duty cycle is 0.5.

11. The voltage regulator of claim 10, wherein the control module is configured to determine a time instance at which to begin alternate coupling of the first switched capacitor regulator and the second switched capacitor regulator to provide a desired duty cycle of the inductor.

12. The voltage regulator of claim 6, wherein the inductor is provided as a discrete component on-package or on-board.

13. An electronic system comprising:
a voltage regulator according to claim 6; and
a target load system coupled to the voltage regulator, wherein the output terminal of the step-down regulator in the voltage regulator is coupled to the target load system.

14. The electronic system of claim 13, wherein the target load system includes a battery and the voltage regulator is configured to receive the first voltage signal from a power line of a Universal Serial Bus and to provide the final voltage signal to the battery.

15. The electronic system of claim 13, wherein the target load system comprises a System on Chip (SoC), and the SoC and the voltage regulator are packaged in a single SoC package.

16. The electronic system of claim 13, wherein the target load system comprises a System on Chip (SoC), and the SoC and the voltage regulator are provided on a printed circuit board (PCB).

17. An electronic system comprising:
a voltage regulator according to claim 6, wherein the voltage regulator is configured to operate in a reverse direction in which the output terminal of the step-down regulator in the voltage regulator is coupled to an input voltage source and the first input terminal of the inductor is coupled to a target load of the voltage regulator.

18. The electronic system of claim 17, wherein the electronic system operating the voltage regulator in a reverse direction is configured to operate the voltage regulator as a step-up regulator.

19. The electronic system of claim 18, wherein the output terminal of the step-down regulator is coupled to a battery and the input terminal of the inductor is coupled to a power line of a Universal Serial Bus.

\* \* \* \* \*